(12) United States Patent
Ito et al.

(10) Patent No.: US 7,929,162 B2
(45) Date of Patent: Apr. 19, 2011

(54) METHOD AND SYSTEM FOR GENERATING AND OUTPUTTING OUTPUT CONDITION PROPERTIES AND EDIT PROPERTIES CORRESPONDING TO A DOCUMENT

(75) Inventors: Tatsuo Ito, Kanagawa (JP); Sachiko Mihira, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1211 days.

(21) Appl. No.: 10/981,619

(22) Filed: Nov. 5, 2004

(65) Prior Publication Data
US 2005/0134888 A1   Jun. 23, 2005

(30) Foreign Application Priority Data

Nov. 6, 2003  (JP) ................. 2003-376499
Nov. 6, 2003  (JP) ................. 2003-376500
Nov. 6, 2003  (JP) ................. 2003-376501
Nov. 1, 2004  (JP) ................. 2004-318292
Nov. 1, 2004  (JP) ................. 2004-318293
Nov. 1, 2004  (JP) ................. 2004-318294

(51) Int. Cl.
*G06F 3/12* (2006.01)
*G06K 1/00* (2006.01)
*G06F 15/00* (2006.01)

(52) U.S. Cl. ....................... 358/1.15; 358/1.9
(58) Field of Classification Search ............... 358/1.15, 358/1.9; 715/744
See application file for complete search history.

(56) References Cited

U.S. PATENT DOCUMENTS

| | | | |
|---|---|---|---|
| 5,418,889 A | 5/1995 | Ito | |
| 5,564,109 A | 10/1996 | Snyder et al. | |
| 6,385,728 B1 * | 5/2002 | DeBry | 726/9 |
| 7,382,479 B2 * | 6/2008 | Hirose et al. | 358/1.15 |
| 2002/0044297 A1 | 4/2002 | Tanaka | |
| 2002/0059415 A1 * | 5/2002 | Chang et al. | 709/223 |
| 2002/0136559 A1 | 9/2002 | Simpson et al. | |
| 2002/0197885 A1 * | 12/2002 | Hwang et al. | 438/778 |
| 2003/0063313 A1 | 4/2003 | Ito | |
| 2003/0218771 A1 | 11/2003 | Mihira | |
| 2003/0225894 A1 | 12/2003 | Ito | |
| 2004/0027601 A1 | 2/2004 | Ito et al. | |
| 2004/0070782 A1 | 4/2004 | Mihira | |

(Continued)

FOREIGN PATENT DOCUMENTS

EP   1 081 637 A2   3/2001

(Continued)

OTHER PUBLICATIONS

U.S. Appl. No. 11/150,340, filed Jun. 13, 2005, Takeuchi, et al.

(Continued)

*Primary Examiner* — Twyler L Haskins
*Assistant Examiner* — Fred Guillermety
(74) *Attorney, Agent, or Firm* — Oblon, Spivak, McClelland, Maier & Neustadt, L.L.P.

(57) ABSTRACT

In a document outputting method for editing a document managed by a document management service, which provides the document when an edit or an output of the document is permitted, an output condition property candidate obtain request for obtaining an output condition property candidate including an edit property indicating edit contents executable for the document and an output property indicating an output method executable when the document is output is received, and the output condition property candidate is provided to a request originator sending the output condition property candidate obtain request.

12 Claims, 67 Drawing Sheets

U.S. PATENT DOCUMENTS

| | | |
|---|---|---|
| 2004/0080771 A1 | 4/2004 | Mihira et al. |
| 2005/0078332 A1* | 4/2005 | Brown .................... 358/1.14 |
| 2007/0061735 A1* | 3/2007 | Hoffberg et al. ............. 715/744 |

FOREIGN PATENT DOCUMENTS

| | | |
|---|---|---|
| EP | 1 081 637 A3 | 3/2001 |
| JP | 11-237969 | 8/1999 |
| JP | 2003-208596 | 7/2003 |
| JP | 2004-7346 | 1/2004 |
| JP | 2004-7347 | 1/2004 |
| JP | 2004-133917 | 4/2004 |
| WO | WO 02/46867 A2 | 6/2002 |

OTHER PUBLICATIONS

U.S. Appl. No. 10/761,206, filed Jan. 22, 2004, Matsuda, et al.
U.S. Appl. No. 09/439,152, filed Nov. 12, 1999.
European Search Report issued Oct. 4, 2010, in Application No. 04256907.9-1248 / 1530125.

* cited by examiner

FIG.8

- NUMBER OF COPIES
- SHEET SIZE
- BOTH SIDE PRINT YES/NO
- COLLATE YES/NO

FIG.9

- PASTE CONFIDENTIAL STAMP
- DRAWING OPERATION
  (STRAIGHT LINE/BROKEN LINE/CURVED LINE/POLYGON/CIRCLE/LETTER)
- DELETE/COPY/PASTE/MOVE/CONVERT COLOR FOR INDICATED AREA
- CONTINUOUSLY EDIT MULTIPLE PAGES
- DELETE AREA/PASTE AREA/MOVE AREA/DRAW LETTER)
- REMOVE STAIN OF GROUND

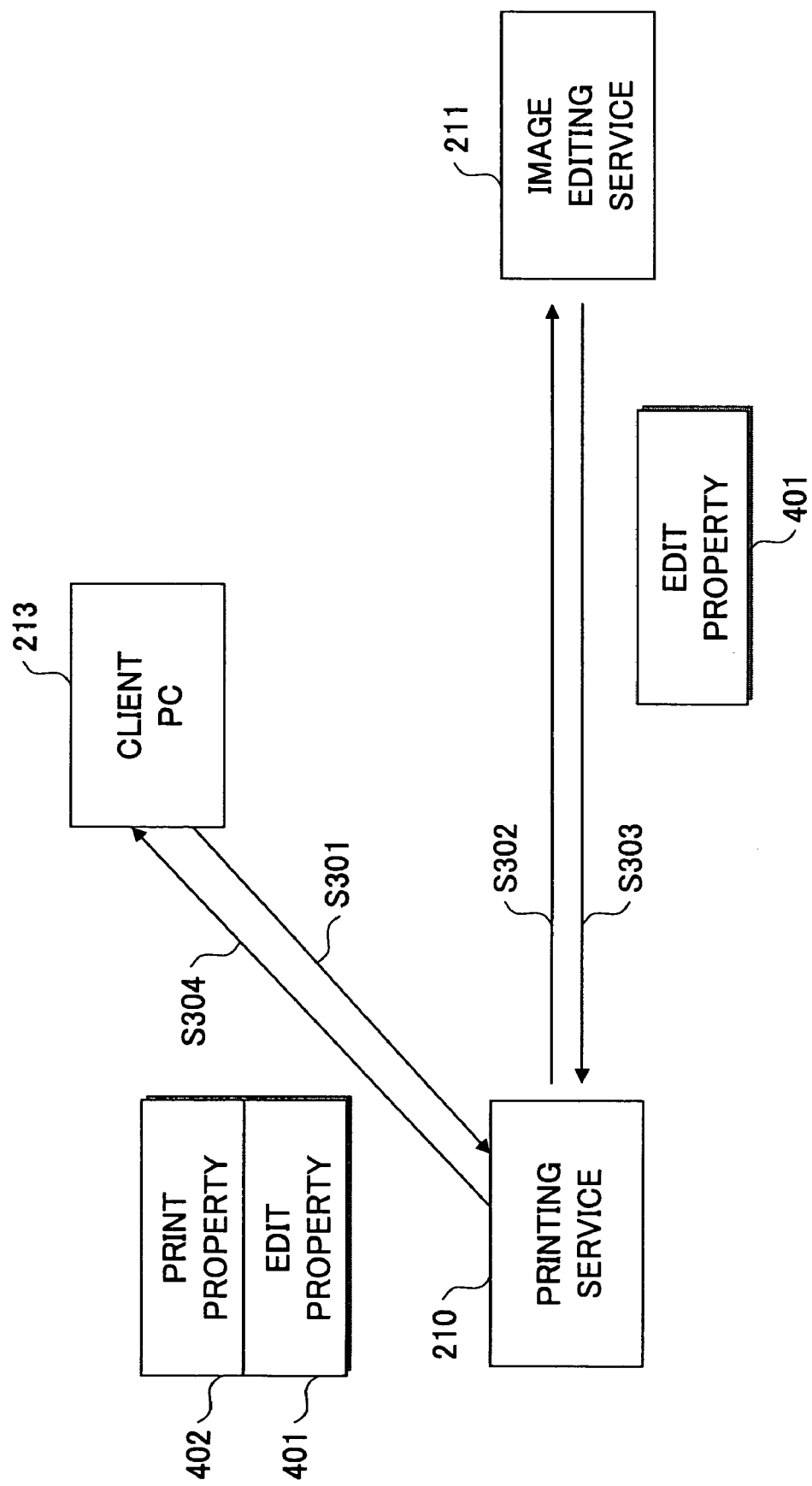

FIG.13

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/">
<SOAP-ENV:Body>
<m:getPrintCapability
 xmlns:m="http://www.hoge.co.jp/xmlns/soap/print ">
<sessionId xsi:type="xsd:string">1234567890</sessionId>
<editServiceUri xsi:type="xsd:string">http://111.222.333.444/editservice</editServiceUri>
                                                        410
</m:getPrintCapability >
</SOAP-ENV:Body>
</SOAP-ENV:Envelope>
```

```
<?xml version="1.0" encoding="UTF-8"?>
<SOAP-ENV:Envelope
  xmlns:SOAP-ENV="http://schemas.xmlsoap.org/soap/envelope/"
  xmlns:SOAP-ENC="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/">
<SOAP-ENV:Body>
<m:getPrintCapability
    xmlns:m="http://www.hoge.co.jp/xmlns/soap/print ">
<sessionId xsi:type=" xsd:string">1234567890</sessionId>
</m:getPrintCapability >
</SOAP-ENV:Body>
</SOAP-ENV:Envelope>
```

```
<?xml version="1.0" encoding="UTF-8"?>
<SOAP-ENV:Envelope
xmlns:SOAP-ENV="http://schemas.xmlsoap.org/soap/envelope/"
xmlns:soap-enc ="http://schemas.xmlsoap.org/soap/encoding/"
xmlns:xsi="http://www.w3.org/2001/XMLSchema-instance"
xmlns:xsd="http://www.w3.org/2001/XMLSchema"
SOAP-ENV:encodingStyle="http://schemas.xmlsoap.org/soap/encoding/">
<SOAP-ENV:Body>
<m:getPrintCapabilityResponse
xmlns:m="http://www.hoge.co.jp/xmlns/soap/print">
<printpropertyInfo xmlns:itt="http://www.hoge.co.jp/xmlns/soap/commontype" xmlns:soap-enc ="itt:property[2]">
<item><name xsi:type="xsd:string">number of copies</name><value xsi:type="xsd:string">1-99</value></item>   411
<item><name xsi:type="xsd:string">size</name><value xsi:type="xsd:string"> A4F/B4F </value></item>   412
</printpropertyInfo>
<editpropertyInfo xmlns:itt="http://www.hoge.co.jp/xmlns/soap/commontype" xmlns:soap-enc ="itt:property[1]">
<item><name xsi:type="xsd:string"> </name><value xsi:type="xsd:string"> secret stamp/page stamp </value></item>   413
</editpropertyInfo>
</m:getPrintCapabilityResponse>
</SOAP-ENV:Body>
</SOAP-ENV:Envelope>
```

FIG.16

```
<?xml version="1.0" encoding="UTF-8"?>
<SOAP-ENV:Envelope
 xmlns:SOAP-ENV="http://schemas.xmlsoap.org/soap/envelope/"
 xmlns:soap-enc ="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/">
<SOAP-ENV:Body>
 <m:getPrintCapabilityResponse
  xmlns:m="http://www.hoge.co.jp/xmlns/soap/print">
  <printpropertyInfo xmlns:itt="http://www.hoge.co.jp/xmlns/soap/commontype" xmlns:soap-enc ="itt:range[2]">
   <item><name>number_of_copies</name><valueMin/>1<valueMax/>99<valueEnum xmlns:itt="http://
m/></item>
   <item><name>size</name><valueMin/><valueMax/><valueStep/><valueEnum xmlns:soap-enc ="itt:string[2]"><item>A4F</item><item>B4F</item></valueEnum xmlns:itt="http://
www.hoge.co.jp/xmlns/soap/commontype">
  </printpropertyInfo>
  <editpropertyInfo xmlns:itt="http://www.hoge.co.jp/xmlns/soap/commontype" xmlns:soap-enc ="itt:range[1]">
   <item><name>with_stamp</name><valueMin/><valueMax/><valueStep/><valueEnum xmlns:itt="http://
www.hoge.co.jp/xmlns/soap/commontype" xmlns:soap-enc
="itt:string[2]"><item>secret_stamp</item><item>page_stamp</item></valueEnum></item>
  </editpropertyInfo>
 </m:getPrintCapabilityResponse>
</SOAP-ENV:Body>
</SOAP-ENV:Envelope>
```

```
<?xml version="1.0" encoding="UTF-8"?>
<SOAP-ENV:Envelope
xmlns:SOAP-ENV="http://schemas.xmlsoap.org/soap/envelope/"
xmlns:soap-enc ="http://schemas.xmlsoap.org/soap/encoding/"
xmlns:xsi="http://www.w3.org/2001/XMLSchema-instance"
xmlns:xsd="http://www.w3.org/2001/XMLSchema"
SOAP-ENV:encodingStyle="http://schemas.xmlsoap.org/soap/encoding/"
<SOAP-ENV:Body>
 <m:getPrintCapabilityResponse
 xmlns:m="http://www.hoge.co.jp/xmlns/soap/print">
  <printpropertyInfo xmlns:itt="http://www.hoge.co.jp/xmlns/soap/commontype" xmlns:soap-enc ="itt:property[2]">
   <item><name xsi:type="xsd:string">number_of_copies</name><value xsi:type="xsd:string">1-99</value></item>       ⎫
   <item><name xsi:type="xsd:string">size</name><value xsi:type="xsd:string">A4F/B4F</value></item>                ⎬ 426
  </printpropertyInfo>                                                                                              ⎭
  <editable xsi:type="xsd:bool">true</editable>  427
  <editCandidate xmlns:itt="http://www.hoge.co.jp/xmlns/soap/commontype" xmlns:soap-enc ="itt:string[2]">
   <item> http://111.222.1.1/editservice</item><item> http://111.222.1.2/editservice </item>   425
  <editCandidate>
 </m:getPrintCapabilityResponse>
</SOAP-ENV:Body>
</SOAP-ENV:Envelope>
```

FIG.19

```
<?xml version="1.0" encoding="UTF-8"?>
<SOAP-ENV:Envelope
  xmlns:SOAP-ENV="http://schemas.xmlsoap.org/soap/envelope/"
  xmlns:soap-enc ="http://schemas.xmlsoap.org/soap/encoding/"
  xmlns:xsi="http://www.w3.org/2001/XMLSchema-instance"
  xmlns:xsd="http://www.w3.org/2001/XMLSchema"
SOAP-ENV:encodingStyle="http://schemas.xmlsoap.org/soap/encoding/"
<SOAP-ENV:Body>
  <m:getPrintCapabilityResponse
    xmlns:m="http://www.hoge.co.jp/xmlns/soap/print">
  <printpropertyInfo xmlns:itt="http://www.hoge.co.jp/xmlns/soap/commontype" xmlns:soap-enc ="itt:property[2]">
    <item><name xsi:type="xsd:string">number_of_copies</name><value xsi:type="xsd:string">1-99</value></item>
    <item><name xsi:type="xsd:string">size</name><value xsi:type="xsd:string"> A4F/B4F </value></item>
  </printpropertyInfo>
  <editable xsi:type="xsd:bool">true</editable>
  </m:getPrintCapabilityResponse>
</SOAP-ENV:Body>
</SOAP-ENV:Envelope>
```

M16

426 (items)
427 (editable)

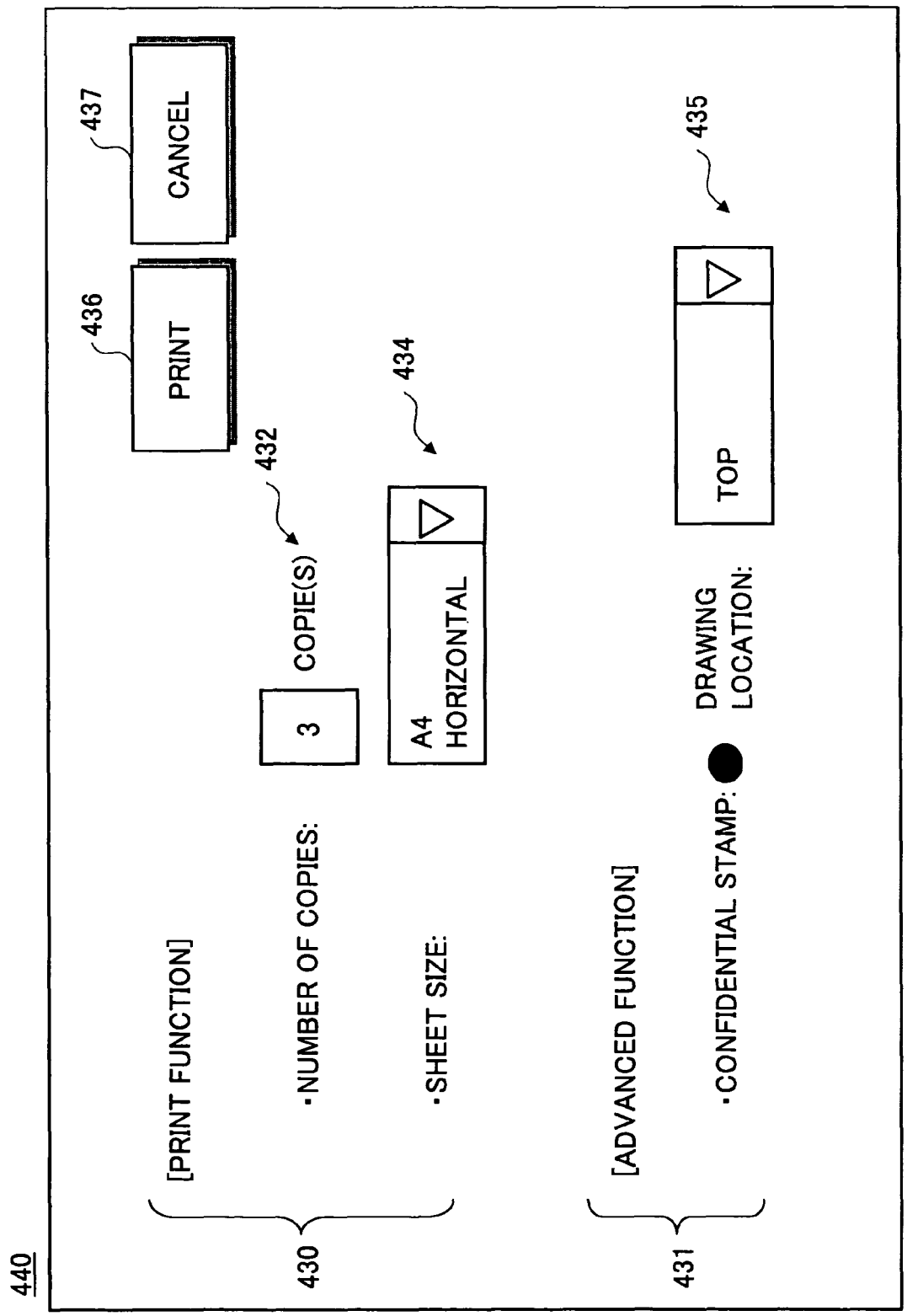

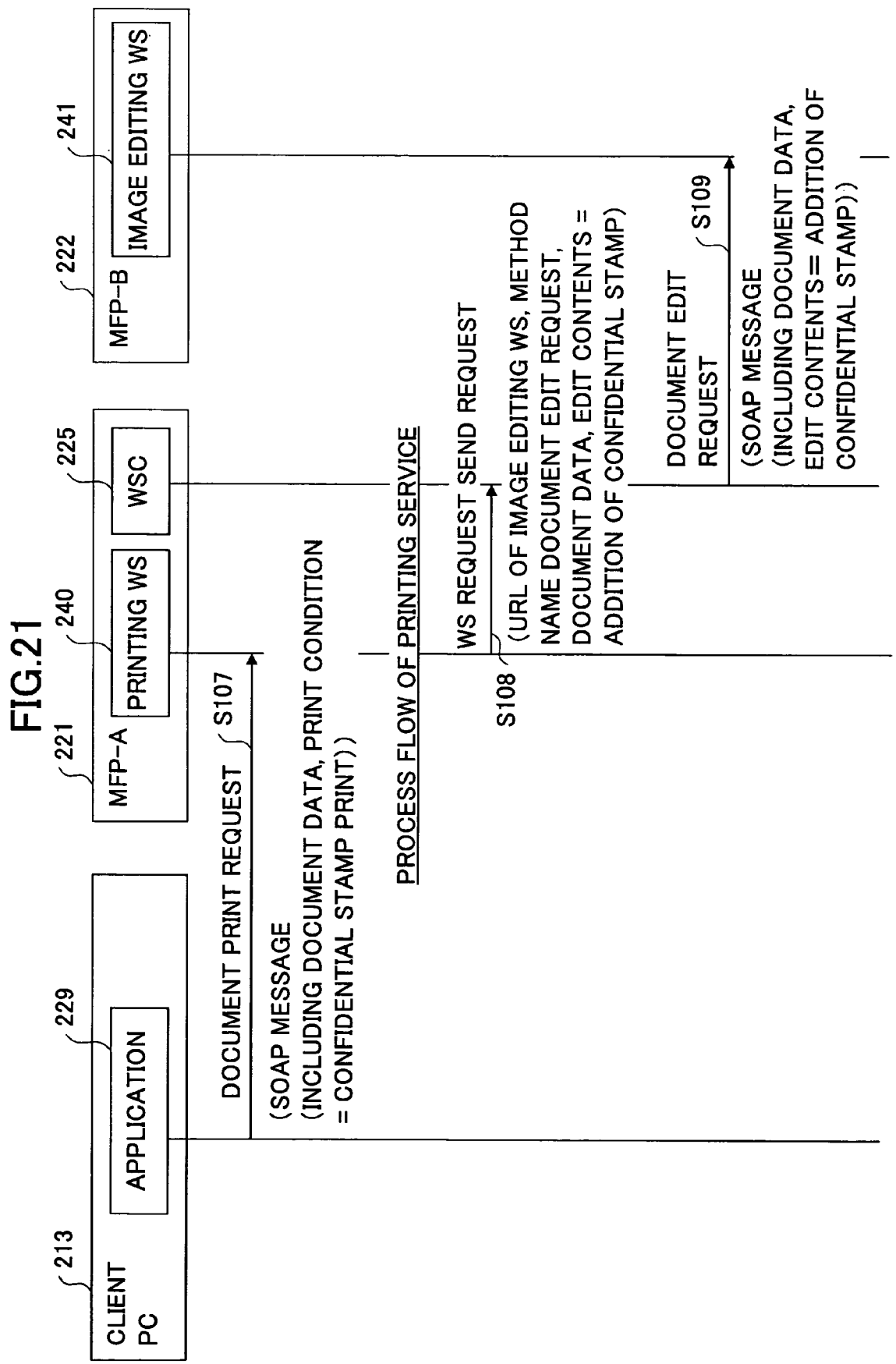

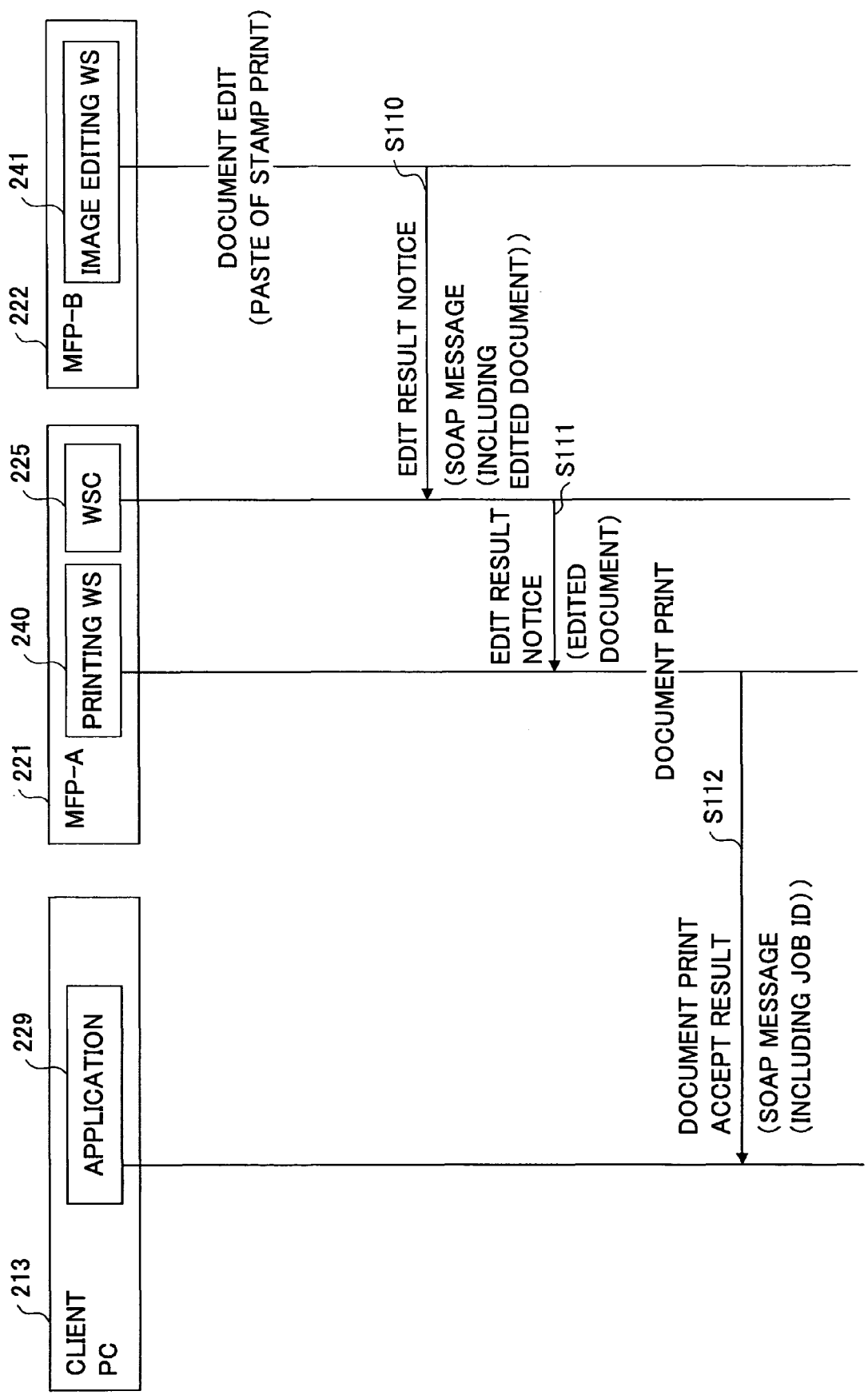

FIG.23 ~M17

```
<?xml version="1.0" encoding="UTF-8"?>
<SOAP-ENV:Envelope
  xmlns:SOAP-ENV="http://schemas.xmlsoap.org/soap/envelope/"
  xmlns:soap-enc="http://schemas.xmlsoap.org/soap/encoding/"
  xmlns:xsi="http://www.w3.org/2001/XMLSchema-instance"
  xmlns:xsd="http://www.w3.org/2001/XMLSchema"
  SOAP-ENV:encodingStyle="http://schemas.xmlsoap.org/soap/encoding/">
<SOAP-ENV:Body>
  <m:printByTicket
    xmlns:m="http://www.hoge.co.jp/xmlns/soap/print">
  <sessionId xsi:type="xsd:string">1234567890</sessionId>
  <docData xsi:type="xsd:binaryAttachment"><theSignedForm href="content.tiff"/></docData> ~450
  <printpropertyInfo xmlns:itt="http://www.hoge.co.jp/xmlns/soap/commontype" xmlns:soap-enc ="itt:property[2]">
    <item><name xsi:type="xsd:string">number_of_copies</name><value xsi:type="xsd:string">3</value></item> ~451
    <item><name xsi:type="xsd:string">size</name><value xsi:type="xsd:string">A4F</value></item> ~452
  </printpropertyInfo>
  <editpropertyInfo xmlns:itt="http://www.hoge.co.jp/xmlns/soap/commontype" xmlns:soap-enc ="itt:property[1]">
    <item><name xsi:type="xsd:string">with_stamp</name><value xsi:type="xsd:string">secret_stamp</value></item> ~453
  </editpropertyInfo>
  </m:printByTicket>
</SOAP-ENV:Body>
</SOAP-ENV:Envelope>
```

FIG.25

```
int
callWebService(
    char*    webServiceURL,         // IN: WEB SERVICE URL
    char*    webServiceName,        // IN: WEB SERVICE NAME
    char*    webServiceMethodName,  // IN: METHOD NAME
    char**   argumentList,          // IN: METHOD ARGUMENT
    char**   resultList,            // OUT: RESPONSE DATA
    int      error                  // OUT: ERROR INFORMATION
)
```

FIG.26

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/">
<SOAP-ENV:Body>
  <m:editByTicket
   xmlns:m="http://www.hoge.co.jp/xmlns/soap/imageEdit">
   <sessionId xsi:type="xsd:string">11234567890</sessionId>
   <location xsi:type="xsd:string">http://aaa.bbb.ccc/rdh/repository</location>
   <ticket xsi:type="xsd:string">jfowfnofjofk</ticket>
   <propertyInfo xmlns:soap-enc="http://schemas.xmlsoap.org/soap/encoding/"
    xmlns:itt="http://www.hoge.co.jp/xmlns/soap/commontype" xmlns:soap-enc ="itt:property[1]">
    <item>
     <name xsi:type="xsd:string">with_stamp</name>
     <value xsi:type="xsd:string">secret_stamp</value>    454
    </item>
   </propertyInfo>
  </m:editByTicket>
</SOAP-ENV:Body>
</SOAP-ENV:Envelope>
```

```
<?xml version="1.0" encoding="UTF-8"?>
<SOAP-ENV:Envelope
 xmlns:SOAP-ENV ="http://schemas.xmlsoap.org/soap/envelope/"
 xmlns:xsd="http://www.w3.org/2001/XMLSchema"
 xmlns:xsi="http://www.w3.org/2001/XMLSchema-instance">
<SOAP-ENV:Body>
 <ns1:editByTicketResponse
  SOAP-ENV:encodingStyle="http://schemas.xmlsoap.org/soap/encoding/"
  xmlns:ns1="http://www.hoge.co.jp/xmlns/soap/imageEdit">
  <returnValue xsi:type="xsd:binaryAttachment"><theSignedForm href="content.tiff"/></returnValue >    455
 </ns1:editByTicketResponse >
</SOAP-ENV:Body>
</SOAP-ENV:Envelope>
```
M19

FIG.28

```
<?xml version="1.0" encoding="UTF-8"?>
<SOAP-ENV:Envelope
 xmlns:SOAP-ENV ="http://schemas.xmlsoap.org/soap/envelope/"
 xmlns:xsd="http://www.w3.org/2001/XMLSchema"
 xmlns:xsi="http://www.w3.org/2001/XMLSchema-instance">
<SOAP-ENV:Body>
<ns1:printByTicketResponse
 SOAP-ENV:encodingStyle="http://schemas.xmlsoap.org/soap/encoding/"
 xmlns:ns1="http://www.hoge.co.jp/xmlns/soap/print">
<returnValue xsi:type="xsd:string">0987654321</returnValue>
                                        ─────┬─────
                                             456
</ns1:printByTicketResponse >
</SOAP-ENV:Body>
</SOAP-ENV:Envelope>
```

M20

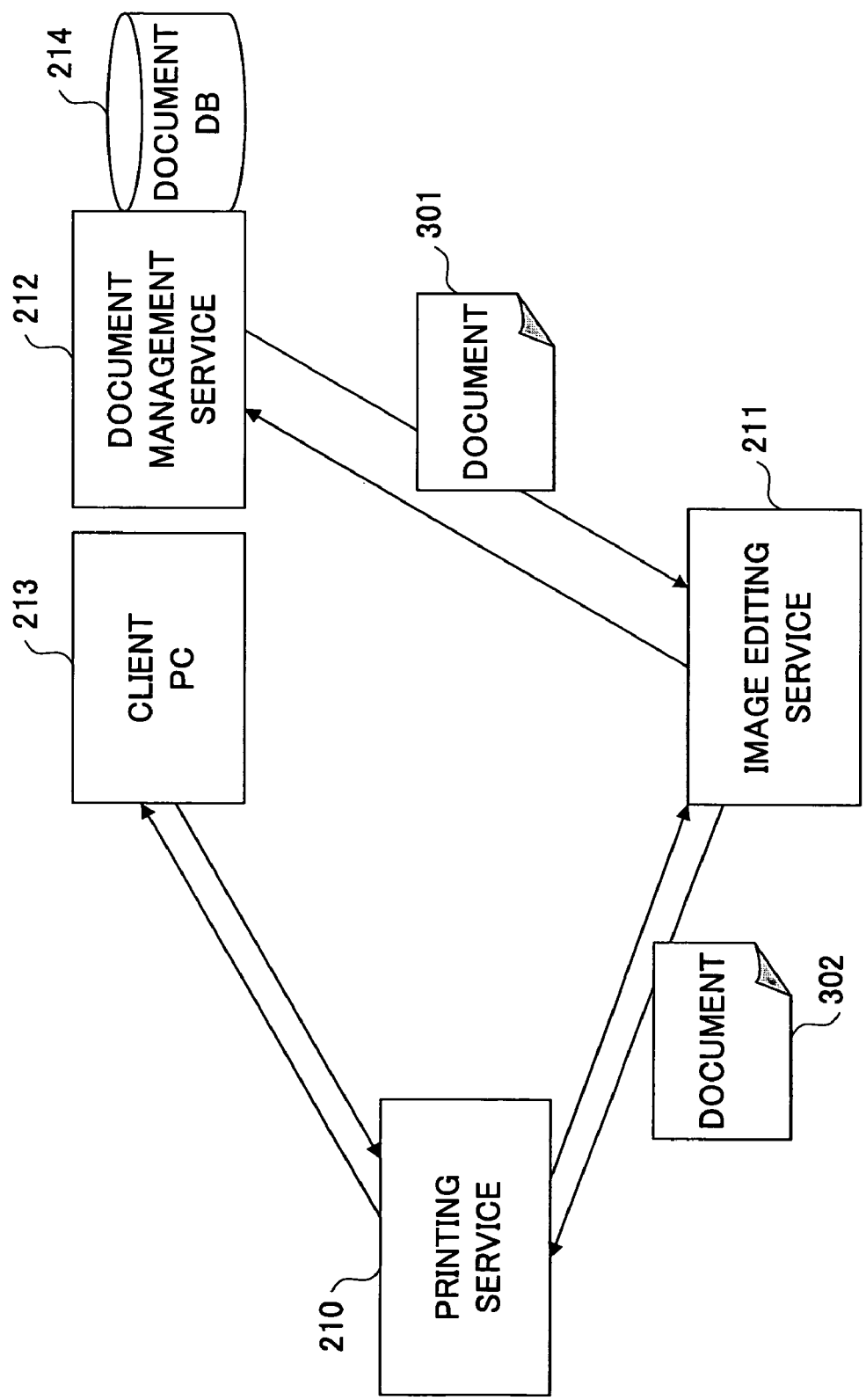

```
<?xml version="1.0" encoding="UTF-8"?>
<SOAP-ENV:Envelope
 xmlns:SOAP-ENV="http://schemas.xmlsoap.org/soap/envelope/"
 xmlns:soap-enc="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/">
<SOAP-ENV:Body>
<m:printByTicket
 xmlns:m="http://www.hoge.co.jp/xmlns/soap/print">
<sessionId xsi:type="xsd:string">1234567890</sessionId>
<location xsi:type="xsd:string">http://aaa.bbb.ccc.ddd/rdh/repository</location>
<ticket xsi:type="xsd:string">jfowfnofjofiC</ticket>   459
<printpropertyInfo xmlns:itt="http://www.hoge.co.jp/xmlns/soap/commontype" xmlns:soap-enc ="itt:property[2]">
<item><name xsi:type="xsd:string">number_of_copies</name><value xsi:type="xsd:string">3</value></item>
<item><name xsi:type="xsd:string">size</name><value xsi:type="xsd:string">A4F</value></item>
</printpropertyInfo>
<editpropertyInfo xmlns:itt="http://www.hoge.co.jp/xmlns/soap/commontype" xmlns:soap-enc ="itt:property[1]">
<item><name xsi:type="xsd:string">with_stamp</name><value xsi:type="xsd:string">secret_stamp</value></item>
</editpropertyInfo>
</m:printByTicket >
</SOAP-ENV:Body>
</SOAP-ENV:Envelope>
```

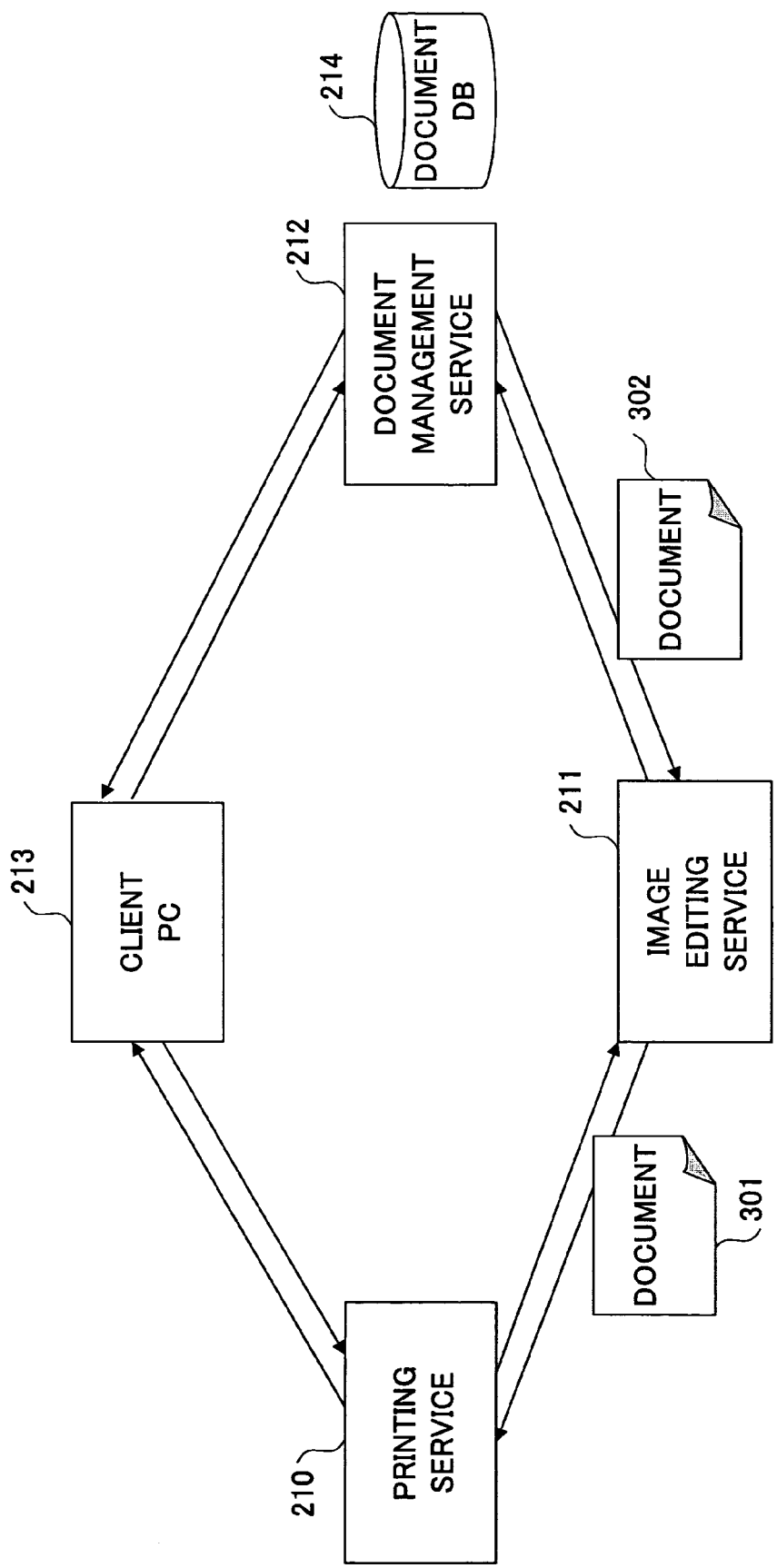

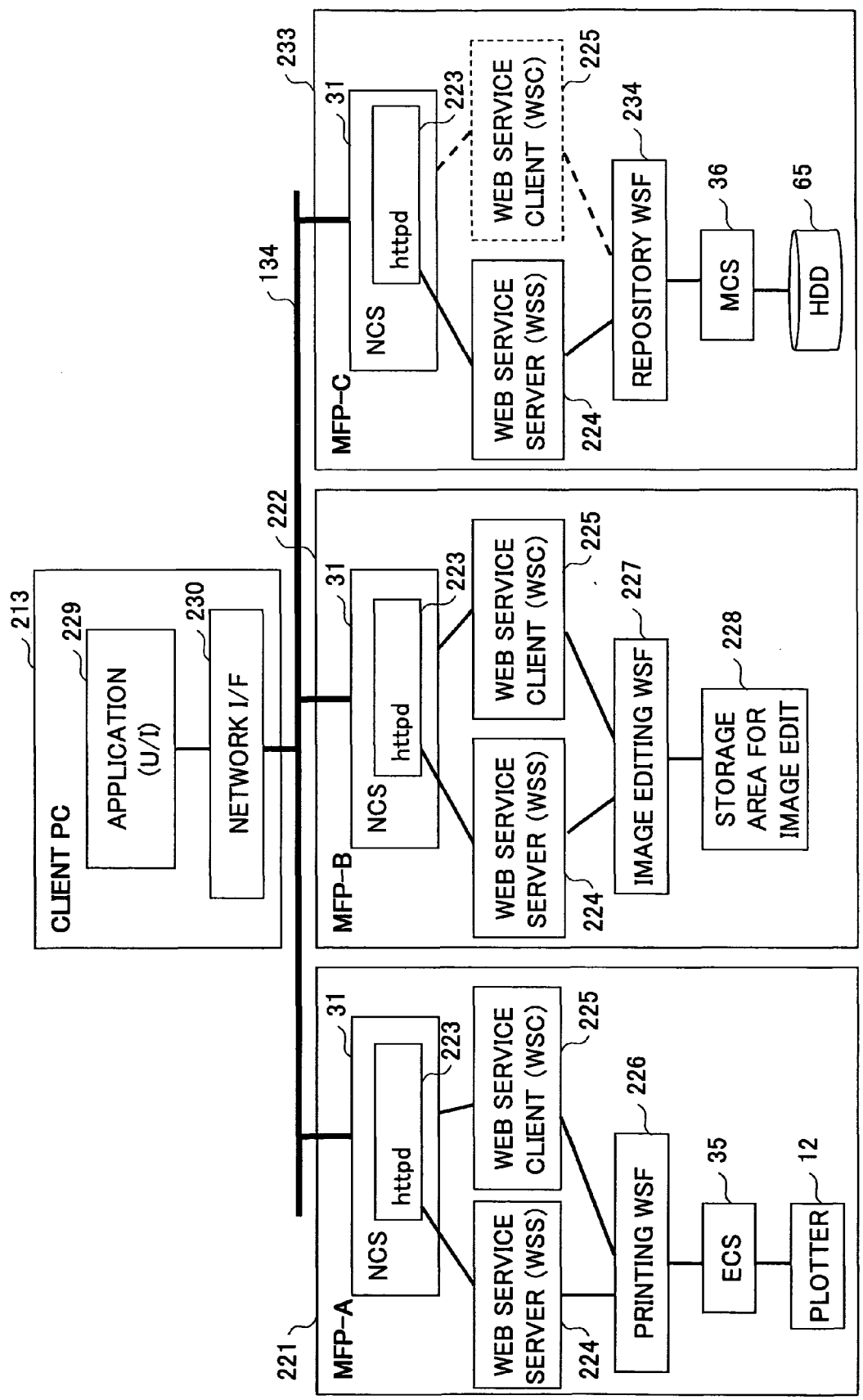

FIG.39

```
<?xml version="1.0" encoding="UTF-8"?>
<SOAP-ENV:Envelope
 xmlns:SOAP-ENV="http://schemas.xmlsoap.org/soap/envelope/"
 xmlns:SOAP-ENC="http://schemas.xmlsoap.org/soap/encoding/"
 xmlns:xsi="http://www.w3.org/2001/XMLSchema-instance"
 xmlns:xsd="http://www.w3.org/2001/XMLSchema"
 SOAP-ENV:encodingStyle="http://schemas.xmlsoap.org/soap/encoding/">
<SOAP-ENV:Body>
<m:getDocumentTicket
 xmlns:m="http://www.hoge.co.jp/xmlns/soap/repository">
<sessionId xsi:type="xsd:string">1234567890</sessionId>
<documentIds xsi:type="SOAP-ENC:Array" SOAP-ENC:arrayType="xsd:string[2]">
 <item xsi:type="xsd:string">1111</item>                } 457
 <item xsi:type="xsd:string">1112</item>
</documentIds>
</m:getDocumentTicket>
</SOAP-ENV:Body>
</SOAP-ENV:Envelope>
```

```
<?xml version="1.0" encoding="UTF-8"?>
<SOAP-ENV:Envelope
 xmlns:SOAP-ENV ="http://schemas.xmlsoap.org/soap/envelope/"
 xmlns:xsd="http://www.w3.org/2001/XMLSchema"
 xmlns:xsi="http://www.w3.org/2001/XMLSchema-instance" >
<SOAP-ENV:Body>
<ns1:getDocumentTicketResponse
  SOAP-ENV:encodingStyle="http://schemas.xmlsoap.org/soap/encoding/"
  xmlns:ns1="http://www.hoge.co.jp/xmlns/soap/repository">
<returnValue xsi:type= "xsd:base64Binary"> jfowfnofjofi </returnValue>
</ns1: getDocumentTicketResponse >
</SOAP-ENV:Body>
</SOAP-ENV:Envelope>
```

M23

458 (returnValue)

METHOD AND SYSTEM FOR GENERATING AND OUTPUTTING OUTPUT CONDITION PROPERTIES AND EDIT PROPERTIES CORRESPONDING TO A DOCUMENT

BACKGROUND OF THE INVENTION

1. Field of the Invention

The present invention generally relates to document outputting methods and document outputting systems for editing and outputting a document.

2. Description of the Related Art

Conventionally, a document can be printed out by using a printer or an MFP (Multi-Function Printer) connected to a network through a personal computer (hereinafter, called PC). Recently, in addition to the above functions, various services have been developed and provided as Web services. In this case, various services as the Web services are realized by an application loaded in the PC serving as a client with respect to the Web services.

As described above, conventionally, the application loaded in the client PC serves as the client with respect to each of the Web services. Thus, it is possible to architect the application suitable for various requirements. However, the application is required to send and receive information to/from each of the Web services, which is subject to inquire what kind of edit can be performed or to notify edit contents. That is, the client PC is required to communicate with a plurality of the Web services.

SUMMARY OF THE INVENTION

It is a general object of the present invention to provide document outputting methods and document outputting systems, in which the above-mentioned problems are eliminated.

A more specific object of the present invention is to provide a document outputting method and a document outputting system, in that client PC can effectively output a document and send and receive information concerning an edit and an output of a document to/from a Web service.

The above objects of the present invention are achieved by a document outputting method for editing a document managed by a document management service, which provides the document when an edit or an output of the document is permitted, the document outputting method including: receiving an output condition property candidate obtain request for obtaining an output condition property candidate including an edit property indicating edit contents executable for the document and an output property indicating an output method executable when the document is output; and providing the output condition property candidate to a request originator sending the output condition property candidate obtain request.

The above objects of the present invention are achieved by a document outputting system for providing an edit property indicating edit contents executable for a document and an output condition property candidate including an output property indicating an outputting method executable when the document is output, to a client requesting an output of the document, the document outputting system including: a document management service part providing the document when an edit or an output of the document is permitted; an output condition property candidate obtain request receiving part receiving an output condition property candidate obtain request for obtaining the output condition property from the client; and an output condition property candidate providing part providing the output condition property candidate to the client.

BRIEF DESCRIPTION OF THE DRAWINGS

In the following, embodiments of the present invention will be described with reference to the accompanying drawings.

FIG. 8 is a diagram showing an example of a print property according to the first embodiment of the present invention;

FIG. 9 is a diagram showing an example of an edit property according to the first embodiment of the present invention;

FIG. 12 is a diagram showing a first process according to the first embodiment of the present invention;

FIG. 13 is a diagram showing a SOAP message in a case in that a client PC indicates an image editing service, according to the first embodiment of the present invention;

FIG. 14 is a diagram showing a SOAP message in a case in that the image editing service is predetermined beforehand to use, according to the first embodiment of the present invention;

FIG. 15 is a diagram showing an example of the print condition property candidate according to the first embodiment of the present invention;

FIG. 16 is a diagram showing another example the print condition property candidate according to the first embodiment of the present invention;

FIG. 18 is a diagram showing an example of a SOAP message including an image editing service candidate according to the first embodiment of the present invention;

FIG. 19 is a diagram showing another SOAP message including the edit capability according to the first embodiment of the present invention;

FIG. 20 is a diagram showing a screen to set a print function and an advanced function, according to the first embodiment of the present invention;

FIG. 21 is a diagram showing a sequence flow for explaining the process for printing a document according to the first embodiment of the present invention;

FIG. 22 is a diagram showing the sequence flow for explaining the process for printing a document according to the first embodiment of the present invention;

FIG. 23 is a diagram showing an example of the SOAP message informed by a document print request according to the first embodiment of the present invention;

FIG. 25 is a diagram showing a prototype of a function used by in step S108 in FIG. 21, according to the first embodiment of the present invention;

FIG. 26 is a diagram showing a SOAP message showing a document edit request according to the first embodiment of the present invention;

FIG. 27 is a diagram showing a SOAP message showing an edit result notice according to the first embodiment of the present invention;

FIG. 28 is a diagram showing a SOAP message for a document print accept result according to the first embodiment of the present invention;

FIG. 29 is a diagram showing a system configuration according to a second embodiment of the present invention;

FIG. 34 is a diagram showing a SOAP message for a document print request according to the second embodiment of the present invention;

FIG. 35 is a block diagram showing a system configuration according to a third embodiment of the present invention;

FIG. 36 is a block diagram showing a functional configuration according to the third embodiment of the present invention;

FIG. 39 is a diagram showing a SOAP message for a document ticket create request according to the third embodiment of the present invention;

FIG. 40 is a diagram showing the SOAP message for a response with respect to the document ticket create request according to the third embodiment of the present invention;

DESCRIPTION OF THE PREFERRED EMBODIMENTS

In the following, embodiments of the present invention will be described with reference to the accompanying drawings.

In the embodiments of the present invention, a document processing system is described as an output information providing system, and a case in that an output of a document is a print will be described. Accordingly, "output" is read as "print". For example, in the following embodiments, an output property can be read as a print property. Also, in the following, for example, "obtain" includes a meaning of "generate".

Moreover other outputs, for example, an output by a facsimile transmission, a distribution to other computers, and a like can be considered.

Furthermore, in the following, "image" and "document" are used. A document includes one or more images and bibliographic information. Accordingly, in the following embodiments, to edit and print out a document expresses to edit and print out an image included in the document. Even if an expression of editing and printing out a document is used, the image included in the document can be edited and printed out.

[Overview]

Figure 1:
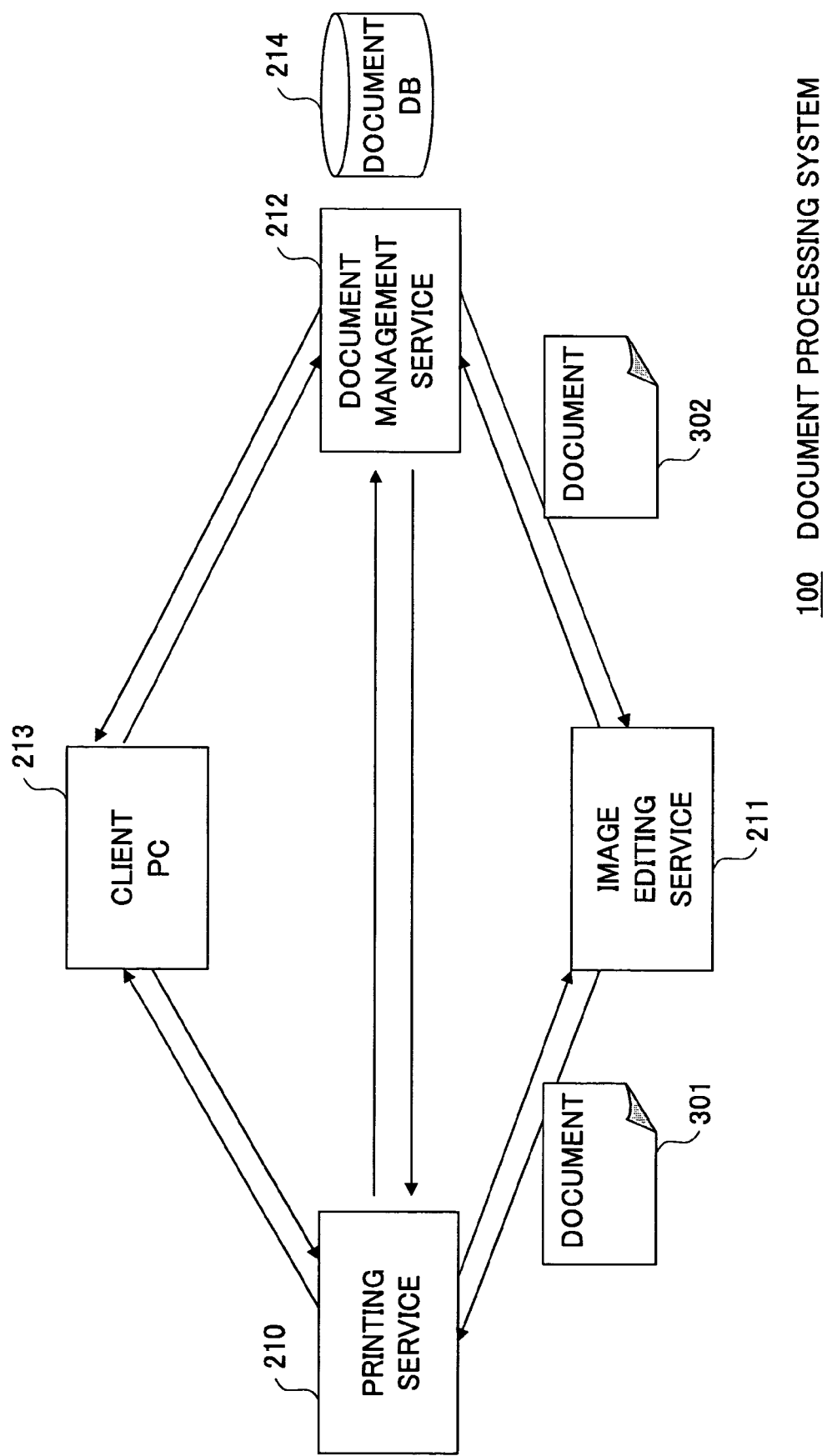
FIG. 1 is a block diagram showing a configuration of a document processing system according to the present invention.

First, the document processing system according to the present invention will be described with reference to FIG. 1. In FIG. 1, a document processing system 100 includes a printing service 210 as a Web service, an image editing service 211 as a Web service, a document management service 212 as a Web service, and at least one client PC (Personal Computer) 213, which can communicate with each other. As shown in FIG. 1, documents 301 and 302 are sent and received among services 210, 211, and 212. The document management service 212 includes a document DB (database) 214.

The client PC 213 is a personal computer which a user uses to edit and/or print out a document, and includes an application to use the above-described services 210, 211, and 212.

The printing service 210 receives a document print request from the client PC 213, prints out the document, and provides a print property showing a printing method executable when printing out the document in response to a request sent from the client PC 213.

The image editing service 211 is a service for editing a document, and provides an edit property showing edit contents being executable with respect to the document. The document management service 212 manages the document by using the document DB 214.

As described above, the Web services 210, 211, and 212 send and receive information such as the document, the edit property, and the like to/from each other.

As described above, the printing service 210, the image editing service 211, and the document management service 212 may not be specific apparatuses, but represent elements of the document processing system 100. Accordingly, the printing service 210, the image editing service 211, and the document management service 212 may be implemented in different apparatuses, respectively or in a single apparatus.

Therefore, in each of the following embodiments, different combinations of the Web services and apparatuses will be described. Prior to each explanation of the following embodiment, a multi-functional apparatus implementing the above-described Web services 210, 211, and 212, and the client PC 213 will be described according to the present invention.

Figure 2:
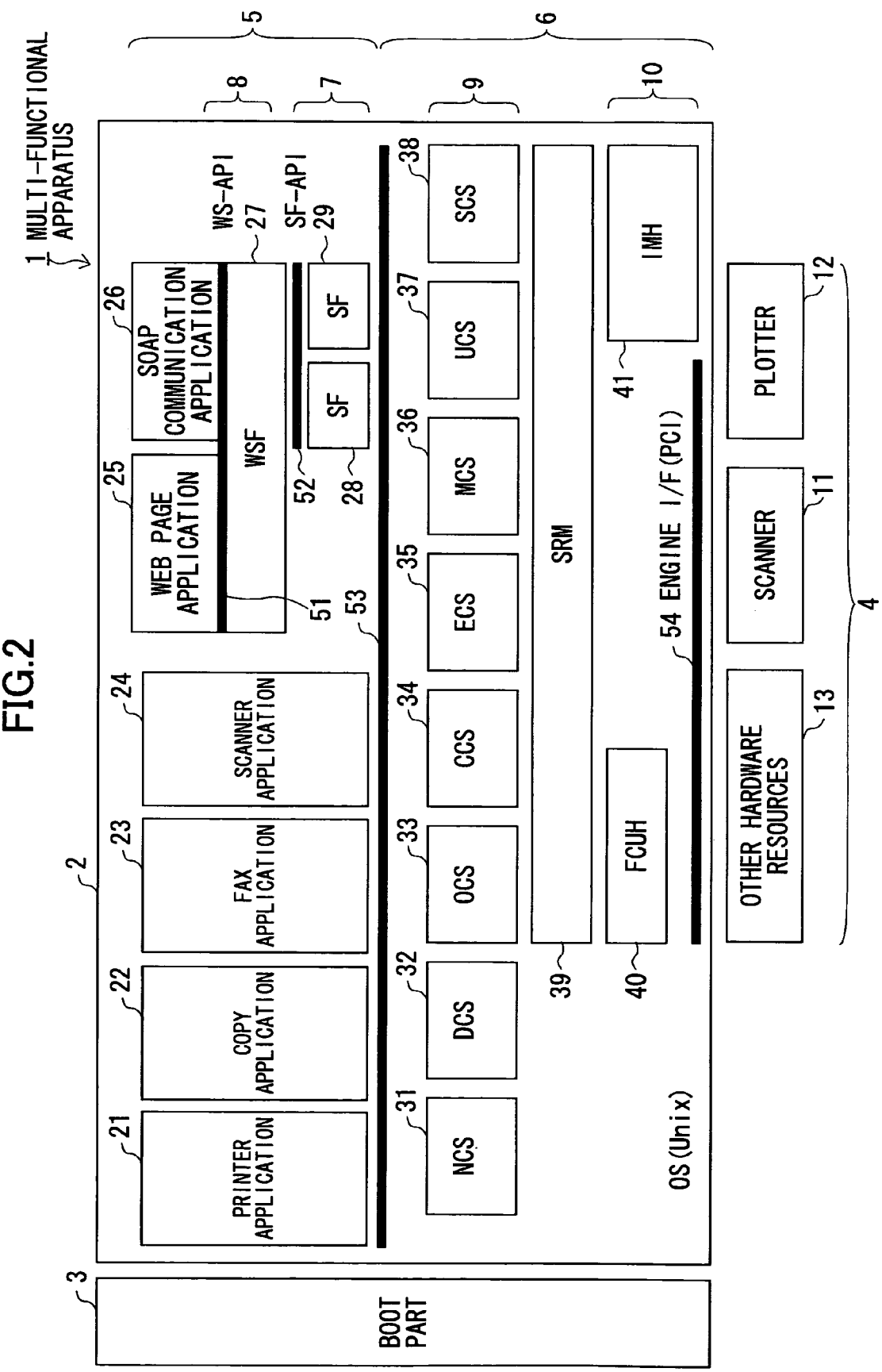
FIG. 2 is a block diagram showing a functional configuration of a multi-functional apparatus according to the present invention.

FIG. 2 is a block diagram showing a functional configuration of the multi-functional apparatus according to the present invention. The multi-functional apparatus 1 includes a software group 2, a boot part 3, and hardware resources 4.

The boot part 3 is executed first when the multi-functional apparatus 1 is turned on, and activates an application layer 5, and a platform layer 6. For example, the boot part 3 reads out programs of the application layer 5 and the platform layer 6 from an HDD (Hard Disk Drive) or a like, and transfers the programs read out from the HDD or the like to a memory area. The hardware resources 4 include a scanner 11, a plotter 12, and another hardware resource 13 such as an ADF (Auto Document Feeder).

The software group 2 includes the application layer 5 and the platform layer 6 being activated on an operating system (hereinafter, called OS) such as UNIX™. The application layer 5 includes programs to conduct each specific process for a user service concerning an image formation such as a printer, a copier, a facsimile, a scanner, and a like.

The application layer 5 includes a printer application 21 being an application for the printer, a copy application 22 being an application for the copy, a FAX application 23 being an application for the facsimile, a scanner application 24 being an application for the scanner, a WEB page application 25, a SOAP (Simple Object Access Protocol) communication application 26, at least one or more common function (hereinafter, called SFs (Service Functions)) 28 and 29, and a WEB service function (hereinafter, called WSF) provided between the WEB page application 25 and the SOAP communication application 26, and the SFs 28 and 29.

The WSF 27 includes an application program interface (hereinafter, called WS-API) 51 to receive a process request from the WEB page application 25 and the SOAP communication application 26 by functions being defined beforehand. Also, the SFs 28 and 29 include an application program interface (hereinafter, called SF-API) 52 to receive a process request from the WSF 27 by a function being defined beforehand.

When the WSF 27 receives the process request from the WEB page application 25 and the SOAP communication application 26 through the WS-API 51, the WSF 27 selects one of the SFs 28 and 29 in response to the process request. The WSF 27 sends the process request received through the WS-API 51 to the selected one of the SFs 28 and 29 through the SF-API 52. When the selected one of the SFs 28 and 29 receives the process request through the SF-API 52, the selected one of the SFs 28 and 29 conducts a process corresponding to the process request. The SOAP communication application 26 generates and interprets a SOAP message as a server of the Web service 210, 211, or 212.

The platform layer 6 includes a control service layer 9 for interpreting the process request received from the application layer 6 and for creating an acquisition request for acquiring the hardware resources 4, a system resources manager (hereinafter, called SRM) 39 for mediating the acquisition request received from the control service layer 9 by managing one or more hardware resources 4, and a handler layer 10 for managing the hardware resources 4 in response to the acquisition request received from the SRM 39.

The control service layer 9 includes at least one of service modules such as a network control service (hereinafter, called NCS) 31, a delivery control service (hereinafter, called DCS) 32, an operation panel control service (hereinafter, called OCS) 33, a certification control service (hereinafter, called CCS) 34, an engine control service (hereinafter, called ESC) 35, a memory control service (hereinafter, called MCS) 36, a user information control service (hereinafter, called UCS) 37, a system control service (hereinafter, called SCS) 38, and a like.

The platform layer 6 includes an application program interface (hereinafter, called API) 53 for receiving the process request from the application layer 6 by a function being defined beforehand. The OS executes software for the application layer 5 and the platform layer 6 as processes in parallel.

A process of the NCS 31 provides a service for applications requiring a network I/O to use in common. The process of the NCS 31 distributes data received from each protocol at a network side to a relative application, and intermediates to send data from each application to the network side.

For example, the NCS 31 controls a data communication with a network device connected through a network in accordance with an HTTP (HyperText Transfer Protocol) by an httpd (HyperText Transfer Protocol Daemon).

A process of the DSC 32 controls a distribution of accumulated documents. A process of the OCS 33 controls an operation panel, which is an information transmitting part between an operator and a main unit control of the multi-functional apparatus 1. A process of the CCS 34 conducts a process concerning a user certification.

A process of the ECS 35 controls an engine part such as the scanner 11, the plotter 12, and the another hardware resource 13. A process of the MCS 36 acquires and releases a memory area, and conducts a memory control to control use of the HDD. A process of UCS 37 manages user information.

A process of the SCS 38 conducts processes such as an application management, an operation panel control, a system screen display, an LED display, a hardware resource management, an interruption control of the applications, and a like.

A process of the SRM 39 conducts the system control with the SCS 38, and manages the hardware resources 4. For example, the process of the SRM 39 mediates the acquisition request from an upper layer using the hardware resources 4, and conducts an execution control.

In detail, the process of the SRM 39 determines whether or not one of the hardware resources 4, which corresponds to the acquisition request, is available (is used by another acquisition request). If available, the process of the SRM 39 informs the upper layer that the one of the hardware resources 4 to which the acquisition request is made is available. Also, the process of the SRM 39 schedules to use the hardware resources 4 with respect to the acquisition request received from the upper layer, and directly conducts various operations in accordance with request contents (for example, a sheet feed and an image creating operation, a memory acquisition, a file generation, and a like).

A handler layer 10 includes a FAX control unit handler (hereinafter, called FCUH) 40 for managing a FAX control unit (hereinafter, called FCU), which will be described later, and an image memory handler (hereinafter, called IMH) 41 for assigning the memory area to a process and managing the memory area being assigned to the process. The SRM 39 and the FCUH 40 conduct a process request with respect to the hardware resources 4 by using an engine I/F (InterFace) 54, which can send the process request with respect to the hardware resources 4 by a function being defined beforehand.

The multi-functional apparatus 1 can centralize and process in common among the applications at the platform layer 6. Next, a hardware configuration of the multi-functional apparatus 1 will be described with reference to FIG. 3.

Figure 3:
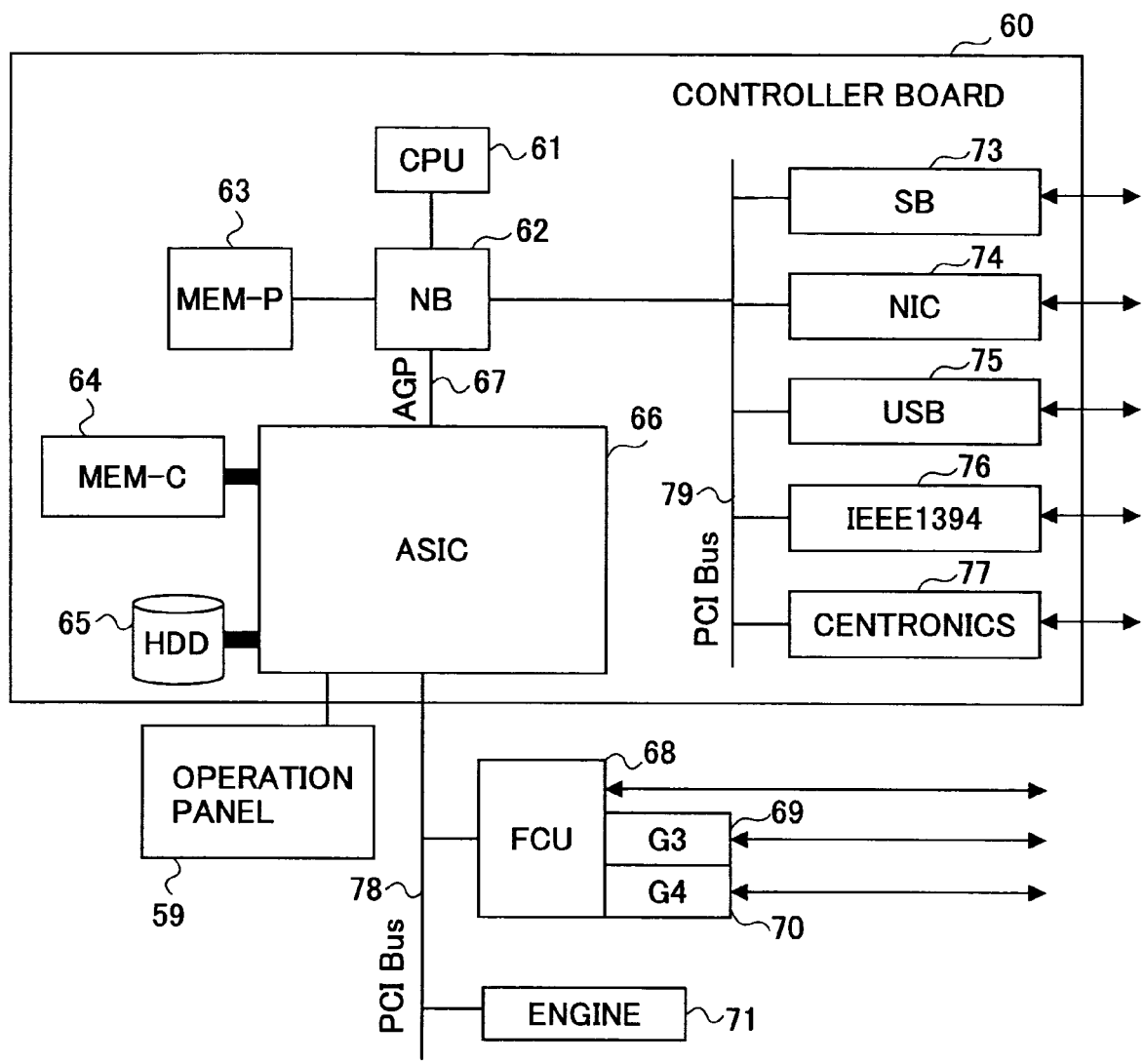
FIG. 3 is a block diagram showing a hardware configuration of the multi-functional apparatus according to the present invention.

FIG. 3 is a block diagram showing the hardware configuration of the multi-functional apparatus according to the present invention. The multi-functional apparatus 1 includes a controller board 60, an operation panel 59, the FCU 68, and an engine 71. Moreover, the FCU 68 includes a G3 standard support unit 69, and a G4 standard support unit 70.

Moreover, the controller board 60 includes a CPU (Central Processing Unit) 61, an ASIC (Application Specific Integrated Circuit) 66, an HDD (Hard Disk Drive) 65, a system memory (MEM-P) 63, a local memory (MEM-C) 64, a north bridge (hereinafter, called NB) 62, a south bridge (hereinafter, called SB) 73, a NIC (Network Interface Card) 74, a USB (Universal Serial Bus) device 75, an IEEE 1394 device 76, and a Centronics™ device 77.

The operation panel 59 is connected to the ASIC 66 of the controller board 60. The SB 73, the USB device 75, the IEEE 1394 device 76, and the Centronics™ device 77 are connected to the NB 62 through a PCI bus 79.

The FCU 68 and the engine 71 are connected to the ASIC 66 of the controller board 60 through a PCI bus 78.

The controller board 60 connects to the local memory (MEM-C) 64 of the ASIC 66 and the HDD 65, and also connects to the CPU 61 and the ASIC 66 through the NB 62 of a CPU chip set. As described above, since the CPU 61 and the ASIC 66 are connected through the NB 62, this hardware configuration can be realized even if an interface of the CPU 61 is not opened to the public.

Moreover, instead of connecting the ASIC 66 and the NB 62 to each other through a PCI bus, the ASIC 66 and the NB 62 are connected through an AGP (Accelerated Graphics Port) 67. As described above, in order to control executions of one or more processes forming the application layer 5 and the platform layer 6, the ASIC 66 and the NB 62 are connected to each other through the AGP 67 but not a PCI bus. Accordingly, it is possible to prevent from degrading performance of the multi-functional apparatus 1.

The CPU 61 controls the entire multi-functional apparatus 1. The CPU 61 activates and executes the NCS 31, the DCS 32, the OCS 33, the CCS 34, the ECS 35, the MCS 36, the UCS 37, the SCS 38, the SRM 39, the FCUH 40, and the IMH 41 as processes on the OS, respectively. Moreover, the CPU 61 activates and executes the printer application 21, the copy application 22, the FAX application 23, the scanner application 24, the Web page application 25, and the SOAP communication application 26, which form the application layer 5.

The NB 62 is a bridge to connect the CPU 61, the system memory 63, the SB 73, and the ASIC 66 to each other. The system memory 63 is a memory used as an drawing memory of the multi-functional apparatus 1. The SB 73 is a bridge to connect the NB 62, the PCI bus 79, and a peripheral device to each other. Also, the local memory 64 is a memory used as a drawing buffer for a copy, a coding buffer, and a like.

The ASIC 66 is an IC (Integrated Circuit) for an image process including hardware elements for the image process. Also, the HDD 65 is a storage for accumulating image data, document data, programs, font data, forms, and a like. The operation panel 59 receives an input operation from a user and also displays information for the user.

Next, a hardware configuration of the client PC 213 in FIG. 1 will be described with reference to FIG. 4.

Figure 4:
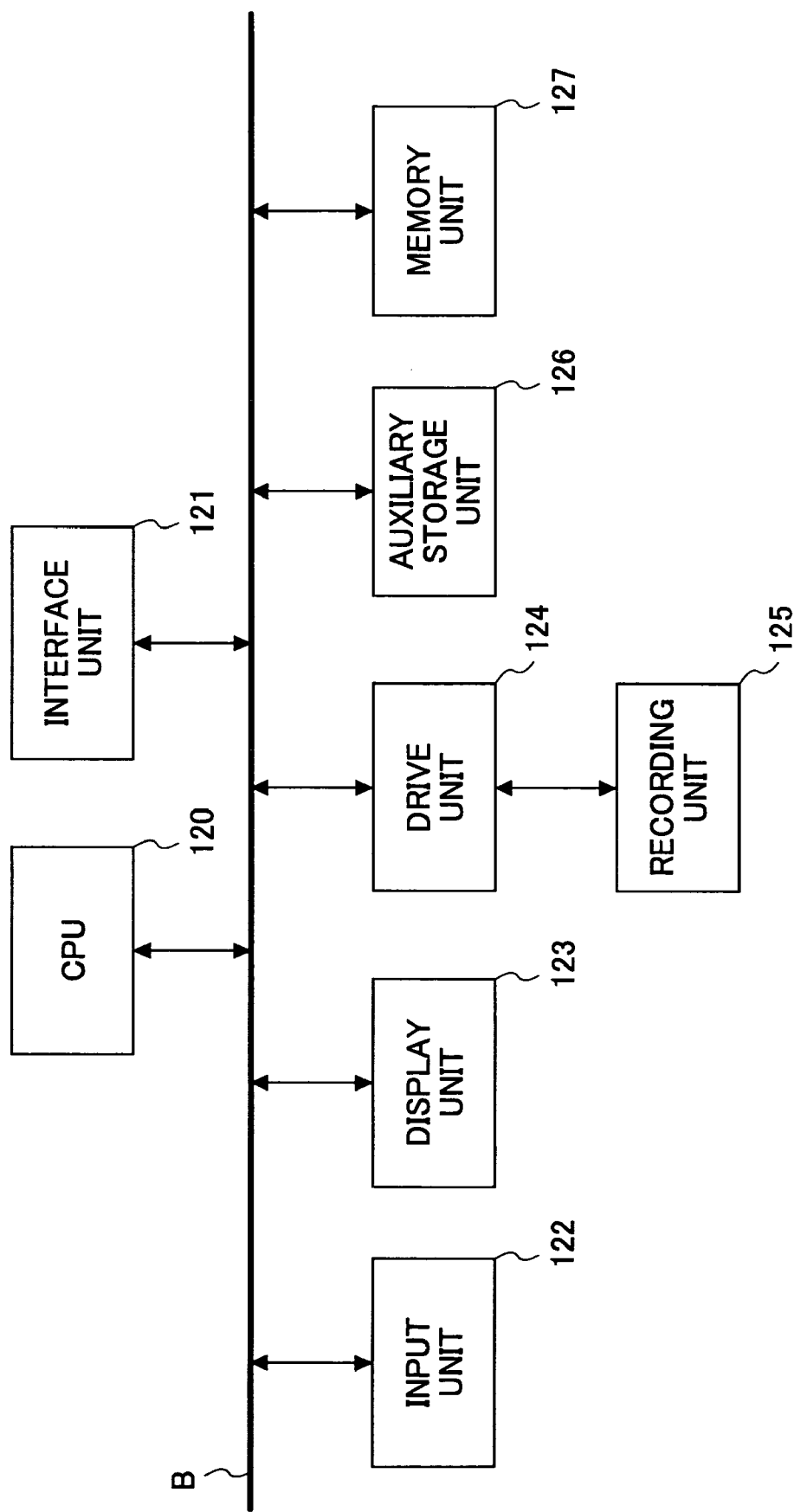
FIG. 4 is a block diagram showing a hardware configuration of a client PC according to the present invention.

As shown in FIG. 4, in the hardware configuration in FIG. 4, the client PC 213 includes an input unit 122, a display unit 123, a drive unit 124 for a recording medium 125, an auxiliary storage unit 126, a memory unit 127, a CPU 120, and an interface unit 121.

The input unit 122 includes a keyboard and a mouse, and is used for a user to input various operation signals to the client PC 213. The display unit 123 displays various screens and data necessary for the user to operate the client PC 213. The interface unit 121 is an interface to connect the client PC 213 to a network or to connect to another device. For example, the interface unit 121 includes the NIC (Network Interface Card), a modem, a USB (Universal Serial Bus), and a like.

A program for operating the client PC 213 is provided by the recording medium 125 such as a CD-ROM (Compact Disk-Read Only Memory) or a like or by downloading through the network. Also, the recording medium 125 is set to the drive unit 124, and then data and the program are installed into the auxiliary storage unit 126 through the drive unit 124.

The auxiliary storage unit 126 stores the data and the program, necessary files, and a like. The memory unit 127 reads out and stores the program from the auxiliary storage unit 126 when the computer system is activated. The CPU 120 executes a process in accordance with the program read out from the auxiliary storage unit 126 and stored in the memory unit 127.

In the following, eight embodiments will be described. In the following explanations, parts that have been explained will be omitted. Also, parts that are the same as the ones are previously described by the same reference numerals and the explanation thereof will be omitted. For example, the NCS is denoted by the same reference numeral 31.

First Embodiment

In a first embodiment, most explanation will be about a process concerning a print condition property candidate. A process concerning a print will be described after the process concerning the print condition property candidate is described.

Figure 5:
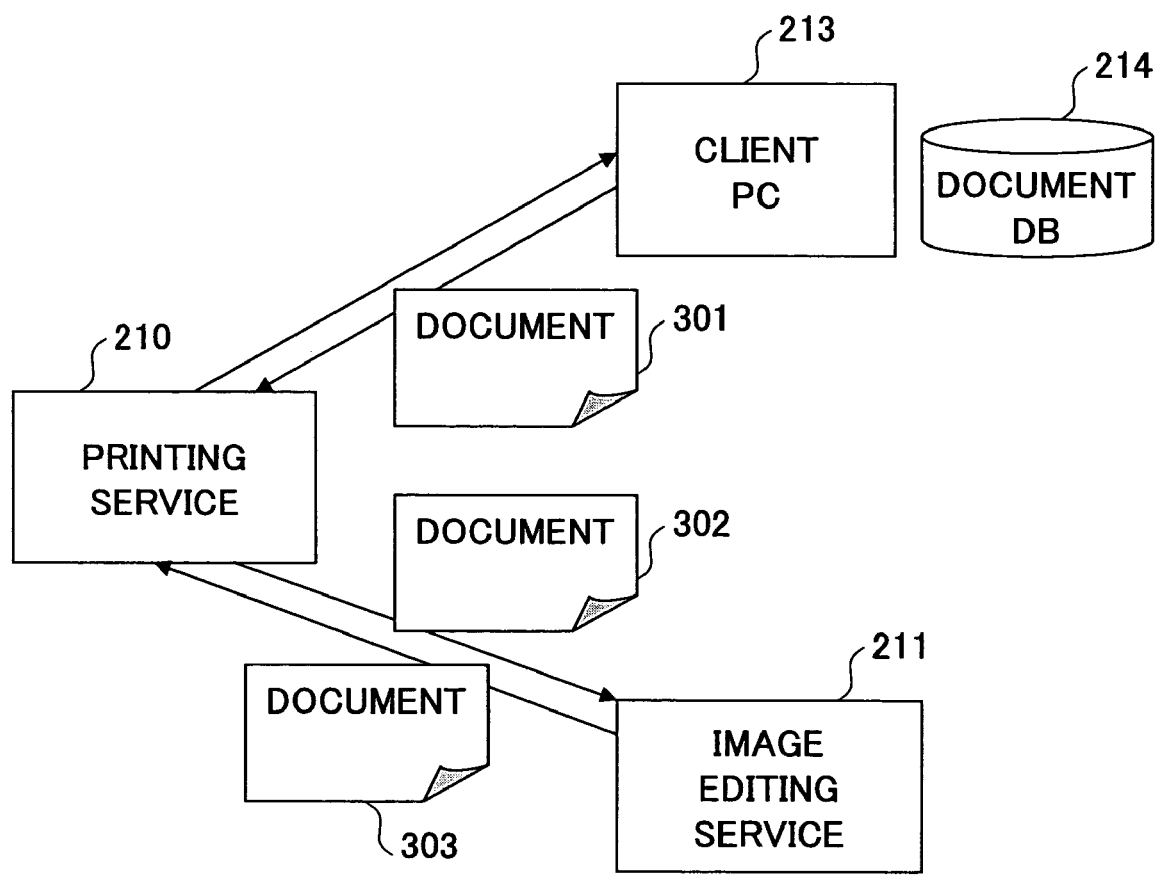
FIG. 5 is a block diagram showing a system configuration according to a first embodiment of the present invention.

FIG. 5 is a block diagram showing a system configuration according to the first embodiment of the present invention. In the system configuration shown in FIG. 5, a client PC 213, a printing service 210, an image editing service 211, and a document DB 214, and documents 301, 302, and 303 are shown.

As shown in FIG. 5, in the first embodiment, a document subject to print out or edit is included in the client PC 213. Moreover, in FIG. 5, three documents 301, 302, and 303 are shown as documents to send and receive. Accordingly, in the first embodiment, sending and receiving the documents is performed three times.

Figure 6:
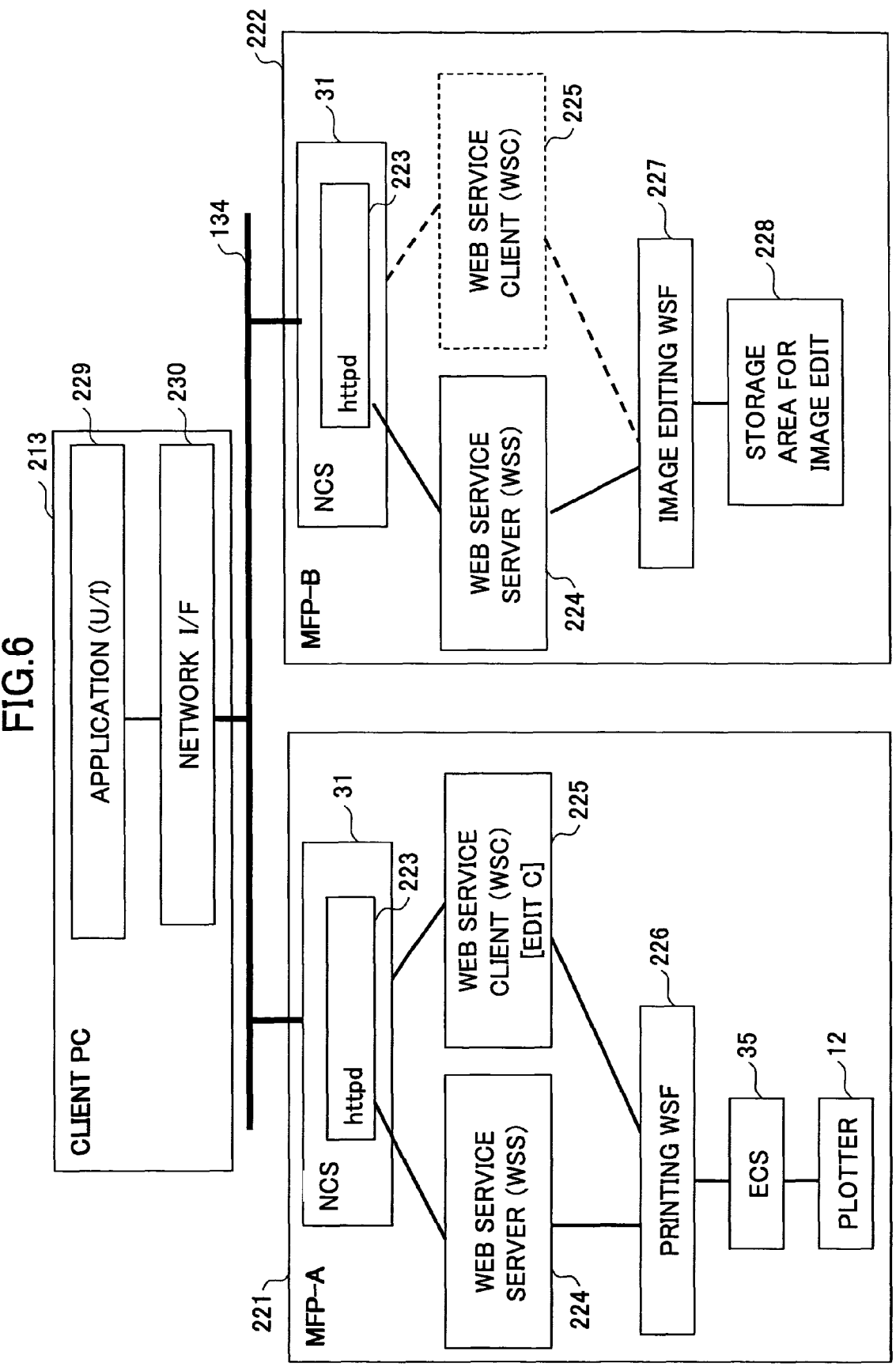
FIG. 6 is a block diagram showing a functional configuration in the system configuration according to the first embodiment of the present invention.

Next, a functional configuration will be described with reference to FIG. 6 in detail. FIG. 6 is a block diagram showing the functional configuration in the system configuration according to the first embodiment of the present invention. In FIG. 6, the client PC 213, an MFP-A 221 as one multi-functional apparatus 1, and an MFP-B 222 as another multi-functional apparatus 1 are shown.

The client PC 213 includes an application 229 having a user interface and a network interface 230.

The MFP-A 221 includes the NCS 31 having the httpd 223, a Web service server (WSS) 224, a Web service client (WSC) 225, a printing WSF 226, the ECS 35, and the plotter 12. Also, the MFP-B 222 includes the NCS 31 having the httpd 223, the Web service server (WSS) 224, an image editing WSF 227, and a storage area 228 for an image edit.

As described above, the application 229 is used when a user prints out a document. The application 229 has a scheme for changing the user interface in response to a tag in an XML (extensible Markup Language) sentence showing available service. This available service is shown by the print condition property candidate, which will be described later.

The Web service server (WSS) 224 converts a SOAP request message sent from a Web service client such as the client PC 213 into an execution request of the Web service function (hereinafter, called WSF), and sends the execution request to a specific WSF. The Web service server (WSS) 224 converts an execution result received from the WSF in the MFP-A 221 (MFP-B 222) into a SOAP response message, and sends the SOAP response message to the Web service client (client PC 213) that sent the SOAP request message.

The Web service client (WSC) 225 converts the execution request of the Web service sent from the Web service or the application in the MFP-A 221 (MFP-B222) into the SOAP request message, and sends the SOAP request message to a specific Web service. The Web service client (WSC) 225 analyses the SOAP response message sent from the Web service located in the network, and sends a result to the Web service or the application in the MFP-A 221 (MFP-B 222), which sent the SOAP request message. In the first embodiment, the Web service client (WSC) 225 provided in the MFP-B 222 is not used.

The printing WSF 226 prints out a document by using the ECS 35. The image editing WSF 227 edits an image. For example, the storage area 228 for the image edit is an area which is temporarily provided in the HDD 65, the system memory 63, or the local memory 64.

In the above-described first embodiment, the Web service server (WSS) 224 and the Web service client (WSC) 225 in FIG. 6 correspond to the Web page application 25 and the SOAP communication application 26 in FIG. 2, respectively.

Figure 7:
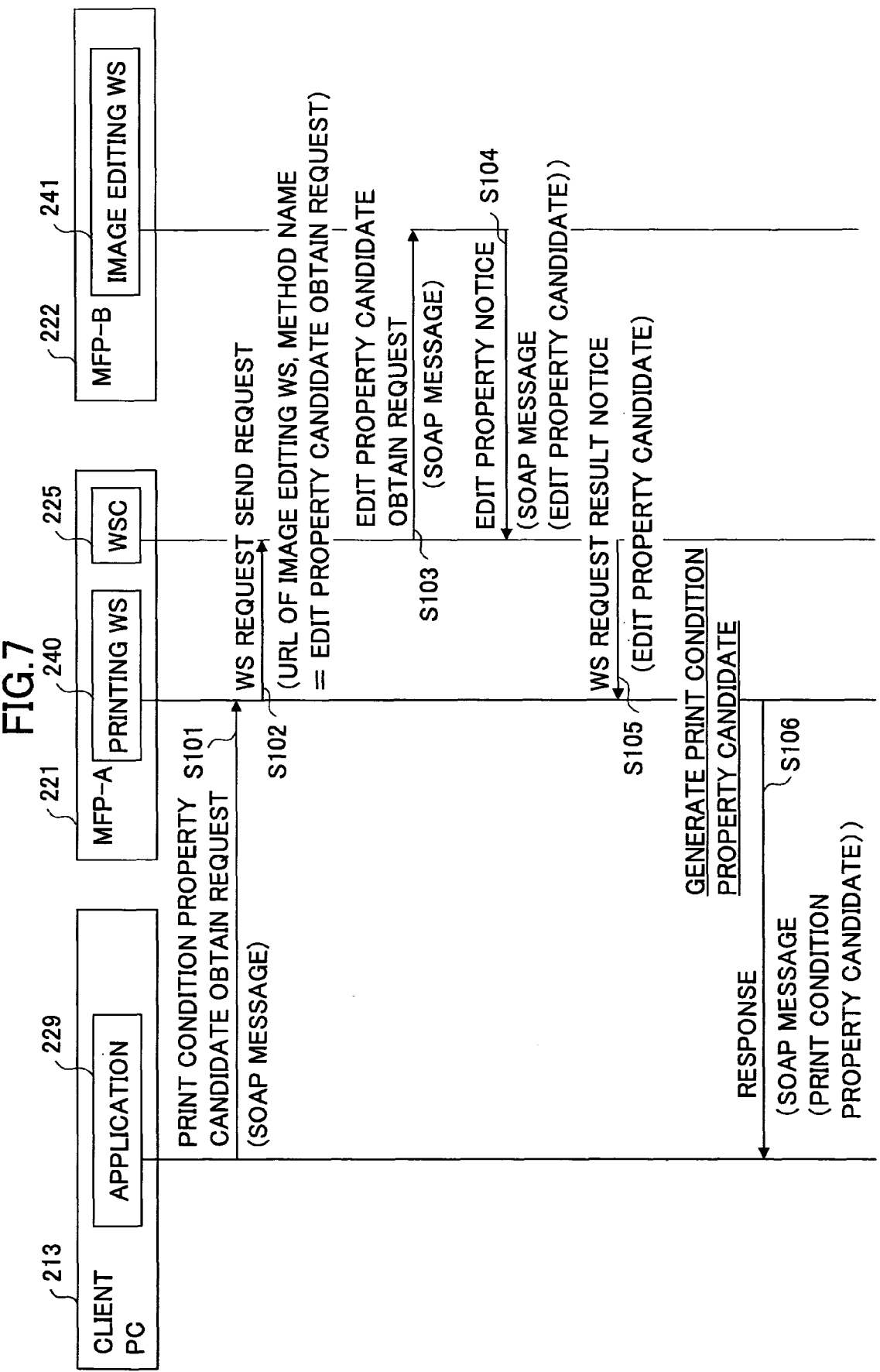
FIG. 7 is a diagram showing a sequence flow according to the first embodiment of the present invention.

Next, a sequence flow for obtaining the print condition property candidate will be described with reference to FIG. 7. FIG. 7 is a diagram showing the sequence flow according to the first embodiment of the present invention. In the sequence flow in FIG. 7, a sequential process, which is conducted among the client PC 213, the MFP-A 221, and the MFP-B 222, are shown. In FIG. 7, a printing WS 240 collectively represents the Web service server (WSS) 224 and the printing WSF 226 in the MFP-A 221 in FIG. 6. Also, an image editing WS 241 collectively represents the Web service server (WSS) 224 and the image editing WSF 227 in the MFP-B 222 in FIG. 6.

In addition, the sequential process in the sequence flow shown in FIG. 7 is a process for obtaining the print condition property candidate. This print condition property candidate includes an edit property showing the edit contents executable for a document, and a print property showing a printing method executable when the document is printed out. The property and the print property will be described later.

The sequence flow will be described. In step S101, the client PC 213 informs a print condition property candidate obtain request, which is an obtain request for obtaining the print condition property candidate, to the printing WS 240. In step S102, the printing WS 240 informs a WS request send request, which requests sending a WS request to an indicated Web service, to the Web service client (WSC) 225. In this case, a URL (Uniform Resource Locater) of the image editing WS, and a method name showing an edit property candidate obtain request are informed with the WS request send request.

In step S103, the Web service client (WSC) 225 informs the edit property candidate obtain request to the image editing WS 241 by a SOAP message. In step S104, in response to this SOAP message, the image editing WS 241 informs an edit property notice to the Web service client (WSC) 225 by the SOAP message. By sending the edit property notice, the edit property is informed to the MFP-A 221. Processes in steps S103 and S104 in the image editing WS 241 correspond to a step of obtaining an edit property.

In step S105, the Web service client (WSC) 225 informs a WS request result notice to the printing WS 240. In this case, the edit property candidate informed from the MFP-B 222 is also informed to the printing WS 240. When the edit property candidate is informed to the printing WS 240, the printing WS 240 generates the print condition property candidate from the print property candidate held by the printing WS 240 and the edit property candidate informed from the MFP-B 222. This process conducted by the printing WS 240 will be described in accordance with a flowchart later.

In step S106, after the printing WS 240 generates the print condition property candidate, the printing WS 240 informs the print condition property candidate by the SOAP message.

By the above-described processes, the client PC 213 can obtain the print condition property candidate.

Next, the print property and the edit property will be described in detail. FIG. 8 is a diagram showing an example of the print property according to the first embodiment of the present invention. As shown in FIG. 8, the print property includes "NUMBER OF COPIES", "SHEET SIZE", "BOTH SIDE PRINT YES/NO", "COLLATE YES/NO", and a like.

In the print property, "NUMBER OF COPIES" shows whether or not the user can indicate the number of copies for a document. "SHEET SIZE" shows whether or not the user can indicate the size of sheet to print out. "BOTH SIDE PRINT YES/NO" shows whether or not the user can conduct a both side print. "COLLATE YES/NO" shows whether or not the user can collate each of copies of the document.

As shown in this example of the print property described above, basic available print options concerning a print are listed. Since the print property is obtained when the print condition property candidate is generated, for example, processes in step S105 and step S106 correspond to a print property obtaining step.

Next, the edit property will be described with reference to FIG. 9. FIG. 9 is a diagram showing an example of the edit property according to the first embodiment of the present invention. As shown in FIG. 9, in the edit property, "PASTE CONFIDENTIAL STAMP", "DRAWING OPERATION", "DELETE/COPY/PASTE/MOVE/CONVERT COLOR FOR INDICATED AREA", "CONTINUOUSLY EDIT MULTIPLE PAGES", and "REMOVE STAIN OF GROUND" are listed.

"PASTE CONFIDENTIAL STAMP" shows whether or not the user can paste a confidential stamp to a document and then print out the document with the confidential stamp. "DRAWING OPERATION" shows whether or not the user can draw a straight line, a broken line, a curved line, a polygon, a circle, and a letter. "DELETE/COPY/PASTE/MOVE/ CONVERT COLOR FOR INDICATED AREA" shows a list of processes with respect to the indicated area, and shows whether or not the user can delete the indicated area, copy the indicated area, paste the indicated area, move the indicated area, and convert a color of the indicated area. "CONTINUOUSLY EDIT MULTIPLE PAGES" shows whether or not the user can continuously edit multiple pages. "REMOVE STAIN OF GROUND" shows whether or not the user can remove a stain of a color of the document.

As shown in this example of the print property described above, it is possible to conduct various edits with respect to the document. In other embodiments described in the following, the print property and the edit property will be used as the same manner, and the print property and the edit property will include the same contents.

Figure 10:
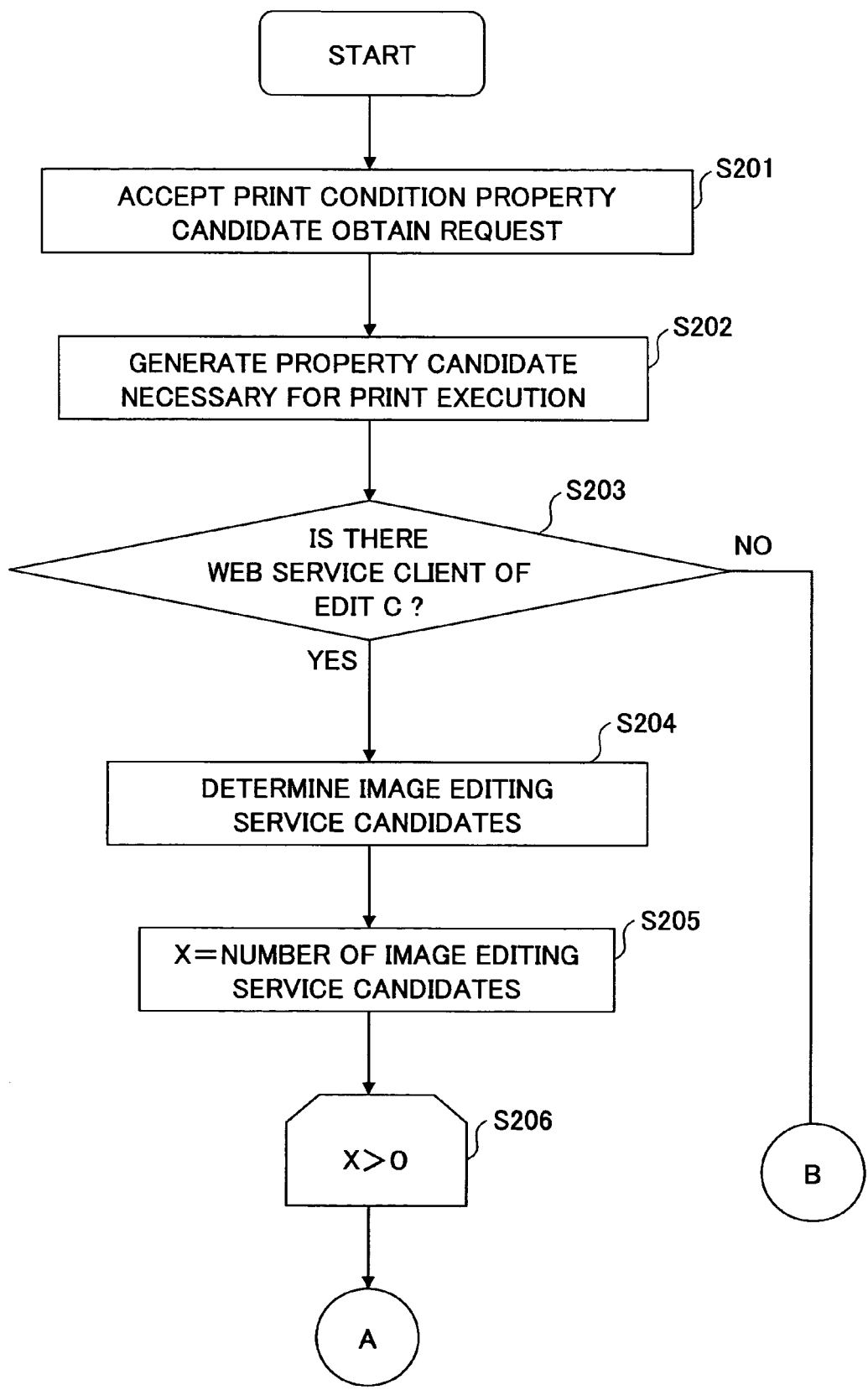
FIG. 10 is a flowchart for explaining a process for generating a print condition property candidate according to the first embodiment of the present invention.
Figure 11:
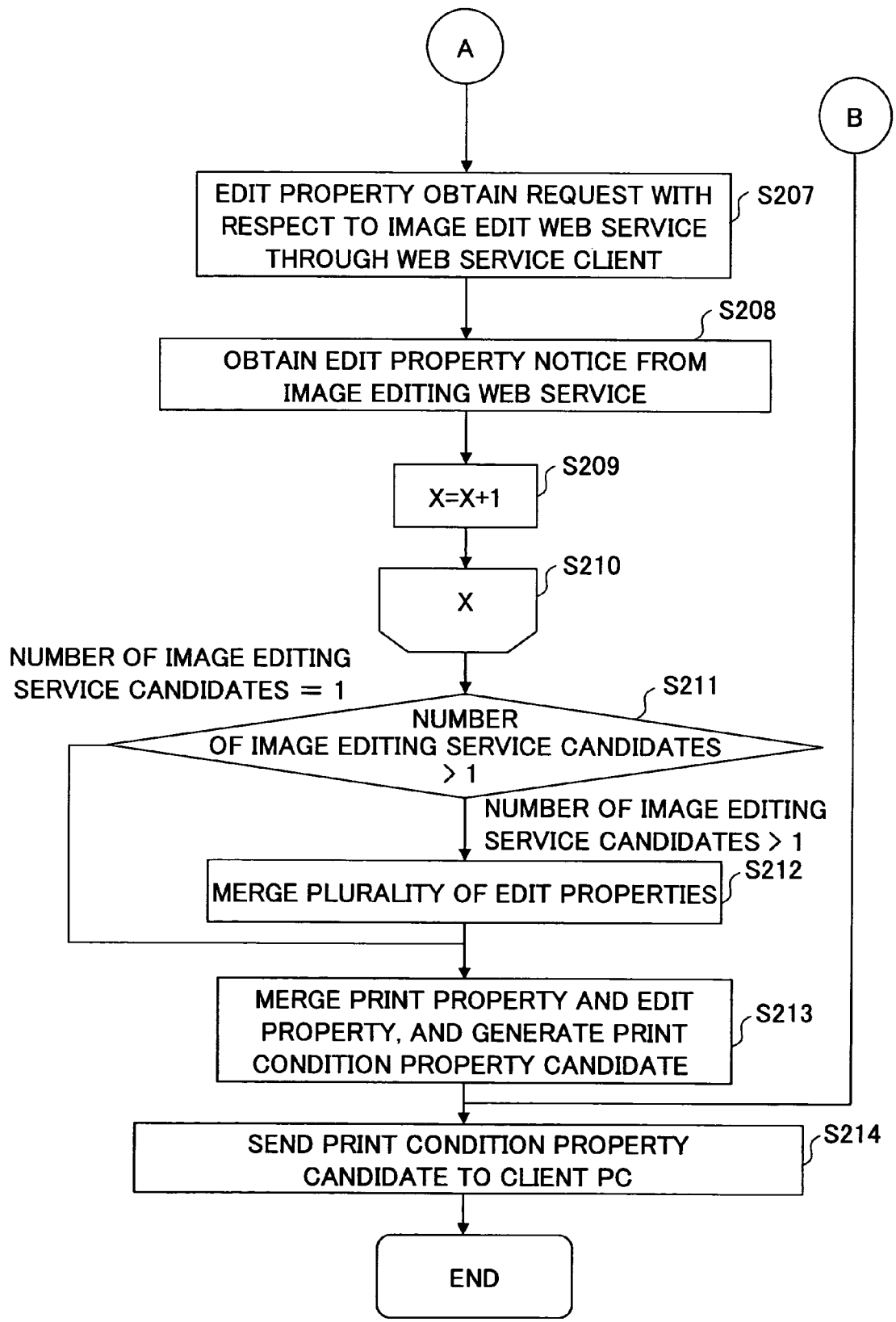
FIG. 11 is a flowchart for explaining the process for generating the print condition property candidate according to the first embodiment of the present invention.

Next, the process for generating the print condition property candidate described above in FIG. 7 will be described with reference to FIG. 10 and FIG. 11. FIG. 10 and FIG. 11 are flowcharts for explaining the process for generating the print condition property candidate according to the first embodiment. The process for generating the print condition property candidate is continued from a flowchart in FIG. 10 to a flowchart in FIG. 11. Also, the process for generating the print condition property candidate is a process conducted by the printing WS 240 in steps S101 through S106 in FIG. 7.

In step S201 corresponding to a step of receiving an output condition property candidate obtain request, the printing WS 240 receives the print condition property obtain request. In step S202 corresponding to a step of obtaining an output property, the printing WS 240 generates a property candidate necessary to a print execution. In this case, the print property candidate is generated.

Next, in step S203, the printing WS 240 determines whether or not there is a Web service client (WSC) to be an edit client (edit C). When there is no Web service client (WSC), the printing WS 240 advances to step S214 in FIG. 11. When there is the Web service client (WSC), the printing WS 240 determines the image editing service candidates in step S204. In the following step S205, the printing WS 240 substitutes the number of the image editing service candidates to a variable X.

Step S206 in FIG. 10 through step S210 in FIG. 11 are looped by evaluating an expression at a top of the loop. When the variable X becomes greater than "0" (zero) the loop is terminated.

In step S207 in FIG. 11 in the loop, the edit property candidate obtain request is informed to the image editing WS 241 through the Web service client (WSC) 225. In step S208, the printing WS 240 obtains the edit property candidate from the image editing WS 241 by the edit property notice. The variable X is incremented in step S209 and the loop ends in step S210. The loop in steps S207 through S209 is repeated until the variable X becomes greater than "0" (zero).

When the loop is terminated, the printing WS 240 determines whether or not the number of the image editing service candidates is greater than "1" in step S211. When the number of the image editing service candidates is equal to "1", the process for generating the print condition property candidate advances to step S213. When the number of the image editing service candidates is greater than "1", the printing WS 240 merges a plurality of edit properties in step S212 corresponding to a step of merging the edit properties.

After the printing WS 240 merges the plurality of edit properties, the printing WS 240 merges the print property generated in step S202 and the edit properties so as to generate the print condition property candidate in step S213 corresponding to a step of obtaining the output condition property candidate. Subsequently, the printing WS 240 sends the print condition property candidate to the client PC 213 in step S214 corresponding to a step of providing the output condition property candidate, and then terminates the process for obtaining the print condition property candidate.

By conducting the process for obtaining the print condition property candidate, the MFP-A 221 can provide the edit property available by the MFP-B 222 being different from the MFP-A 221 in addition to the edit property of the MFP-A 221 itself, to the client PC 213.

The sequence flow shown in FIG. 7 describes the process in that the client PC 213 obtains the print condition property candidate. As a first process for this process, both the print property and the edit property are collectively obtained at one time as described above with reference to the sequence flow in FIG. 7 and the flowcharts in FIG. 10 and FIG. 11. Alternatively, as a second process for this process, the print property is obtained from the printing WS 240 and the edit property is separately obtained from the image editing WS 241.

The first process will be described with reference to FIG. 12. FIG. 12 is a diagram showing the first process according to the first embodiment of the present invention. In FIG. 12, the client PC 213, the printing service 210, and the image editing service 211 are shown. In FIG. 12, the print condition property candidate including a print property 402 and an edit property 401 is shown between the client PC 213 and the printing service 210, and the edit property 401 is shown between the printing service 210 and the image editing service 211.

In a flow of the first process in FIG. 12, first, the client PC 213 informs the print condition property candidate obtain request to the printing service 210 in step S301. In step S302, the printing service 210 informs the edit property candidate obtain request to the image editing service 211. In step S303, the image editing service 211 informs the edit property 401 to the printing service 210. The printing service 210 merges the edit property 401 and the print property 402, and informs the print condition property candidate to the client PC 213 in step S304.

In the first process in FIG. 12, a single image editing service 211 is shown. However, in a case in that a plurality of the image editing services 211 are configured, three methods can be considered as a determining method for determining which one of image editing services 211 is used.

In a first determining method, one of the image editing services 211, which is indicated by the client PC 213 in step S301, is used. In a second determining method, the image editing services 211 are searched for through the network, and one of the image editing services 211 being searched is used. In a case of the second determining method, the edit property, which is indicated by the client PC 213 when a document is printed out, may be considered to determine the image editing service 211 to use. In a third method, the image editing service 211 is predetermined beforehand to use.

In any one of the above-described determining methods, one or more image editing services 211 can be determined to use. In a case of determining a plurality of the image editing services 211, the edit properties obtained from the plurality of the image editing service 211 are merged together as described in FIG. 11.

Next, various examples of the SOAP messages used in the determining methods will be described. FIG. 13 is a diagram showing a SOAP message in a case in that the client PC indicates the image editing service, according to the first embodiment of the present invention. In FIG. 13, a SOAP message M11 is an example of the SOAP message in the case of the first determining method in that the client PC indicates the image editing service 211. By an XML sentence 410 shown by a tag <m:getPrint Capability> in the SOAP message M11, a URL of the image editing service 211 indicates "http://111.222.333.444/editservice".

FIG. 14 is a diagram showing a SOAP message in a case in that the image editing service is predetermined beforehand to use, according to the first embodiment of the present invention. As shown in FIG. 14, in this case of the third determining method in that the image editing service 211 is predetermined beforehand to use, a SOAP message M12 omits the URL of the image editing service 211 shown in the SOAP message M11 in FIG. 13. Since the image editing service 211 is determined beforehand to use, it is not required to indicate the image editing service 211 to use in the third determining method.

Next, examples of the print condition property candidate will be described with reference to FIG. 15 and FIG. 16. FIG. 15 is a diagram showing an example of the print condition property candidate according to the first embodiment of the present invention. In FIG. 15, a SOAP message M13 for the print condition property candidate shows that the user can set the number of copies, the size of a sheet and a direction, and can set to paste the confidential stamp and a page stamp.

In detail, an XML sentence 411 shows that the user can set the number of copies from 1 to 99 as shown by "1-99". An XML sentence 412 shows that the user can set "A4" or "B4" as the size of a sheet as shown by "A4F/B4F". An XML sentence 413 shows that the user can set to paste the confidential stamp or the page stamp as shown by "secret_stamp/page_stamp".

FIG. 16 is a diagram showing another example the print condition property candidate according to the first embodiment of the present invention. A SOAP message M14 for the print condition property candidate shows the same contents as the SOAP message M13 but has a different data structure from the SOAP message M13 shown in FIG. 15. In detail, an XML sentence 414 in FIG. 16 corresponds to the XML sentence 411 in FIG. 15, the XML sentence 415 in FIG. 16 corresponds to the XML 412 in FIG. 15, and an XML sentence 416 in FIG. 16 corresponds to the XML sentence 416 in FIG. 15.

As described above, since the print condition property candidate is informed by XML sentences using tags, it is not required to modify the application 229 of the client PC 213 even if the print condition property candidate is changed.

Figure 17:
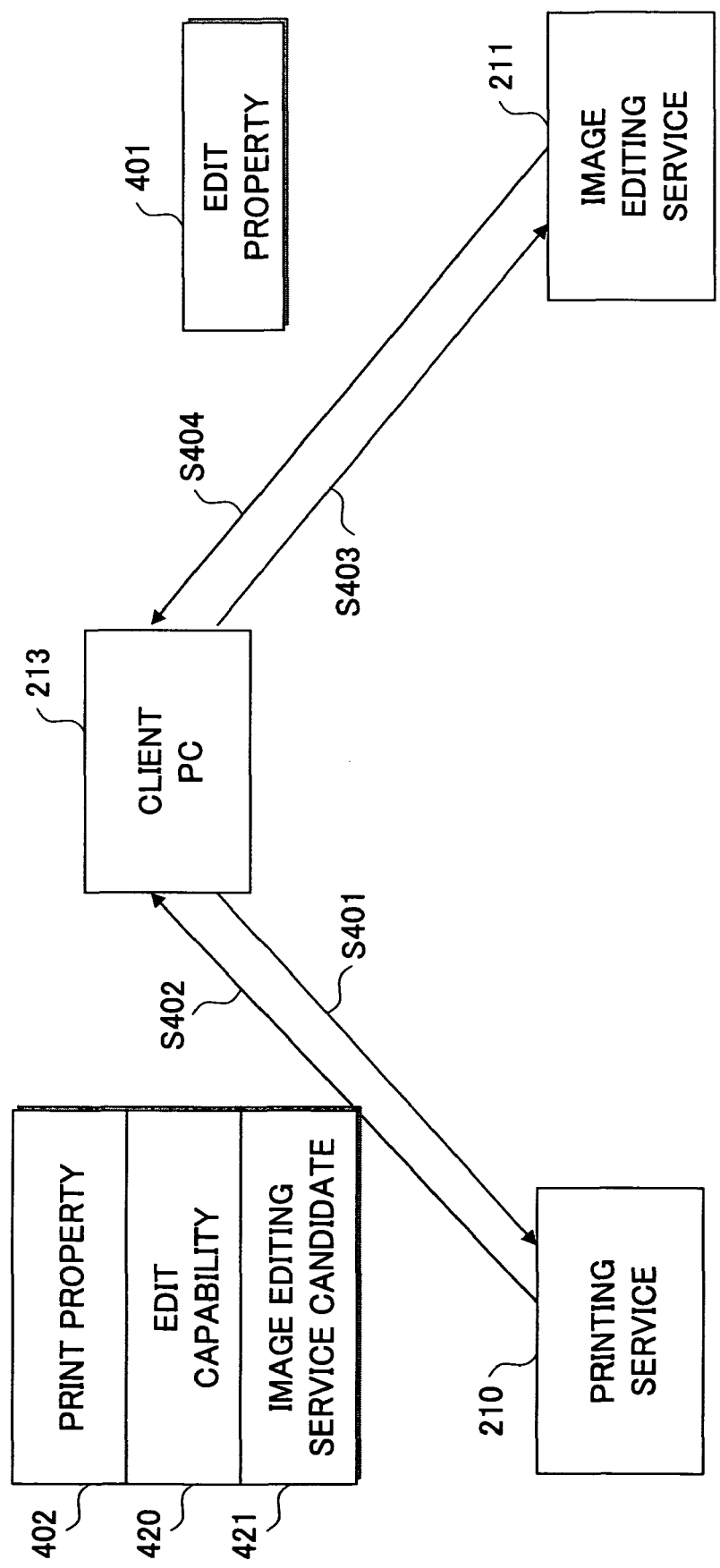
FIG. 17 is a diagram showing a second process according to the first embodiment of the present invention.

Next, the second process will be described with reference to FIG. 17. FIG. 17 is a diagram showing the second process according to the first embodiment of the present invention. In FIG. 17, the client PC 213, the printing service 210, the image editing service 211 are shown. In FIG. 17, the print property 402, the edit capability 420, and the image editing service candidate 421 are shown between the client PC 213 and the printing service 210. The edit property 401 is shown between the client PC 213 and the image editing service 211.

The edit capability 420 is edit information concerning an edit and informing that a document can be edited by using the image editing service 211. Also, the image editing service candidate 421 is optional information to inform the image editing service candidate, for example, by using an URL. In a case in that the image editing service candidate 421 is not informed, the client PC 213 is required to inform the image editing service 211 to use. As described above, information concerning a provider providing the edit property is sent to the client PC 213.

Next, in a flow of the second process in FIG. 17, in step S401, the client PC 213 informs the print candidate property candidate obtain request to the printing service 210. In step S402, the printing service 210 informs the print property 402, the edit capability 420, the image editing service candidate 421 to the client PC 213.

In step S403, the client PC 213 sends the edit property candidate obtain request to the image editing service candidate 421 informed from the printing service 210 or/and the image editing service 211 searched by the client PC 213 itself. In step S404, the image editing service 211 informs an edit property candidate.

As described above, in the second process, the client PC 213 separately obtains the edit property and the print property. A SOAP message sent from the client PC 213 to the printing service 210 is the same as the SOAP message shown in FIG. 14. Also, a SOAP message sent from the printing service 210 to the client PC 213 is the same as the SOAP message shown in FIG. 18 or FIG. 19.

FIG. 18 is a diagram showing an example of a SOAP message including the image editing service candidate according to the first embodiment of the present invention. A SOAP message M15 including the image editing service candidate shown in FIG. 18 shows the print property 402, the edit capability 420, and the image editing service candidate 421. An XML sentence 426 corresponds to the print property 402. An XML sentence 427 corresponds to the edit capability 420 and shows by "true" that the user can edit a document. An XML sentence 425 corresponds to the image editing service candidate 421 and shows the URL of the image editing service candidate 421.

The SOAP message in FIG. 18 shows the image editing service candidate 421 by the XML sentence 425. Alternatively, a SOAP message in a case in that the image editing service candidate 421 is not informed is shown in FIG. 19. FIG. 19 is a diagram showing another SOAP message including the edit capability according to the first embodiment. As shown in FIG. 19, in a SOAP message M16, an XML sentence 426 corresponding to the print property 402 and an XML sentence 427 corresponding to the edit capability 420 are shown but the image editing service candidate 421 is not shown.

When the client PC 213 receives the SOAP messages described above, the client PC 213 requests the image editing service 211 to send the edit property 401 and receives the edit property 401 from the image editing service 211.

After the client PC 213 obtains the edit property 401 and the print property 402, the client PC 213 displays a screen 440 as shown in FIG. 20. FIG. 20 is a diagram showing a screen to set a print function and an advanced function, according to the first embodiment of the present invention. In FIG. 20, the screen 440 is displayed in the same manner in the first process and the second process.

The screen 440 will be described. The screen 440 is displayed for the user to set to use or not functions shown by the print property 402 and the edit property 401 and for the user to conduct to print out a document.

The screen 440 displays a print function 430 showing functions executable by obtaining the print property 402, an advanced function 431 showing functions executable by obtaining the edit property 401, a print button 436 for executing a print, and a cancel button 437 for canceling the print.

Moreover, at the print function 430, a setting area 432 for setting the number of copies, and a setting area 434 for setting the size of a sheet are displayed. The setting area 432 for setting the number of copies is a text box for the user to set the number of copies as shown in FIG. 20. The setting area 434 for setting the size of sheet is a pull-down menu for the user to select and set the size of a sheet.

Furthermore, at the advanced function 431 displays a setting area 435 for setting a confidential stamp. In a case of pasting the confidential stamp, the user checks a radio button and selects and sets a drawing location from the pull-down menu.

After the user sets the print function 430 and the advanced function 431, if the user cancels the settings, the user presses the cancel button 437. If the user executes a print, the user presses the print button 436. When the user presses the print button 436, the client PC 213 requests the MFP-A 221 to print out the document. A process concerning a print after the user presses the print button 436 will be described with reference to FIG. 21 and FIG. 22. FIG. 21 and FIG. 22 are diagrams showing a sequence flow for explaining the process for printing a document according to the first embodiment of the present invention.

In step S107, the client PC 213 sends a document print request to the MFP-A 221. The document print request is conducted by a SOAP message, which will be described later. A document and a print condition created by selecting from the print condition property candidate by the user are informed by the document print request. In the process shown in FIG. 21 and FIG. 22, as the print condition, the client PC 213 requests to paste the confidential stamp.

When the document print request is informed to the printing WS 240, the printing WS 240 conducts a process flow of the printing service, which will be described later. The printing WS 240 sends a WS request send request, which requests the Web service client (WSC) 225 to send a WS request to the MFP-B 222, to the Web service client (WSC) 225 in step S108. This WS request send request informs a method name showing a document edit request, edit contents including a paste of the confidential stamp, a URL of the image editing WS 241, and a document, to the Web service client (WSC) 225.

In step S109, the Web service client WSC 225 sends the document edit request to the MFP-B 222. The document edit request is informed by a SOAP message, which will be described later. This SOAP message informs the document and the edit contents including the paste of the confidential stamp, which are informed by the WS request send request in step S108.

Subsequently, the process will be described in FIG. 22. In step S110, the image editing WS 241 edits the document and informs an edit result to the Web service client (WSC) 225 with an edited document to the Web service client (WSC) 225. The edit result is sent by a SOAP message, which will be described in FIG. 27. Next, in step S111, the Web service client (WSC) 225 sends the edit result with the edited document to the printing WS 240.

When the printing WS 240 receives the edited document, the printing WS 240 prints out the edited document, and informs a document print accept result to the client PC 213 in step S112. The document print accept result is informed by a SOAP message, which will be described in FIG. 28.

The process concerning a print according to the present invention has been described above. Next, the SOAP messages informed in the process concerning a print and a flowchart of the process will be described. First, the SOAP message informed by the document print request in step S107 will be described with reference to FIG. 23. FIG. 23 is a diagram showing an example of a SOAP message informed by the document print request according to the first embodiment of the present invention. A SOAP message M17 shown in FIG. 23 includes information concerning a document name, the number of copies, the size of a sheet, and a stamp.

An XML sentence 450 shows that the document to send has the document name "content.tiff". An XML sentence 451 shows three copies. An XML sentence 452 shows to print out the edited document by horizontal A4. An XML sentence 453 shows to paste the confidential stamp.

Next, the process conducted by the printing WS 240 in FIG. 21 and FIG. 22 will be described with reference to FIG. 24. In step S501, the printing WS 240 accepts the document print requests. Next, the printing WS 240 determines a presence of an edit indication in step S502. When there is no edit indication, the printing WS 240 advances to step S505.

When there is the edit indication, the printing WS 240 sends the document edit request to the image editing WS 241 through the Web service client (WSC) 225 in step S503. In step S504, the printing WS 240 obtains an edit result notice and the edited document from the image editing WS 241.

In step S505, the printing WS 240 sends a print request for the edited document to the ECS 35. In step S506, the printing WS 240 sends the document print accept result to the client PC 213 and terminates the process.

Next, a function used in step S108 in FIG. 21 will be described with reference to FIG. 25. FIG. 25 is a diagram showing a prototype of the function used by in step S108 in FIG. 21, according to the first embodiment of the present invention. The function shown in FIG. 25 is a function used in C programming language or C++ language. The function shown in FIG. 25 has a function name "callWebService" and a return value of an integer type, and five arguments. These five arguments will be described.

"webServiceURL" is a pointer of a character type and indicates a top address where a URL of a Web service is stored in a memory. "webServiceName" indicates a top address where a service name of the Web service is stored in the memory.

"webServiceMethodName" indicates a top address where the method name is stored in the memory. "argumentList" indicates an address storing a top address where method arguments are stored in the memory. "resultList" indicates an address storing a top address where response data are stored in the memory. "error" stores error information.

"webServiceURL", "webServiceName", "webServiceMethodName", and "argumentList" are set at a side using the function, and "resultList" and "error" are set by the function.

Next, the SOAP message to the MFP-B 222 in step S109 in FIG. 21 will be described with reference to FIG. 26. FIG. 26 is a diagram showing a SOAP message showing the document edit request according to the first embodiment of the present invention. A SOAP message M18 shown in FIG. 26 shows a document edit request and requests to paste the confidential stamp by an XML sentence 454.

Next, the SOAP message informed in step S110 in FIG. 22 will be described with reference to FIG. 27. FIG. 27 is a diagram showing a SOAP message showing the edit result notice according to the first embodiment of the present invention. A SOAP message M19 shown in FIG. 27 shows the edit result notice, and an XML sentence 455 indicates a file name "content.tiff" of the document in which the confidential stamp is pasted. Actual document data following to the SOAP message M19 are sent to the Web service control 225.

Next, the SOAP message informed in step S112 in FIG. 22 will be described with reference to FIG. 28. FIG. 28 is a diagram showing the SOAP message for the document print accept result according to the first embodiment of the present invention. The SOAP message M20 shown in FIG. 28 shows the document print accept result, and includes a job ID "0987654321" as shown by an XML sentence 456.

In the first embodiment described above, the document subject to edit or print out is in the client PC 213. Next, in a second embodiment, the document is stored in the client PC 213 similar to the first embodiment. However, different from the first embodiment, the document management service 212 as a Web service managing the document is implemented in the client PC 213.

Second Embodiment

A system configuration according to the second embodiment will be described with reference to FIG. 29. FIG. 29 is a diagram showing the system configuration according to the second embodiment of the present invention. In FIG. 29, a client PC 213, a printing service 210, an image editing service 211, and a document management service 212, a document DB 214, and documents 301 and 302 are shown.

As shown in FIG. 29, different from the first embodiment, the number of document transmissions (sending and receiving the document) is reduced to two times (see FIG. 5). By reducing the number of the document transmissions, it is possible to reduce the number of chances of attacking the documents 301 and 302 such as interception and falsification.

In a flow of the document transmission, the document 301 is sent from the document management service 212 of the client PC 213 to the image editing service 211, and is edited by the image editing service 211. Then, an edited document (document 301) is sent from the image editing service 211 to the printing service 210, and is printed out by the printing service 210.

As described above, the second embodiment is different from the first embodiment in that the document 301 is directly sent from the client PC 213 to the image editing service 211.

Figure 30:
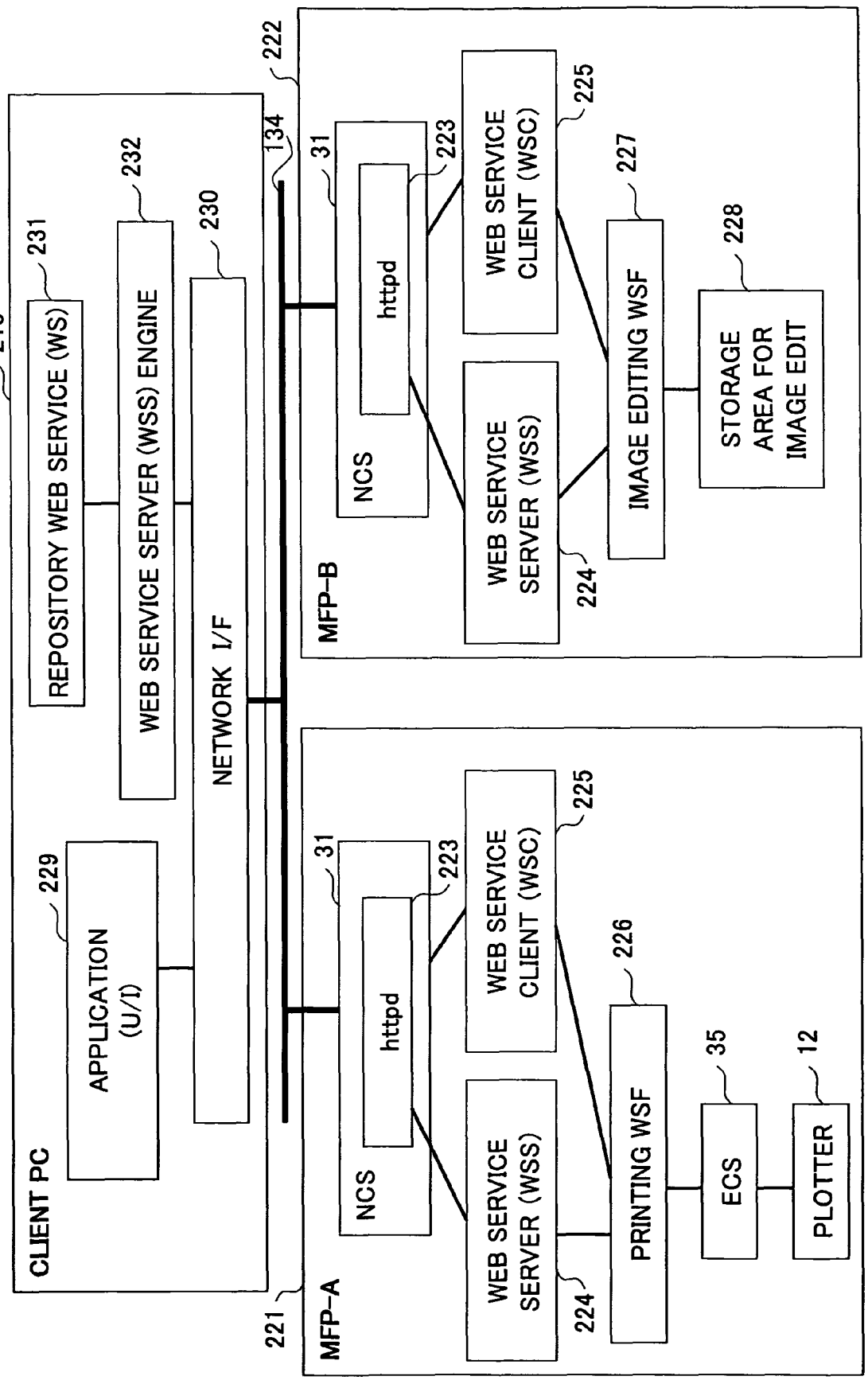
FIG. 30 is a diagram showing a functional configuration according to the second embodiment of the present invention.

Next, a functional configuration according to the second embodiment will be described with reference to FIG. 30 in detail. FIG. 30 is a diagram showing the functional configuration according to the second embodiment of the present invention. In FIG. 30, the client PC 213, the MFP-A 211, and the MFP-B 222 are shown. Referring to FIG. 30, parts different from the first embodiment (see FIG. 6) will be described. First, the client PC 213 includes a repository Web service 231 as the document management service 212, and a Web service server engine 232. The Web service server engine 232 is an engine to execute a server function of the Web services.

Moreover, in the MFP-B 222, the Web service client (WSC) 225, which is not used in the first embodiment, is used to function as a client of the repository Web service 231.

Figure 31:
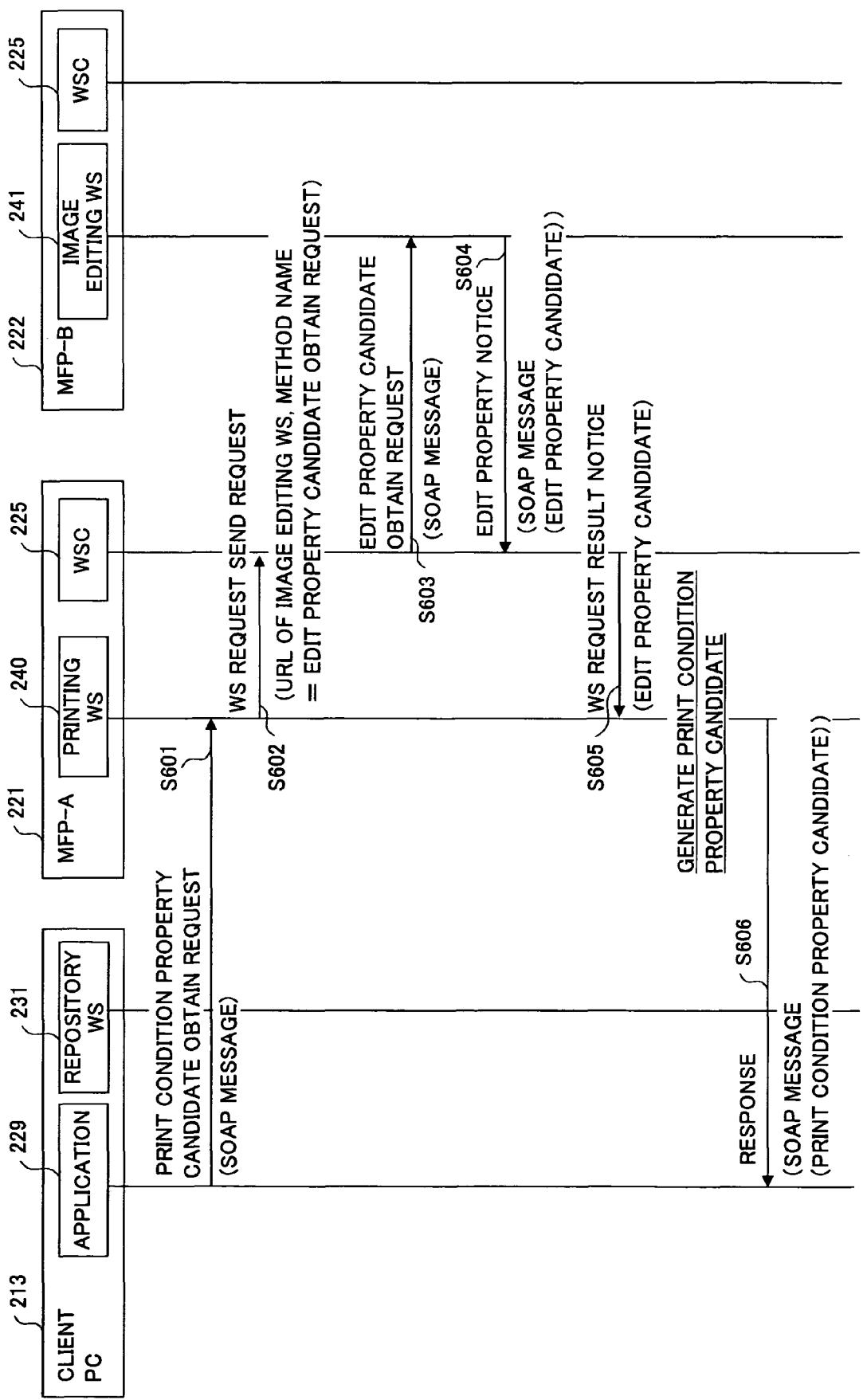
FIG. 31 is a diagram showing a sequence flow of a process for obtaining the print condition property candidate according to the second embodiment of the present invention.

The system configuration and the functional configuration according to the second embodiment are described above. Next, a sequence flow for obtaining the print condition property candidate will be described with reference to FIG. 31. FIG. 31 is a diagram showing the sequence flow of the process for obtaining the print condition property candidate according to the second embodiment of the present invention. In the sequence flow in FIG. 31, a sequential process, which is conducted among the client PC 213, the MFP-A 221, and the MFP-B 222, are shown. In FIG. 31, the printing WS 240 collectively represents the Web service server (WSS) 224 and the printing WSF 226 in the MFP-A 221 in FIG. 30. Also, the image editing WS 241 collectively represents the Web service server (WSS) 224 and the image editing WSF 227 in the MFP-B 222 in FIG. 30.

In addition, the sequential process in the sequence flow shown in FIG. 31 is a process for obtaining a print condition property candidate.

The sequence flow will be described. In step S601, the client PC 213 informs a print condition property candidate obtain request, which is an obtain request for obtaining the print condition property candidate, to the printing WS 240. In step S602, the printing WS 240 informs a WS request send request, which requests sending a WS request to an indicated Web service, to the Web service client (WSC) 225. In this case, a URL (Uniform Resource Locater) of the image editing WS 241, and a method name showing an edit property candidate obtain request are informed with the WS request send request.

In step S603, the Web service client (WSC) 225 informs the edit property candidate obtain request to the image editing WS 241 by a SOAP message. In step S604, in response to this SOAP message, the image editing WS 241 informs an edit property notice to the Web service client (WSC) 225 by the SOAP message. By sending the edit property notice, the edit property is informed to the MFP-A 221.

In step S605, the Web service client (WSC) 225 informs a WS request result notice to the printing WS 240. In this case, the edit property candidate informed from the MFP-B 222 is also informed to the printing WS 240. When the edit property candidate is informed to the printing WS 240, the printing WS 240 generates the print condition property candidate from the print property candidate held by the printing WS 240 and the edit property candidate informed from the MFP-B 222. This process conducted by the printing WS 240 is the same as the process described in accordance with the flowcharts shown in FIG. 10 and FIG. 11.

In step S606, after the printing WS 240 generates the print condition property candidate, the printing WS 240 informs the print condition property candidate by the SOAP message.

By the above-described processes, the client PC 213 can obtain the print condition property candidate.

Figure 32:
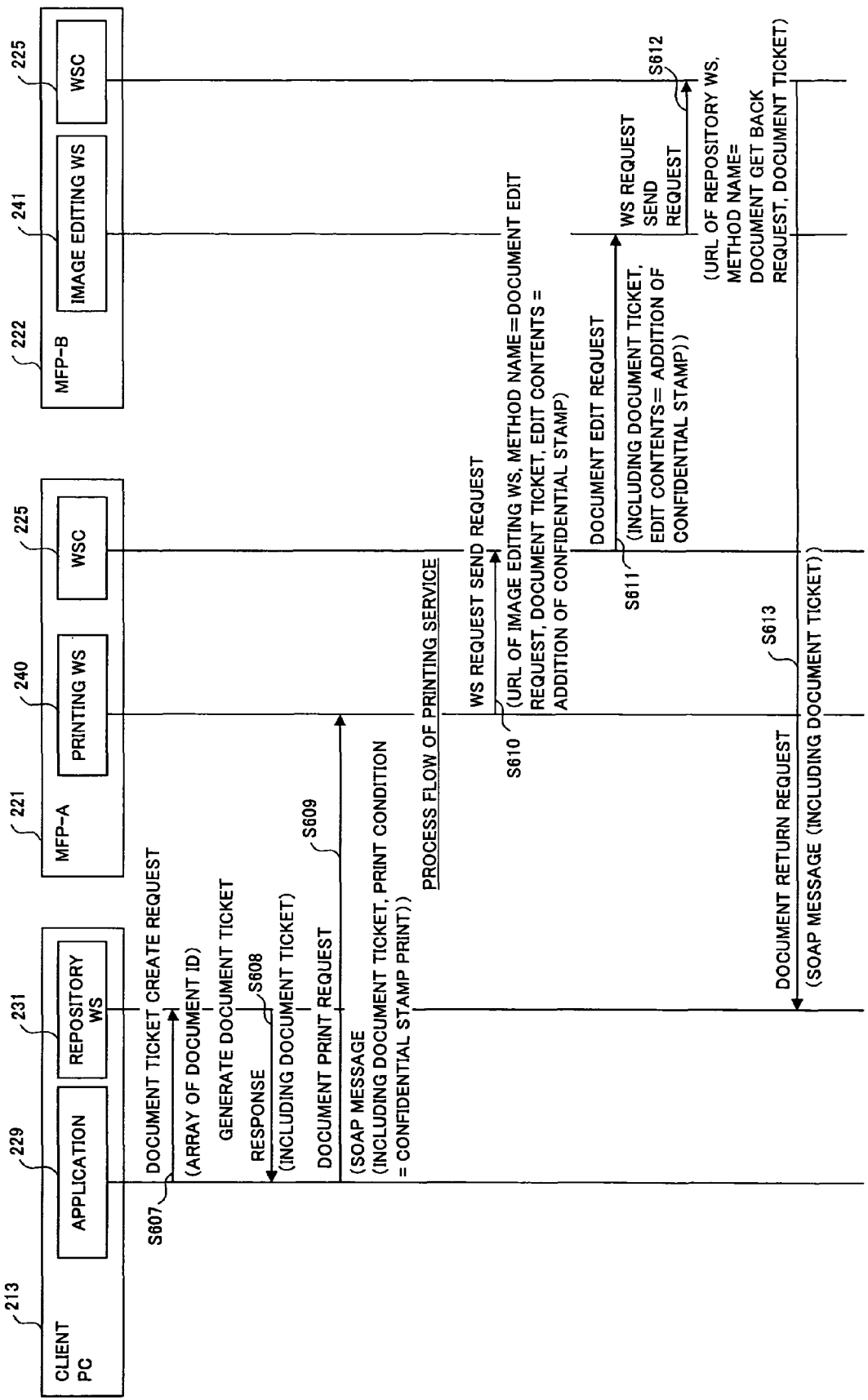
FIG. 32 is a diagram showing a sequence flow of a process concerning a print according to the second embodiment of the present invention.
Figure 33:
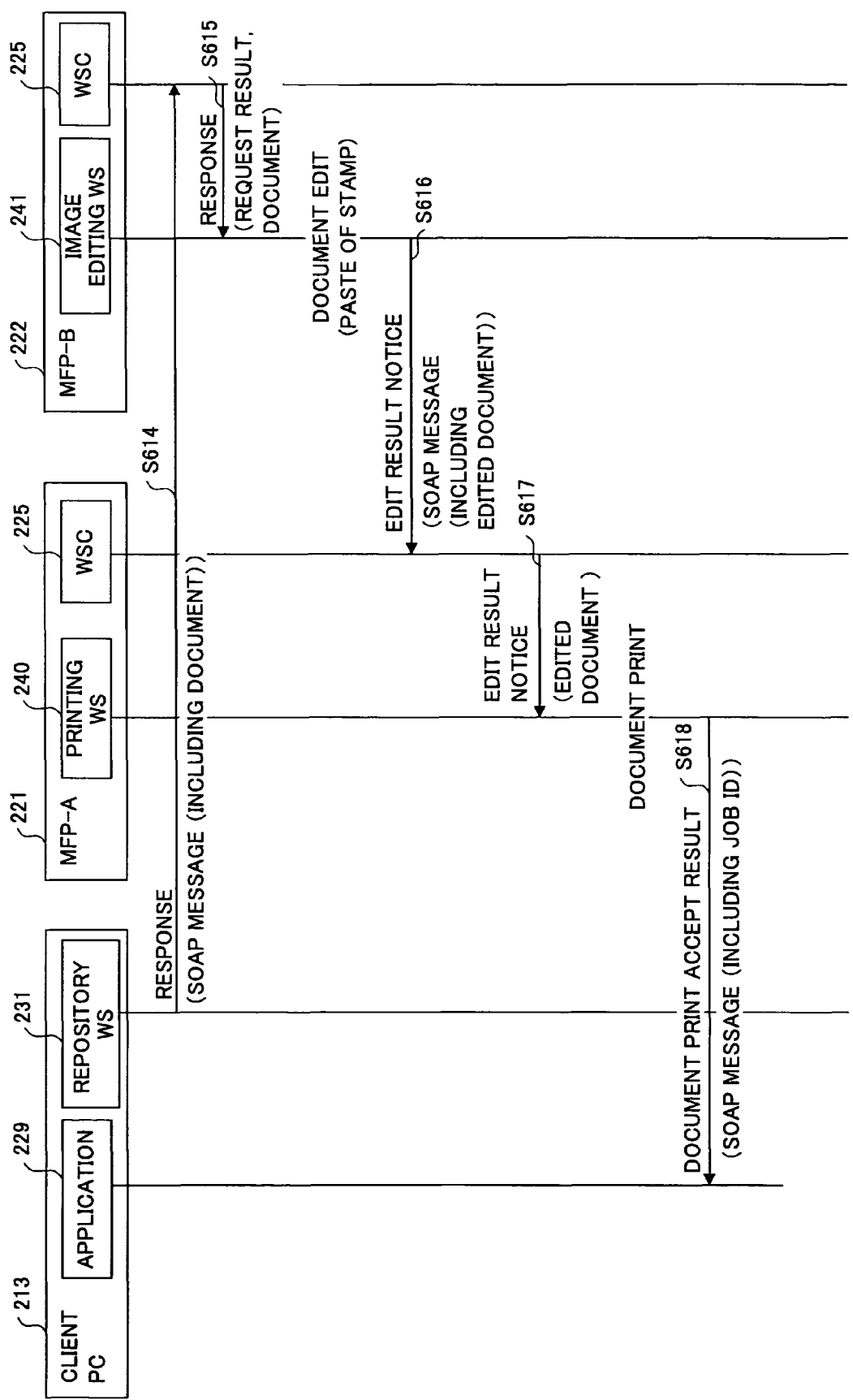
FIG. 33 is a diagram showing the sequence flow of the process concerning a print according to the second embodiment of the present invention.

Next, a process concerning a print according to the second embodiment will be described with reference to FIG. 32 and FIG. 33. FIG. 32 and FIG. 33 are diagrams showing a sequence flow of the process concerning a print according to the second embodiment of the present invention. In FIG. 32, in step S607, the application 229 of the client PC 213 informs a document ticket create request to the repository WS 235 in the same client PC 213 with an array of document IDs. In step S608, the repository WS 235 sends a response with respect to the document ticket create request to the application 229 with a document ticket. In this case, the document ID uniquely indicates a document. The document ticket shows permission to edit or print out the document, and is required to edit or print out the document specified by the document ID.

In step S609, the client PC 213 informs a document print request to the MFP-A 221. The document print request is informed by a SOAP message, which will be described later, and the document ticket and the print condition will be informed with the document print request. In this case in FIG. 31, the client PC 213 requests pasting a confidential stamp as a print condition property.

Figure 24:
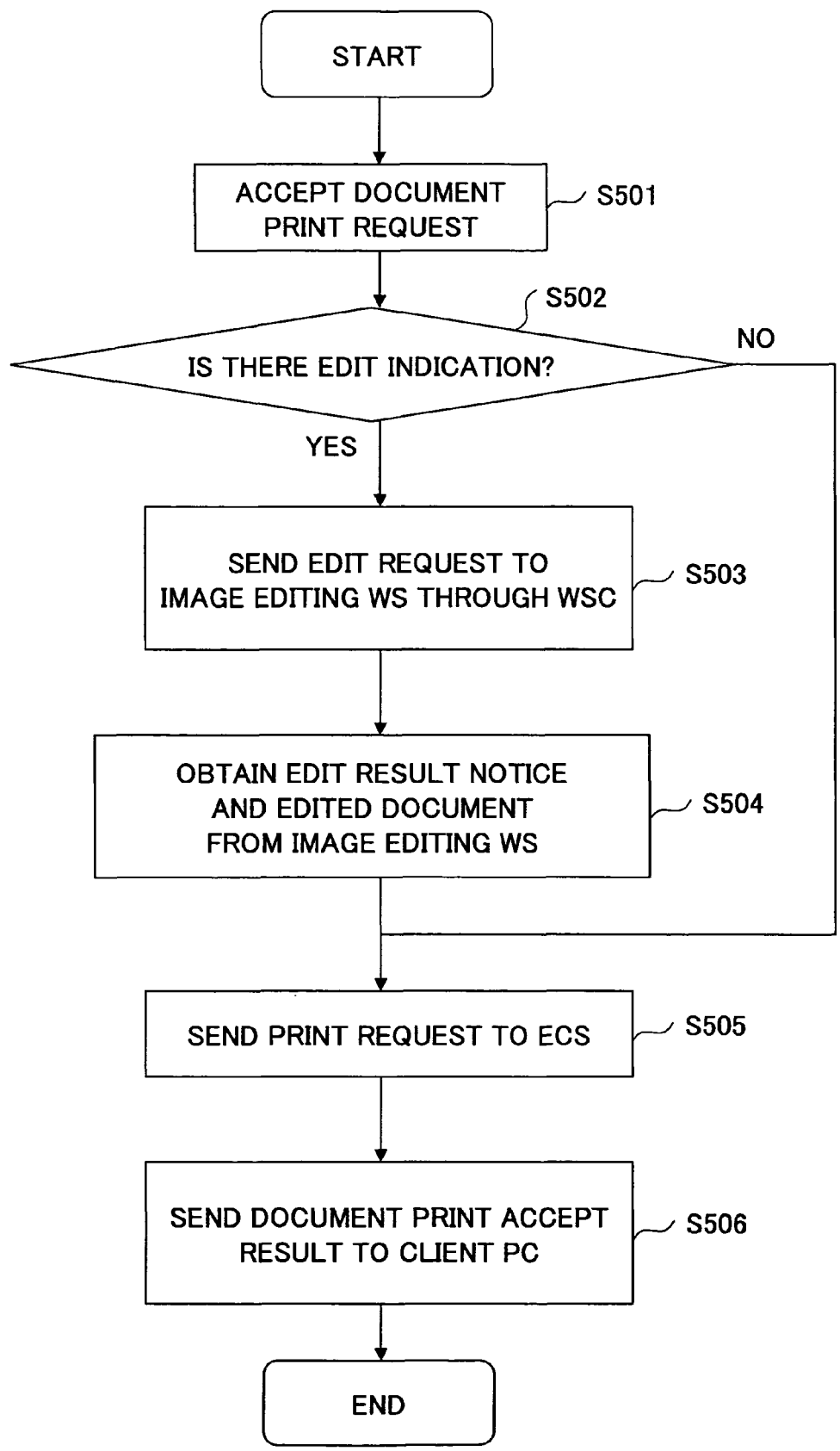
FIG. 24 is a flowchart for explaining a process conducted by a printing WS according to the first embodiment of the present invention.

When the document print request is informed to the printing WS 240, the printing WS 240 executes a process flow of the printing service described in FIG. 24. The printing WS 240 sends a WS request send request, which requests the Web service client (WSC) 225 to send the WS request to the MFP-B 222, to the Web service client (WSC) 225 in step S610. This WS request send request informs a method name showing a document edit request, edit contents including a paste of the confidential, a URL of the image editing WS 241, and the document ticket, to the Web service client (WSC) 255, by using the function shown in FIG. 25.

In step S611, the Web service client (WSC) 225 sends the document edit request to the MFP-B 222. A SOAP message for the document edit request is the same as the SOAP message M18 shown in FIG. 26. Also, the document ticket and the edit contents showing to paste the confidential stamp, which are previously informed, are informed by this SOAP message.

Next, in step S612, the image editing WS 241 sends the WS request send request to the Web service client (WSC) 225 in the MFP-B 222 to get back (retrieve) the document from the repository WS 235. The function shown in FIG. 25 is used for this WS request send request, and a URL of the repository WS 235, a method showing a document get back request, and the document ticket are informed to the Web service client (WSC) 225.

In step S613, the Web service client (WSC) 225 sends the document get back request to the repository WS 235 with the document ticket. The process concerning a print is continued to the sequence flow shown in FIG. 33. In step S614, the repository WS 235 sends a response with respect to the document get back request. In this case, the document is returned to the MFP-B 222. When the Web service client (WSC) 225 gets back the document, the Web service client (WSC) 225 sends a response including a request result with the document to the image editing WS 241 in step S615.

In step S616, the image editing WS 241 edits the document and sends an edit result with the edited document to the Web service client (WSC) 225 of the MFP-A 221. The edit result is sent by the SOAP message M19 shown in FIG. 27. Next, in step S617, the Web service client (WSC) 225 sends the edit result with the edited document to the printing WS 240.

When the edited document is sent to the printing WS 240, the printing WS 240 prints out the document and sends a document print accept result to the client PC 213 in step S618. The document print accept result is sent by the SOAP message M20 described in FIG. 28.

Next, a SOAP message sent from the application 229 to the printing WS 240 in step S609 will be described with reference to FIG. 34. The SOAP message shown M21 in FIG. 34 is a SOAP message for the document print request, but is different from the SOAP message M17 shown in FIG. 23 in the first embodiment and instead of the document name, the document ticket is indicated by an XML sentence 459. "jfowfnofjofi" is the document ticket shown by the XML sentence 459. The SOAP message M21 shown in FIG. 34 will be used in the following embodiments until an eighth embodiment.

Next, a third embodiment will be described. In the third embodiment, different from the second embodiment, the document management service 212 is separately provided from the client PC 213.

Third Embodiment

FIG. 35 is a block diagram showing a system configuration according to the third embodiment of the present invention. In FIG. 35, a client PC 213, a printing service 210, an image editing service 211, a document management service 211, a document DB 214, and documents 301 and 302 are shown.

In a flow of the documents 301 and 302 in FIG. 35, the document 302 is sent from the document management service 212 to the image editing service 211, and edited by the image editing service 211. Then, the edited document as the document 301 is sent from the image editing service 211 to the printing service 210, and prints out the document 301.

A functional configuration according to the third embodiment will be described with reference to FIG. 36 in detail. FIG. 36 is a block diagram showing the functional configuration according to the third embodiment of the present invention. In FIG. 36, the client PC 213, the MFP-A 221, the MFP-B 222, and a MFP-C 233 are shown. In FIG. 36, parts different from the second embodiment will be described. First, the client PC 213 includes the application 229 and the network interface 230, and has the same functional configuration as the first embodiment.

Moreover, the MFP-C 233 is additionally provided as a repository service. The MFP-C 233 includes the NCS 31 having the httpd 223, the Web service server (WSS) 224, the Web service client (WSC) 225, a repository Web service function (WSF) 234, the MCS 36, and the HDD 65.

The repository WSF 234 is a Web service function (WSF) for providing a document management function. The MCS 36 is used when the repository WSF 234 accesses the HDD 65. The HDD 65 stores the document. It should be noted that the Web service client (WSC) 225 provided in the MFP-B 222 is not used in the third embodiment.

Figure 37:
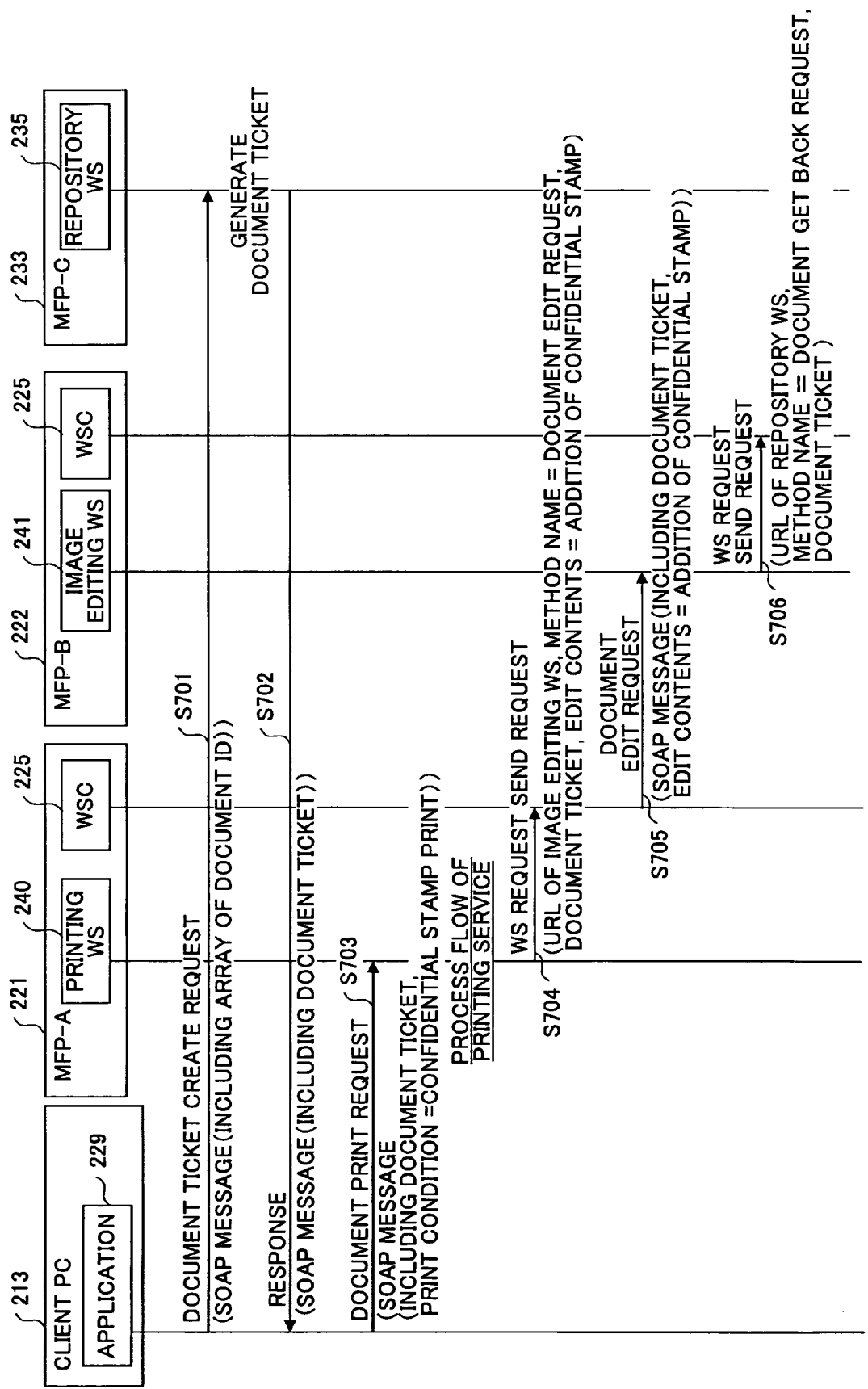
FIG. 37 is a diagram showing a sequence flow of a process concerning a print, according to the third embodiments of the present invention.
Figure 38:
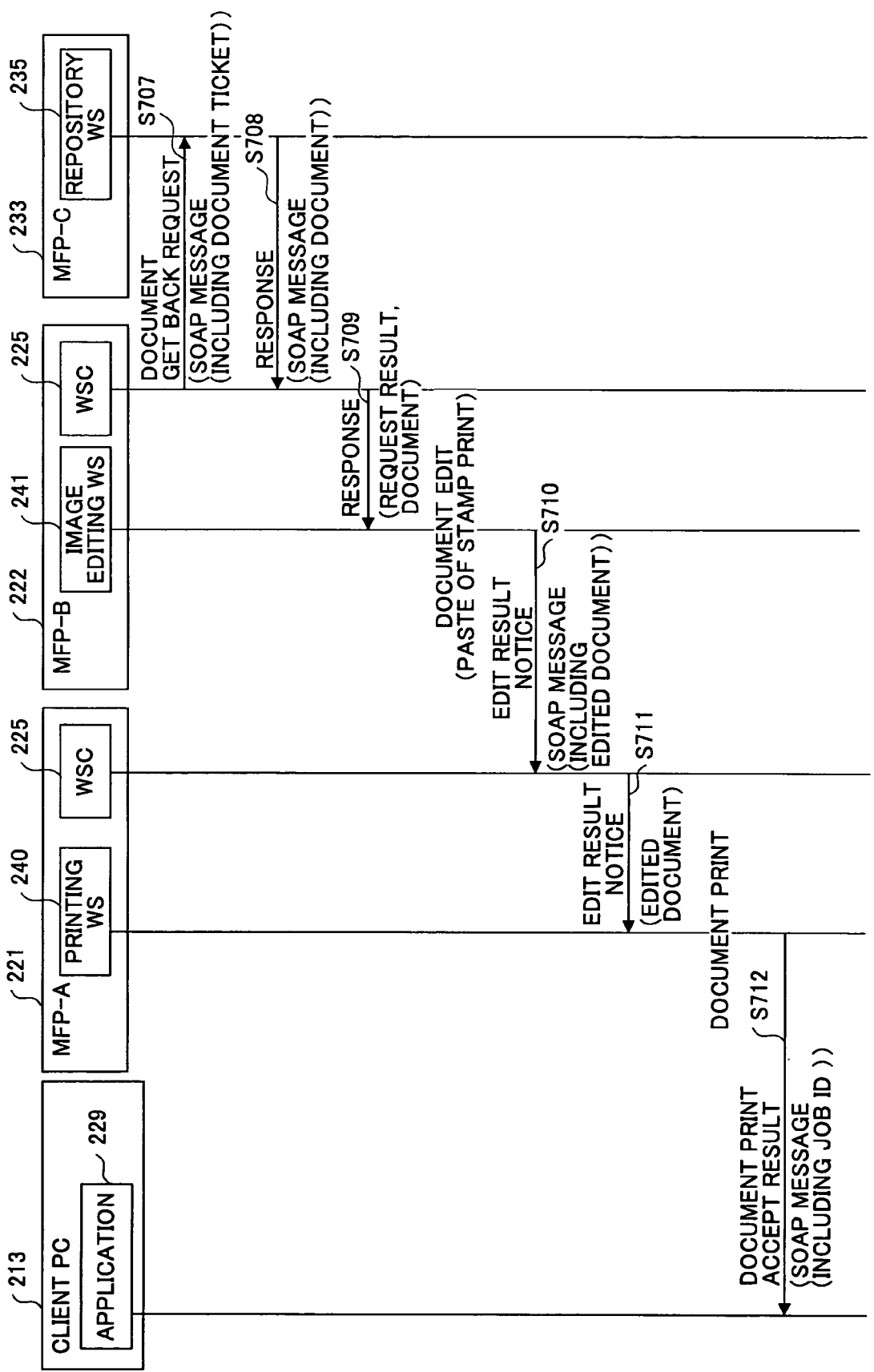
FIG. 38 is a diagram showing a sequence flow of the process concerning a print, according to the third embodiments of the present invention.

The above-described system configuration and the functional configuration are implemented in the third embodiment. Next, a process concerning a print will be described with reference to FIG. 37 and FIG. 38. FIG. 37 and FIG. 38 are diagrams showing a sequence flow of the process concerning a print, according to the third embodiment of the present invention. In the sequence flow shown in FIG. 37 and FIG. 38, the process conducted among the client PC 213, the MFP-A 221, the MFP-B 222, and the MFP-C 233 is shown. In FIG. 37 and FIG. 38, the repository WS 235 collectively represents the Web service server (WSS) 224 in the MFP-C 233 and the repository WSF 234.

The process shown in FIG. 37 and FIG. 38 is a process in that the client PC 213 obtains a document ticket and prints out the document.

In step S701, the application 229 of the client PC 123 sends a document ticket create request with an array of document IDs to the repository WS 235. The repository WS 235 creates the document ticket, and sends a response with respect to the document ticket create request with the document ticket, to the client PC 213 in step S702. SOAP messages used in step S701 and step S702 will be described later with reference to FIG. 39 and FIG. 40.

In step S703, the client PC 213 sends a document print request to the MFP-A 221. The document print request is sent by the SOAP message described in FIG. 34, and the document ticket, the document, the print condition property are informed to the printing WS 240 of the MFP-A 221. In this case in FIG. 37, the client PC 213 request pasting a confidential stamp as the print condition property.

When the document print request is informed to the printing WS 240, the printing WS 240 executes the process flow of the printing service described in FIG. 24. The printing WS 240 sends a WS request send request, which requests sending a WS request to an indicated Web service, to the Web service client (WSC) 225 in step S704. The function shown in FIG. 25 is used for the WS request send request, and a method name showing a document edit request, edit contents showing a paste of the confidential stamp, a URL of the image editing WS 241, and the document ticket are informed to the Web service client (WSC) 225.

In step S705, the Web service client (WSC) 225 sends the document edit request to the MFP-B 222. A SOAP message for the document edit request is the same as the SOAP message M18 shown in FIG. 26. The SOAP message M18 informs the document ticket, and the edit contents showing the paste of the confidential stamp.

Next, the image editing WS 241 sends a WS request send request to the Web service client (WSC) 225 to get back (retrieve) the document from the repository WS 235 in step S706. The function shown in FIG. 25 is used for the WS request send request, and a URL of the repository WS 235, a method name showing a document get back request, and the document ticket are informed to the Web service client (WSC) 225.

Referring to FIG. 38, the Web service client (WSC) 225 sends the document get back request with the document ticket to the repository WS 235 in step S707. In step S708, the repository WS 235 sends a response with respect to the document get back request. In this case, the document is returned to the MFP-B 222. When the Web service client (WSC) 225 receives the document, the Web service client (WSC) 225 sends a response including a request result with the document to the image editing WS 241 in step S709.

The image editing WS 241 edits the document, and sends an edit result notice showing an edit result with the edited document to the Web service client (WSC) 225 of the MFP-A 221 in step S710. A SOAP message for the edit result notice is the same as the SOAP message M19 shown in FIG. 27. Next, the Web service client (WSC) 225 sends the edit result notice showing the edit result with the edited document to the printing WS 240 in step S711.

When the printing WS 240 receives the edited document, the printing WS 240 prints out the edited document, sends a document print accept result to the client PC 213 in step S712. A SOAP message for the document print accept result is the same as the SOAP message M20 shown in FIG. 28.

Next, a SOAP message informed in step S701 in FIG. 37 will be described with reference to FIG. 39. FIG. 39 is a diagram showing a SOAP message for the document ticket create request according to the third embodiment of the present invention. A SOAP message M22 shown in FIG. 39 shows two document IDs "1111" and "1112" as shown by an XML sentence 457. The document ticket is created based on these two document IDs.

A SOAP message for the response with respect to the document ticket create request will be described with reference to FIG. 40. FIG. 40 is a diagram showing the SOAP message for the response with respect to the document ticket create request according to the third embodiment of the present invention. In the SOAP message M23 shown in FIG. 40, the response with respect to the document ticket create request includes the document ticket "jfowfnofjofi" as shown by an XML sentence 458.

Next, a fourth embodiment will be described. In the fourth embodiment, different from the third embodiment, the document transmission (sending and receiving a document) is conducted between the document management service 212 and the printing service 210.

Fourth Embodiment

Figure 41:
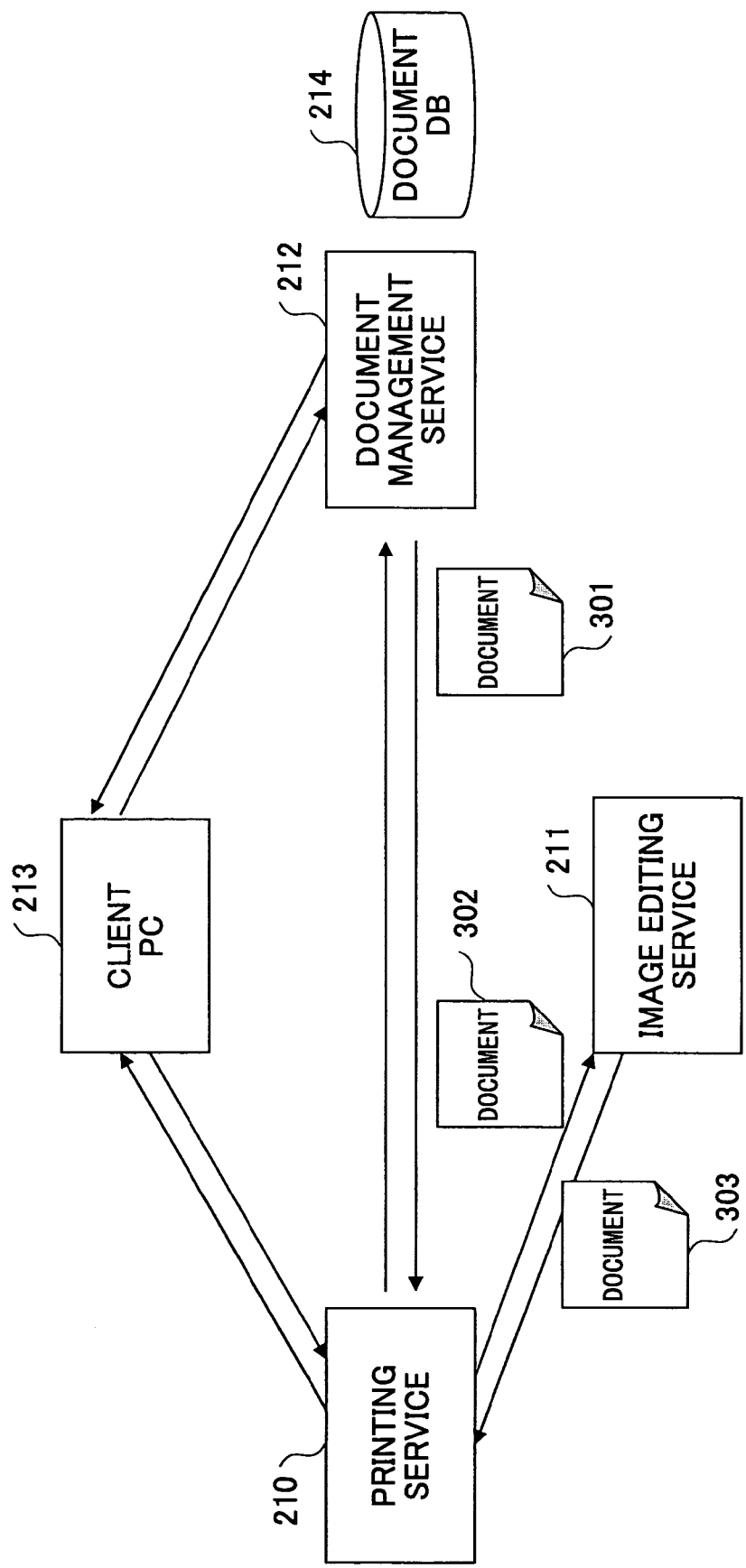
FIG. 41 is a block diagram showing a system configuration according to a fourth embodiment of the present invention.

FIG. 41 is a block diagram showing a system configuration according to the fourth embodiment of the present invention. In FIG. 41, a he client PC 213, a printing service 210, an image editing service 211, a document management service 212, a document DB 214, and documents 301, 302, and 303 are shown.

In a document flow in FIG. 41, the document 301 is sent from the document management service 212 to the printing service 210, and is sent from the printing service 210 to the image editing service 211 as the document 302. The document 302 edited by the image editing service 211 is sent to the printing service 210 as the document 303, and is printed out from the printing service 210.

Figure 42:
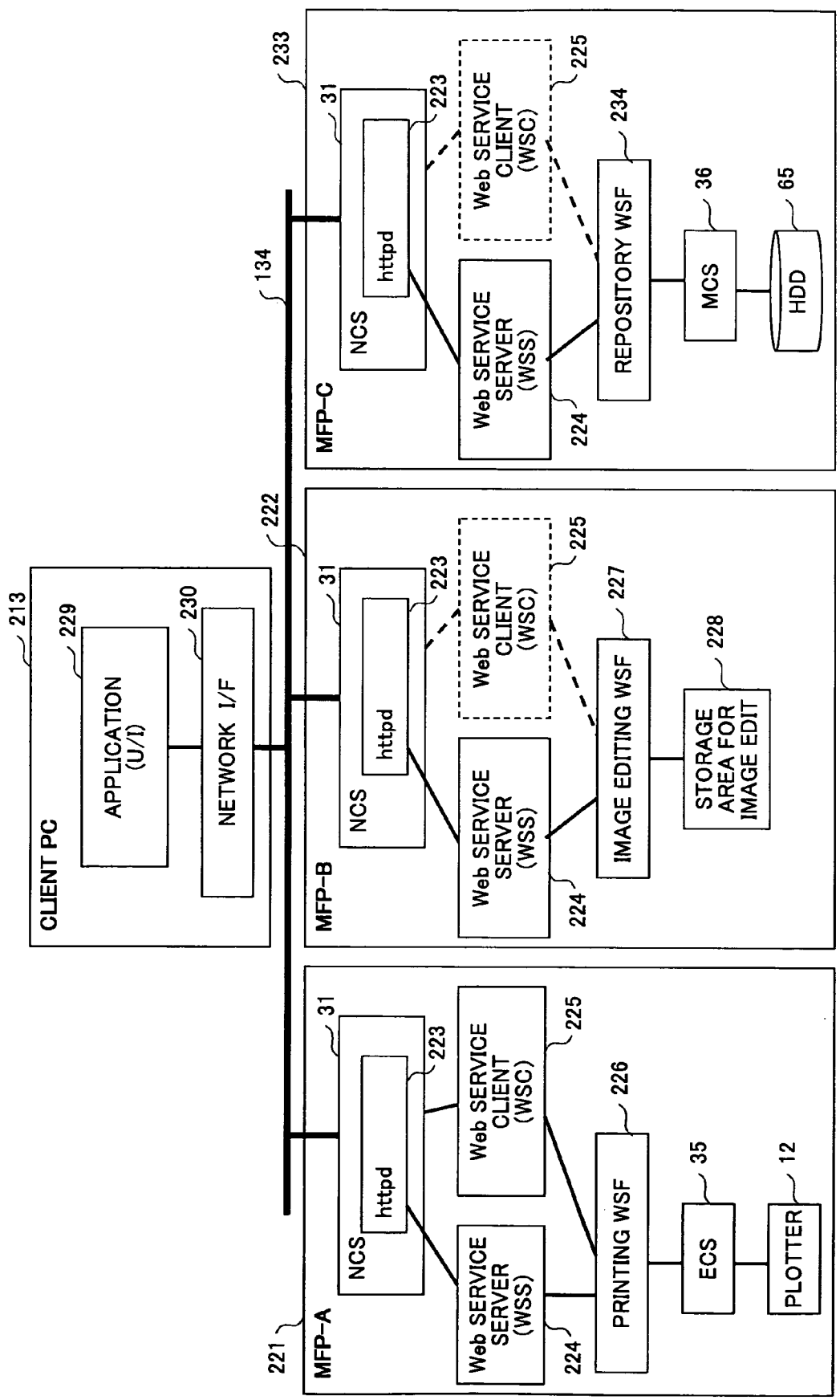
FIG. 42 is a block diagram showing a functional configuration according to the fourth embodiment of the present invention.

Next, a functional configuration will be described with reference to FIG. 42 in detail. FIG. 42 is a block diagram showing the functional configuration according to the fourth embodiment of the present invention. In FIG. 42, the client PC 213, the MFP-A 221, the MFP-B 222, and the MFP-C 233 are shown. In FIG. 42, parts different from the third embodiment will be described. In the fourth embodiment, different from the third embodiment, the Web service client (WSC) 225 is not required since the MFP-B 222 is not required to be a client of the Web service.

Figure 43:
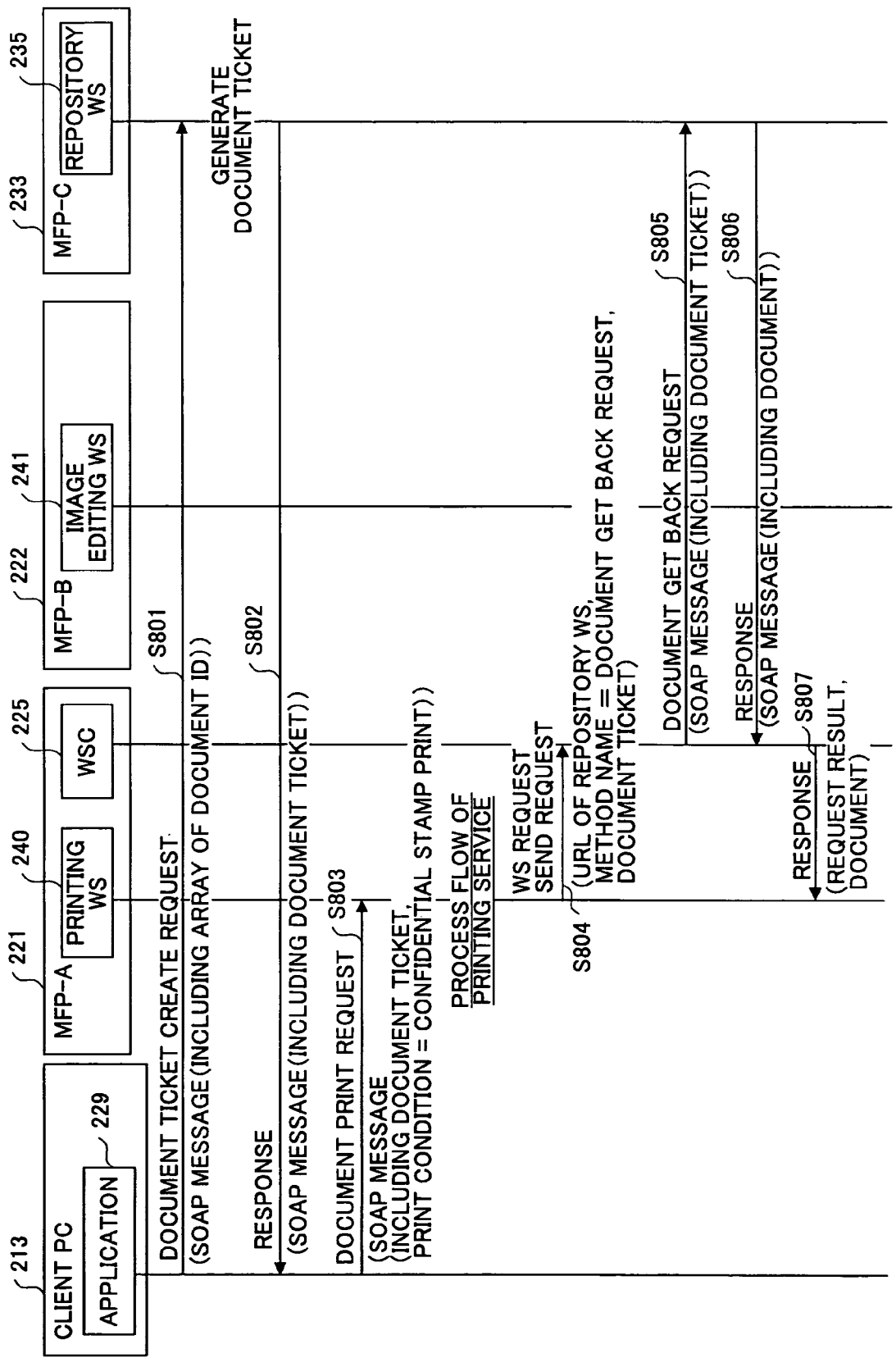
FIG. 43 is a diagram showing a sequence flow of a process concerning a print according to the fourth embodiment of the present invention.
Figure 44:
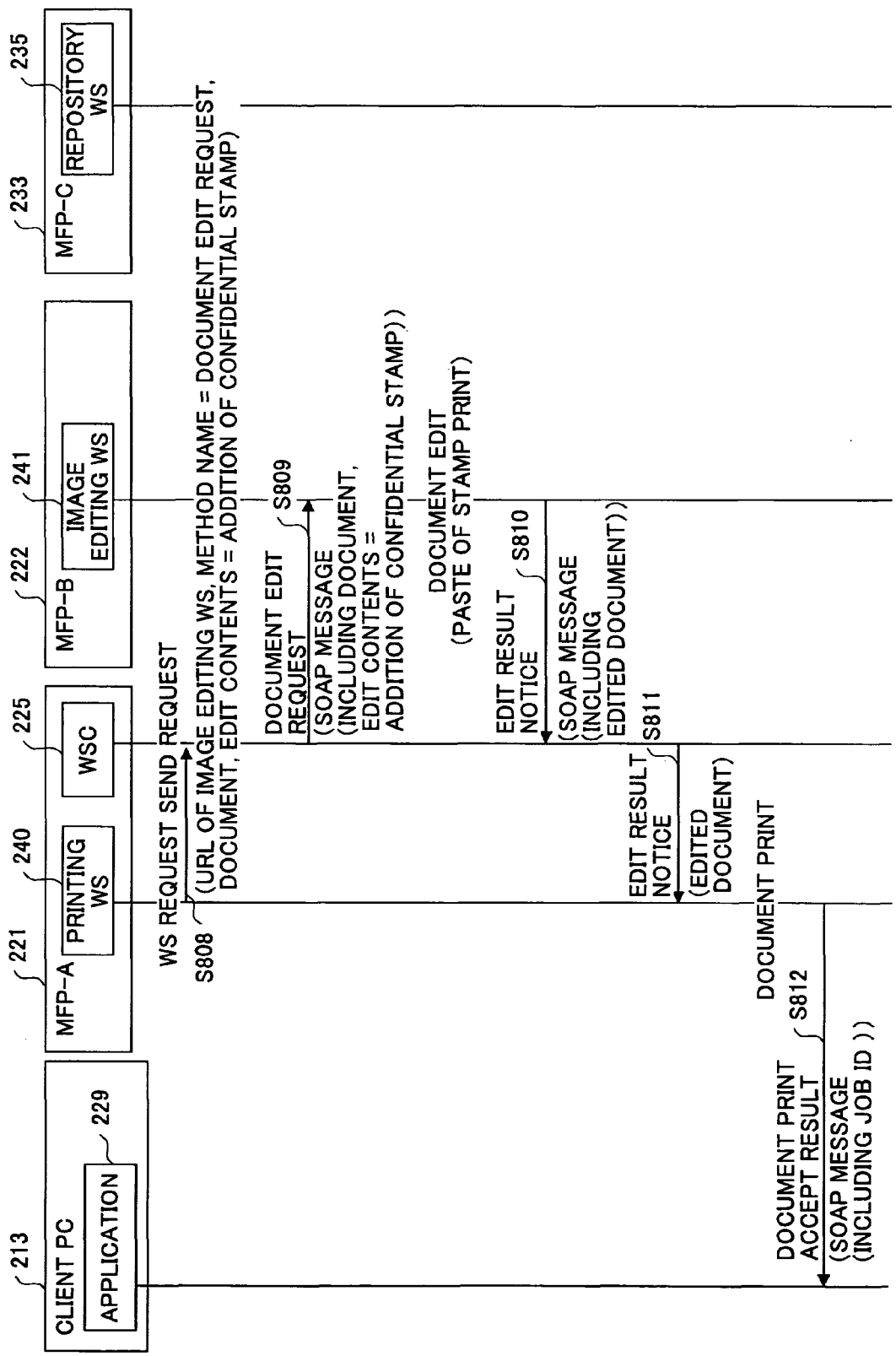
FIG. 44 is a diagram showing the sequence flow of the process concerning a print according to the fourth embodiment of the present invention.

The system configuration and the functional configuration are described above. Next, a process concerning a print will be described in accordance with a sequence flow with respect to FIG. 43 and FIG. 44. FIG. 43 and FIG. 44 are diagrams showing a sequence flow of the process concerning a print according to the fourth embodiment of the present invention. In the sequence flow shown in FIG. 43 and FIG. 44, the process is conducted among the client PC 213, the MFP-A 221, the MFP-B 222, and the MFP-C 233.

Also, in the process in accordance with the sequence flow shown in FIG. 43 and FIG. 44, the client PC 213 obtains a document ticket, and prints out a document specified by the document ticket.

In step S801, the application 229 of the client PC 213 sends a document ticket create request with an array of document IDs to the repository WS 235. The repository 235 creates a document ticket, and sends a response with the document ticket with respect to the document ticket create request in step S802. SOAP messages used in step S801 and step S802 are the same as the SOAP messages M22 and M23 described with reference to FIG. 39 and FIG. 40.

In step S803, the client PC 213 sends a document print request to the MFP-A 221. In this case, the SOAP message M21 described in FIG. 34 is used, and the document ticket, the document, and the print condition property are informed. In a case in FIG. 43, the client PC 213 requests pasting the confidential stamp as the print condition property.

When the document print request is informed to the printing WS 240, the printing WS 240 executes the process flow of the printing service described in FIG. 24. In step S804, the printing WS 240 sends a WS request send request with respect to the Web service client (WSC) 225. The function shown in FIG. 25 is used for the WS request send request, and a method name showing a document get back request, a URL of the repository WS 235, and the document ticket are informed to the Web service client (WSC) 225.

In step S805, the Web service client (WSC) 225 sends the document get back request to the repository WS 235. A SOAP message for the document get back request informs the document ticket. In step S806, the repository WS 235 sends a response including the document to the Web service client (WSC) 225. When the Web service client (WSC) 225 receives the document, the Web service client (WSC) 225 sends a response including a request result with the document to the image editing WS 241 in step S807.

Referring to FIG. 44, in step S808, the printing WS 240 sends a WS request send request to the Web service client (WSC) 225. The function shown in FIG. 25 is used for the WS request send request, and a URL of the image editing WS 241 and the document are informed to the Web service client (WSC) 225.

In step S809, the Web service client (WSC) 225 sends the document edit request to the MFP-B 222. A SOAP message for the document edit request informs the document, and the edit contents showing to paste the confidential stamp.

The image editing WS 241 edits the document, and sends an edit result notice including an edit result with the edited document to the Web service client (WSC) 225 in step S810. A SOAP message M19 shown in FIG. 27 is used for the edit result notice. Next, in step S811, the Web service client (WSC) 225 sends the edit result notice including an edit result with the edited document to the printing WS 240.

When the printing WS 240 receives the edited document, the printing WS 240 prints out the document, and sends a document print accept result to the client PC 213 in step S812. A SOAP message for the document print accept result is the same as the SOAP message M20 described in FIG. 28.

The fourth embodiment is described above. Next, a fifth embodiment will be described. In the fifth embodiment, the document management service 212 and the printing service 210 are implemented in a single MFP as the multi-functional apparatus 1.

Fifth Embodiment

Figure 45:
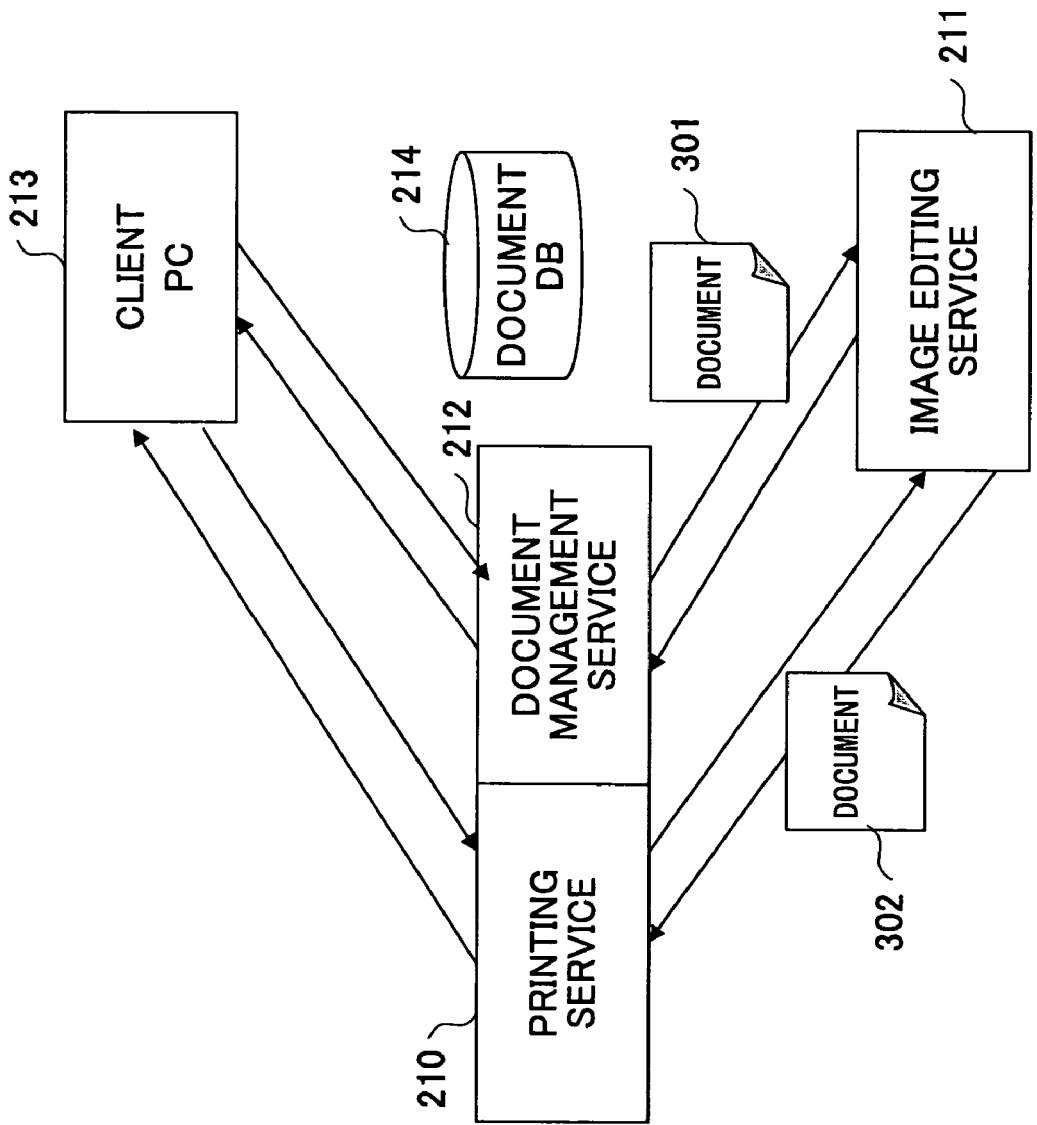
FIG. 45 is a diagram showing a system configuration according to a fifth embodiment of the present invention.

FIG. 45 is a diagram showing a system configuration according to the fifth embodiment of the present invention. In FIG. 45, a client PC 213, a printing service 210, a document management service 212, an image editing service 211, a document DB 214, and a documents 301 and 302 are shown.

In a document flow in FIG. 45, the document 301 is sent from the document management service 212 to the image editing service 211. The document 302, which is edited by the image editing service 211, is sent to the printing service 210, and printed out from the printing service 210.

Figure 46:
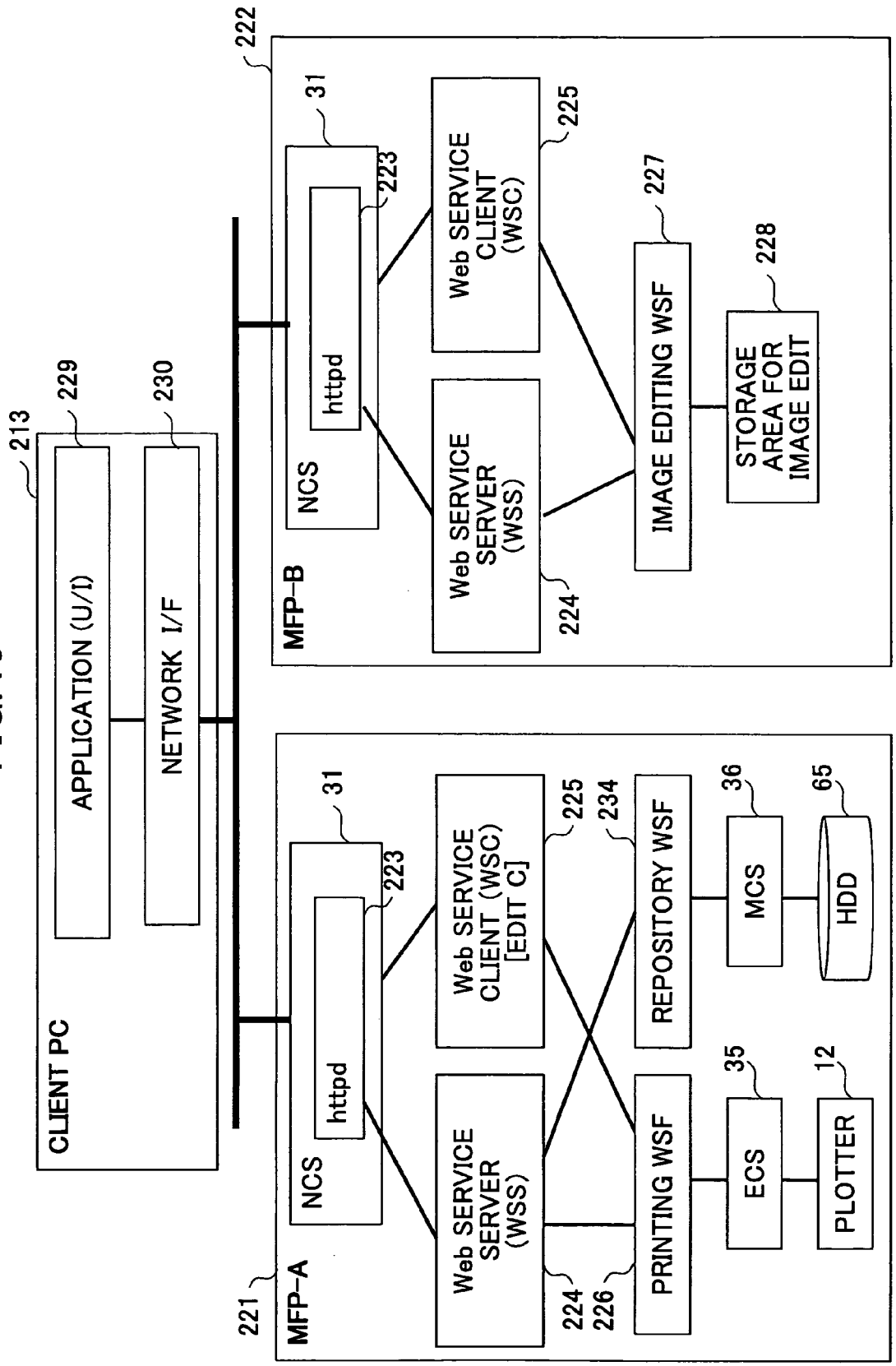
FIG. 46 is a block diagram showing a functional configuration according to the fifth embodiment of the present invention.

Next, a functional configuration will be described with reference to FIG. 46 in detail. FIG. 46 is a block diagram showing the functional configuration according to the fifth embodiment of the present invention. In FIG. 46, the client PC 213, the MFP-A 221, and the MFP-B 222 are shown. The image editing service 211 is implemented in the MFP-B 222.

Figure 47:
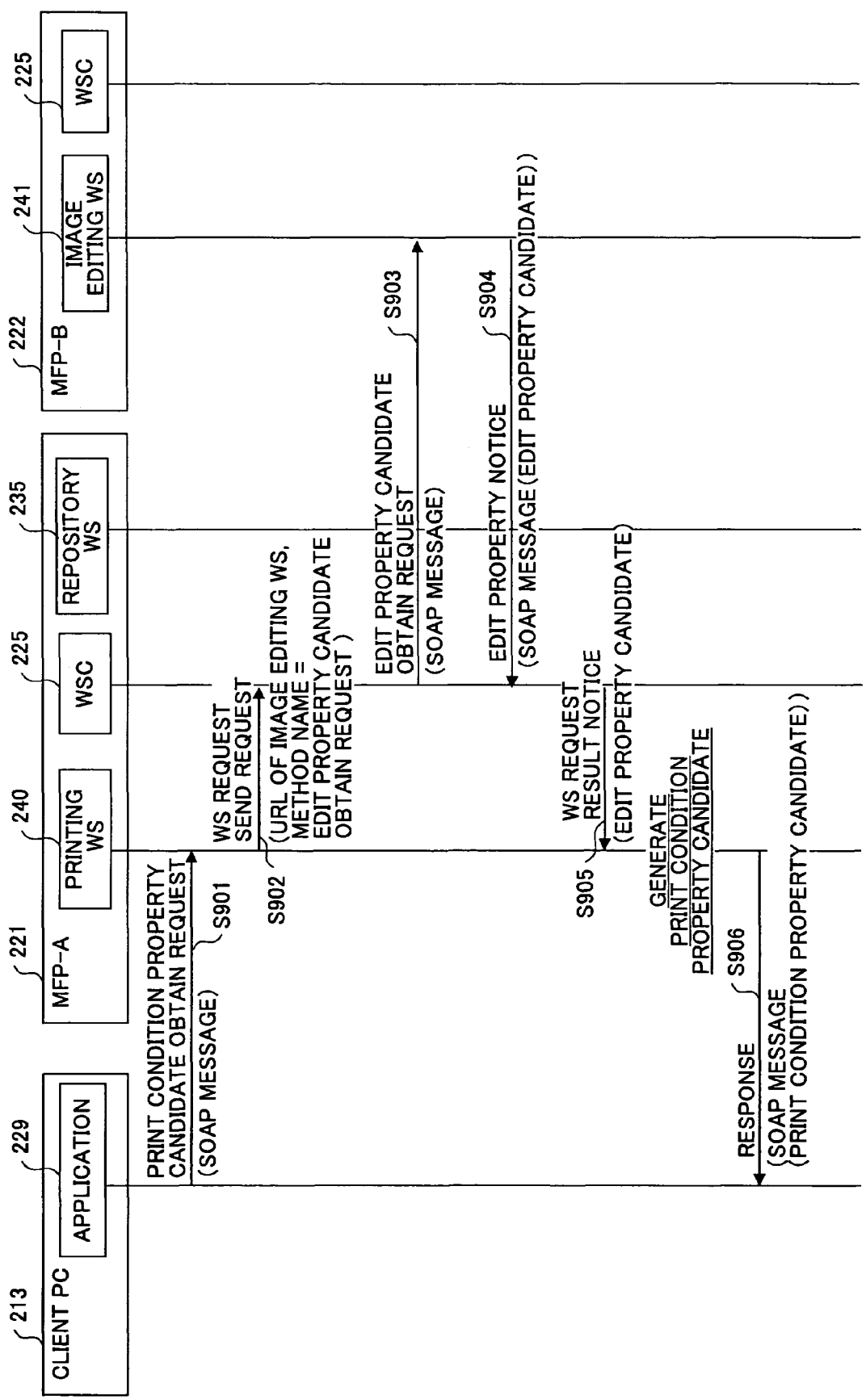
FIG. 47 is a diagram showing a sequence flow of a process for obtaining a print condition property according to the fifth embodiment of the present invention.
Figure 48:
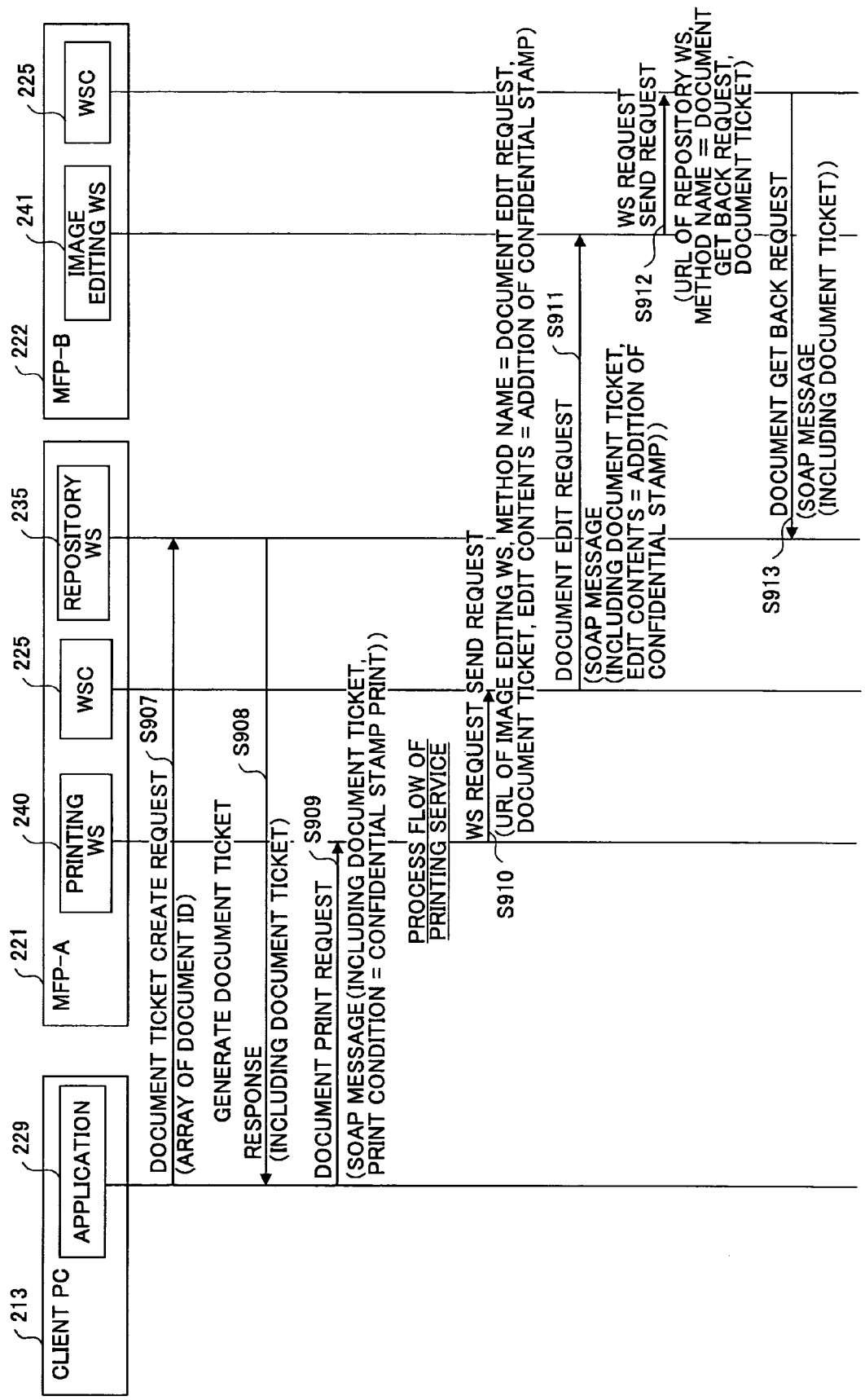
FIG. 48 is a diagram showing a sequence flow of a process concerning a print according to the fifth embodiment of the present invention.
Figure 49:
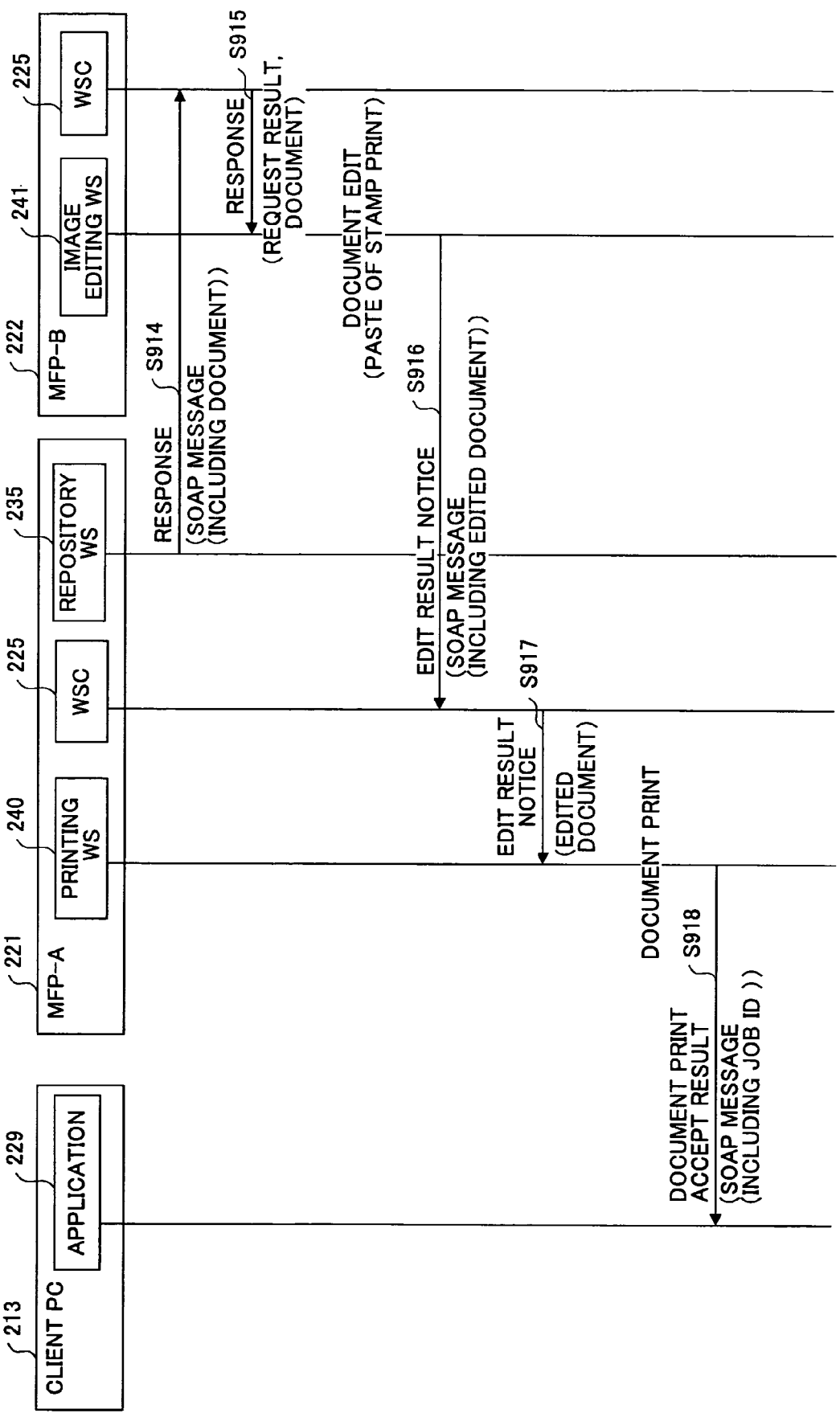
FIG. 49 is a diagram showing the sequence flow of the process concerning the print according to the fifth embodiment of the present invention.

The system configuration and the functional configuration in the fifth embodiment are described above. Next, a process for obtaining a print condition property candidate will be described in accordance with a sequence flow with reference to FIG. 47, and a process concerning a print will be described in accordance with a sequence flow with reference to FIG. 48 and FIG. 49. FIG. 47 is a diagram showing the sequence flow of the process for obtaining a print condition property according to the fifth embodiment of the present invention. FIG. 48 and FIG. 49 are diagrams showing the sequence flow of the process concerning a print according to the fifth embodiment of the present invention. In FIG. 47, FIG. 48, and FIG. 49, the processes among the client PC 213, the MFP-A 221, and the MFP-B 222 are shown. In FIG. 47, FIG. 48, and FIG. 49, the printing WS 240 collectively represents the Web service server (WSS) 224 in the MFP-A 221 and the printing WSF 226 in FIG. 46. Similarly, the repository WS 235 collectively represents the Web service server (WSS) 224 in the MFP-A 221 and the repository WSF 234 in FIG. 46.

The process for obtaining the print condition property candidate shown in FIG. 47 is a process in that the client PC 213 obtains the print condition property candidate. The process concerning the print shown in FIG. 48 and FIG. 49 is a process in that the client PC 213 obtains a document ticket and prints out the document.

The sequence flow in FIG. 47 will be described. In step S901, the client PC 213 sends a print condition property candidate obtain request, which is an obtain request for obtaining the print condition property candidate, to the printing WS 240. In step S902, the printing WS 240 sends a WS request send request, which requests sending a WS request to an indicated Web service, to the Web service client (WSC) 225. In this case, a URL of the image editing WS and a method name showing an edit property candidate obtain request are informed with the WS request send request.

In step S903, the Web service client (WSC) 225 sends the edit property candidate obtain request to the image editing WS 241 by a SOAP message. In response to the edit property candidate obtain request, the image editing WS 241 sends an edit property notice to the Web service client (WSC) 225 by a SOAP message in step S904. Accordingly, the edit property is informed to the MFP-A 221.

In step S905, the Web service client (WSC) 225 sends a WS request result notice to the printing WS 240. In this case, the edit property candidate informed from the MFP-B 222 is also informed to the printing WS 240. When the printing WS 240 receives the edit property candidate, the printing WS 240 generates a print condition property candidate from the print property candidate possessed in the printing WS 240 itself and the edit property candidate. This process is the same as the process described in accordance with the flowchart in FIG. 11.

After the printing WS 240 generates the print condition property candidate, the printing WS 240 sends the print condition property candidate to the client PC 213 by a SOAP message in step S906.

Accordingly, the client PC 213 can obtain the print condition property candidate.

Next, the process concerning the print will be described in accordance with the sequence flow shown in FIG. 48 and FIG. 49. In step S907, the client PC 213 sends a document ticket create request with an array of document IDs to the repository WS 235. In step S908, the repository WS 235 sends a response with respect to the document ticket request with the document ticket to the client PC 213.

In step S909, the client PC 213 sends a document print request to the MFP-A 221. The document print request is sent by the SOAP message M21 in FIG. 34, and the document ticket and the print condition are informed. In a case in FIG. 48, the client PC 213 requests to paste the confidential stamp as the print condition property.

When the printing WS 240 receives the document print request, the printing WS 240 executes the process flow of the printing service described in FIG. 24. The printing WS 240 sends a WS request send request to the Web service client (WSC) 225 in step S910. The function shown in FIG. 25 is used for the WS request send request, and a method name showing the document edit request, edit contents indicating to paste the confidential stamp, a URL of the image editing WS 241, and the document ticket are informed to the Web service client (WSC) 225.

In step S911, the Web service client (WSC) 225 sends a document edit request to the MFP-B 222. A SOAP message for the document edit request is the same as the SOAP message M18 shown in FIG. 26. Also, the document ticket and the edit contents are informed by the SOAP message M18.

Next, in step S912, the image editing WS 241 sends a WS request send request to the Web service client (WSC) 225 in the MFP-B 222 to get back (retrieve) the document from the repository WS 235. The function shown in FIG. 25 is used for the WS request send request, and a URL of the repository WS 235, a method name showing a document get back request, and the document ticket are informed to the Web service client (WSC) 225.

In step S913, the Web service client (WSC) 225 sends the document get back request with the document ticket to the repository WS 235. Subsequently, the sequence flow in FIG. 49 will be described. In step S 914, the repository WS 235 sends a response with respect to the document get back request to the Web service client (WSC) 225 of the MFP-B 222. In this case, the MFP-B 222 gets back the document from the repository WS 235. When the Web service client (WSC) 225 of the MFP-B 222 receives the document, the Web service client (WSC) 225 sends a response including a request result with the document to the image editing WS 241 in step S915.

The image editing WS 241 edits the document, and sends an edit result notice showing the edit result with the edited document to the Web service client (WSC) 225 of the MFP-A 221 in step S916. A SOAP message, which is the same as the SOAP message M19 shown in FIG. 27, is used for the edit result notice. Next, the Web service client (WSC) 225 sends the edit result notice showing the edit result with the edited document to the printing WS 240 in step S917.

When the printing WS 240 receives the edited document, the printing WS 240 prints out the document, and sends a document print accept result to the client PC 213 in step S918. The document print accept result is sent by the SOAP message M20 described in FIG. 28.

The fifth embodiment is described above. Next, a sixth embodiment will be described. In the sixth embodiment, the document management service 212 and the image editing service 211 are implemented in a single MFP as the multifunctional apparatus 1.

Sixth Embodiment

Figure 50:
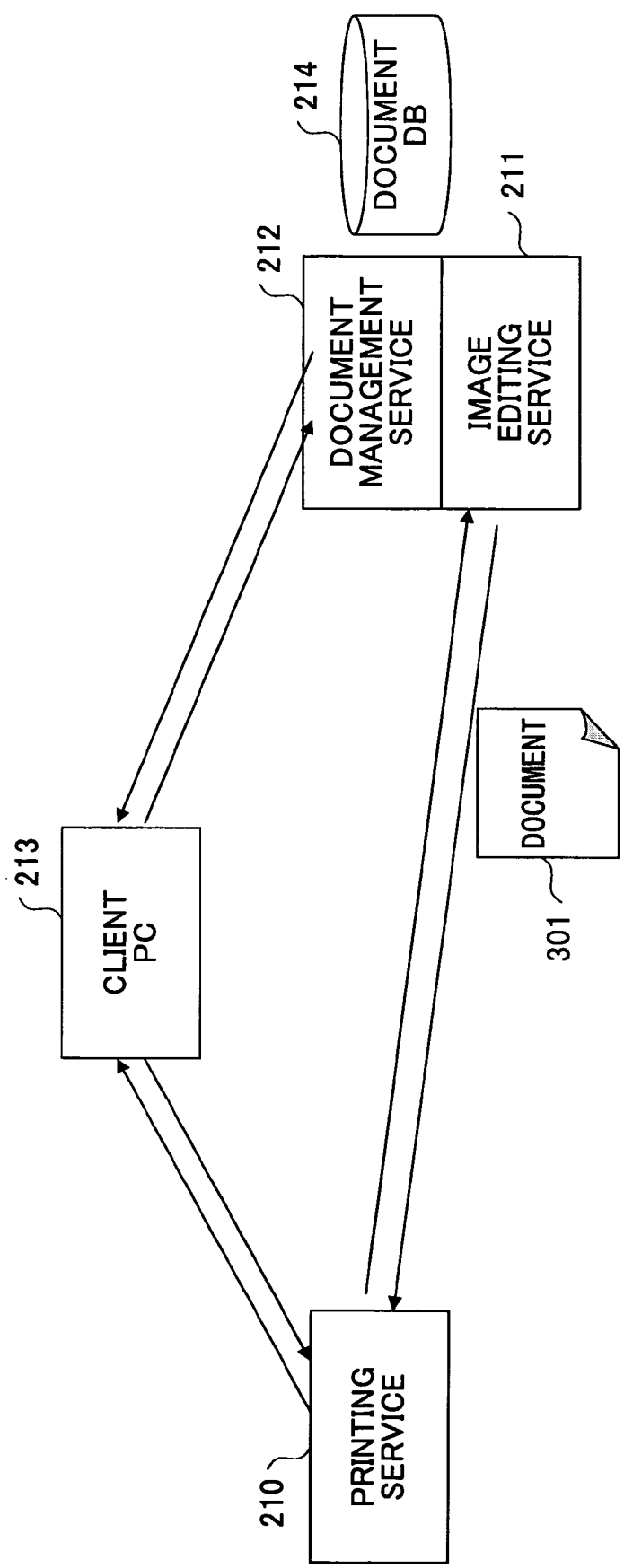
FIG. 50 is a block diagram showing a system configuration according to a sixth embodiment of the present invention.

FIG. 50 is a block diagram showing a system configuration according to the sixth embodiment of the present invention. In FIG. 50, a client PC 213, a printing service 210, a document management service 212, an image editing service 211, a document DB 214, and document 301.

In a document flow in FIG. 50, the document 301 is sent from the image editing service 211 to the printing service 210, and is printed out from the printing service 210. Accordingly, the document transmission is conducted just once.

Figure 51:
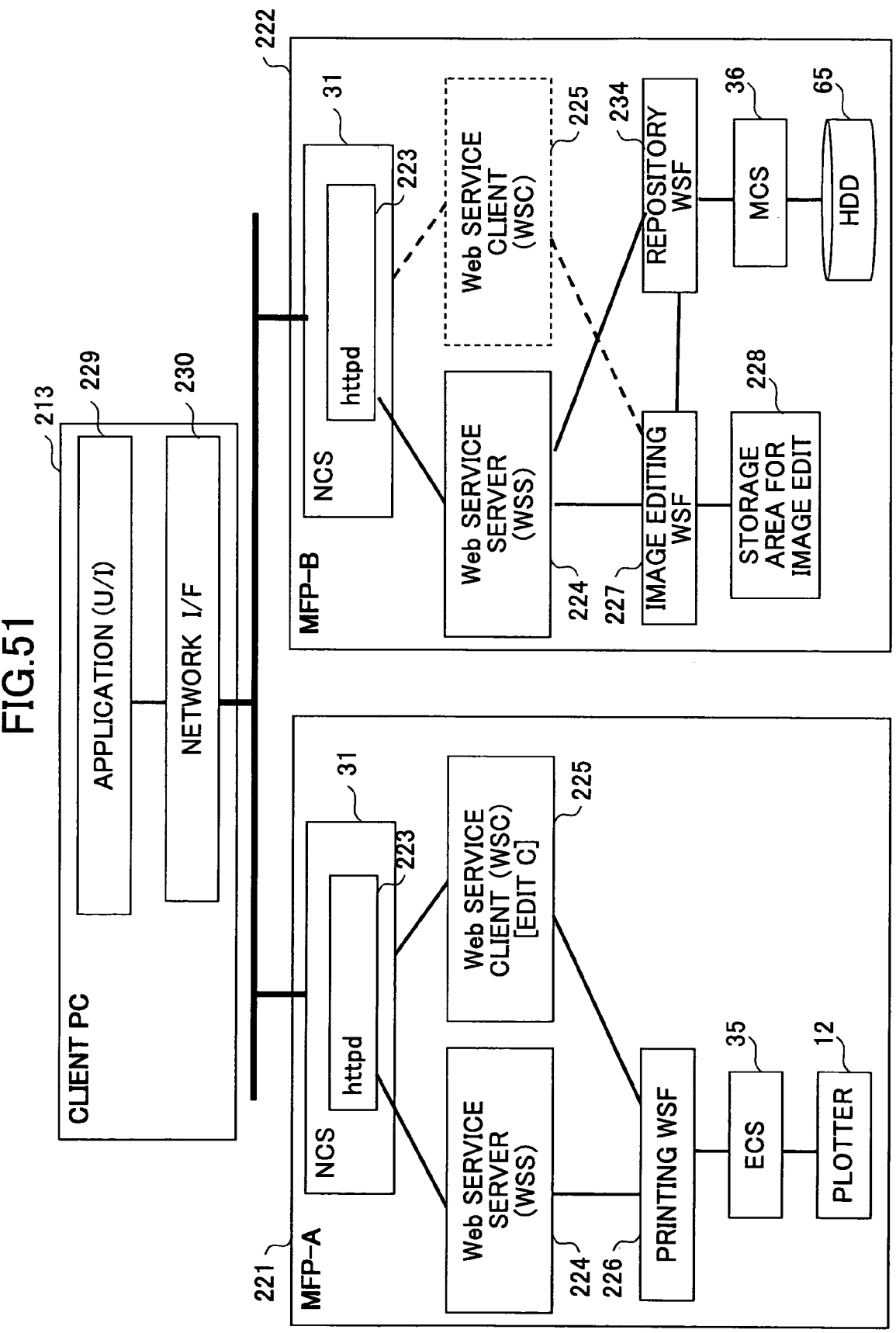
FIG. 51 is a diagram showing a functional configuration according to the sixth embodiment of the present invention.

Next, a functional configuration will be described with reference to FIG. 51 in detail. In FIG. 51, the client PC 213, the MFP-A 221, and the MFP-B 222 are shown. In FIG. 51, the image editing WSF 227 and the repository WSF 234 are implemented in the MFP-B 222. Accordingly, the printing WSF 226 is implemented in the MFP-A 221.

Figure 52:
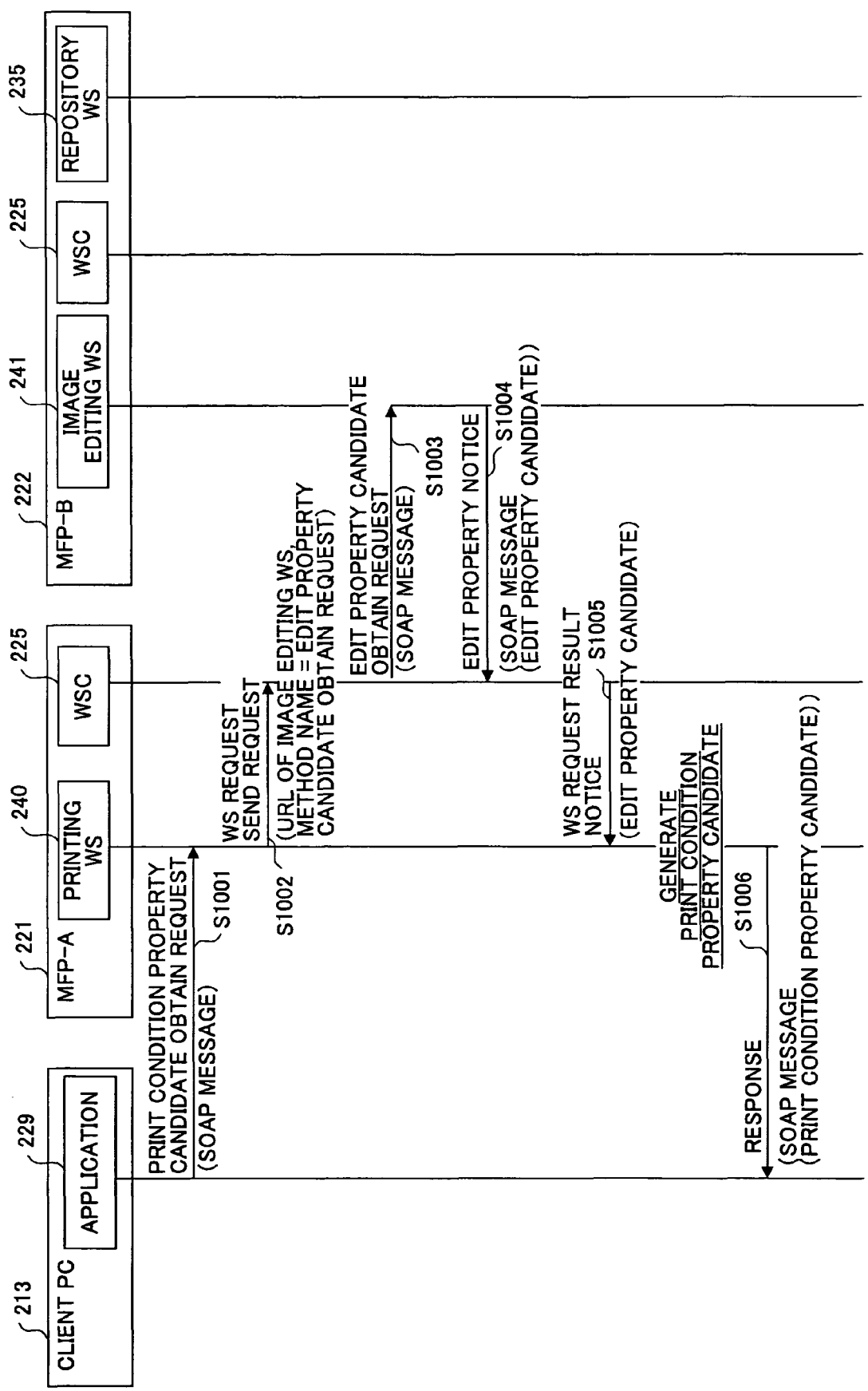
FIG. 52 is a diagram showing a sequence flow of the process for obtaining a print condition property candidate according to the seventh embodiment of the present invention.
Figure 53:
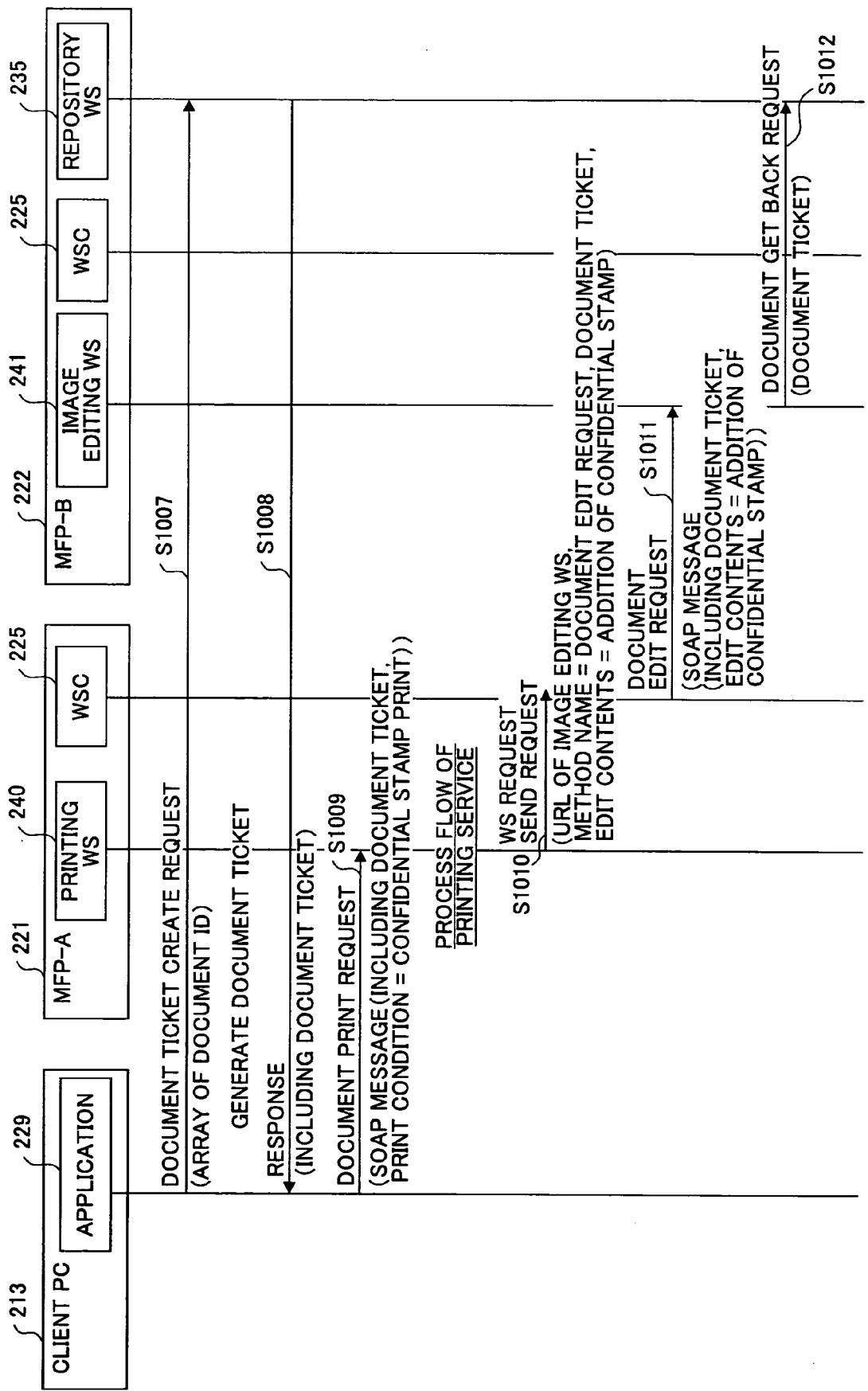
FIG. 53 is a diagram showing a sequence flow of a process concerning a print according to the sixth embodiment of the present invention.
Figure 54:
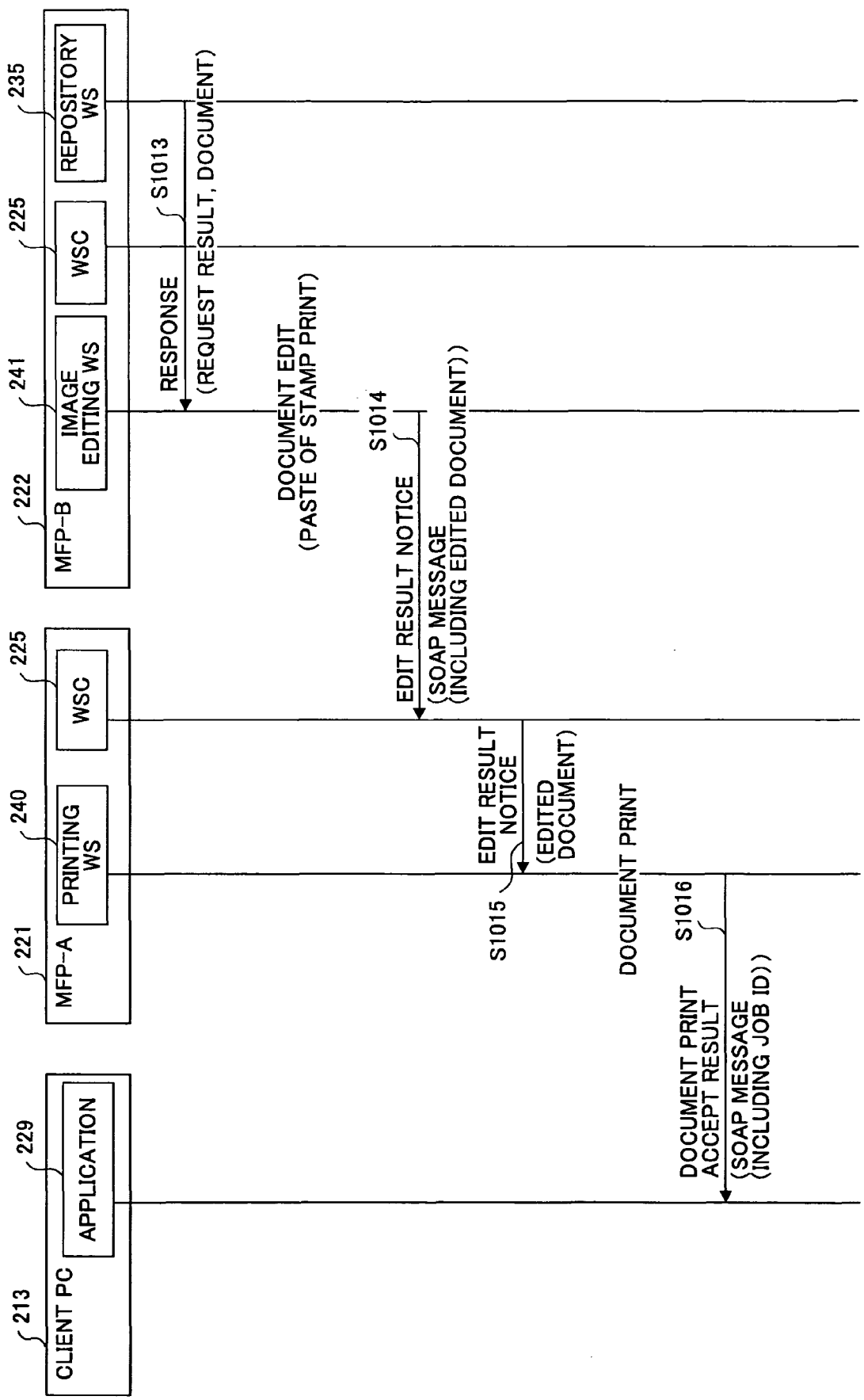
FIG. 54 is a diagram showing the sequence flow of the process concerning a print according to the sixth embodiment of the present invention.

The system configuration and the functional configuration in the sixth embodiment are described above. Next, a process for obtaining a print condition property candidate and a process concerning a print will be described in accordance with sequence flows. In the sequence flows shown in FIG. 52, FIG. 53, and FIG. 54, processes, which are conducted among the client PC 213, the MFP-A 221, and the MFP-B 222, are shown. In FIG. 52, FIG. 53, and FIG. 54, the image editing WS 241 collectively represents the Web service server (WSS) 224 and the image editing WSF 227 in FIG. 51. Similarly, the repository WS 235 collectively represents the Web service server (WSS) 224 and the repository WSF 234 in FIG. 51.

In the process shown in FIG. 52, the client PC 213 obtains the print condition property candidate. In the process shown in FIG. 53 and FIG. 54, the client PC 213 obtains a document ticket and prints out the document.

The sequence flow for obtaining the print condition property candidate will be described with reference to FIG. 52. FIG. 52 is a diagram showing the sequence flow of the process for obtaining the print condition property candidate according to the sixth embodiment of the present invention. In FIG. 52, in step S1001, the client PC 213 sends a print condition property candidate obtain request to the printing WS 240. In step S1002, the printing WS 240 sends a WS request send request to the Web service client (WSC) 225 in the MFP-A 221. In this case, a URL of the image editing WS 241 and a method name showing the edit property candidate obtain request are informed to the Web service client (WSC) 225 of the MFP-A 221.

In step S1003, the Web service client of the MFP-A 221 sends an edit property candidate obtain request to the image editing WS 241 by a SOAP message. In step S1004, in response to the edit property candidate obtain request, the image editing WS 241 sends an edit property notice to the Web service client (WSC) 225 of the MFP-A 221. Accordingly, the edit property is informed to the MFP-A 221.

In step S1005, the Web service client (WSC) 225 of the MFP-A 221 sends a WS request result notice to the printing WS 240. In this case, the edit property candidate, which is informed from the MFP-B 222, is also informed to the printing WS 240. When the printing WS 240 receives the edit property candidate, the printing WS 240 generates the print condition property candidate from the print property candidate possessed in the printing WS 240 itself and the edit property candidate informed from the Web service client (WSC) 225. This process is the same as the process described in accordance with the flowchart shown in FIG. 11.

After the printing WS 240 generates the print condition property candidate, the printing WS 240 sends the print condition property candidate to the client PC 213 by a SOAP message in step S1006.

By the above-described process, the client PC 213 can obtain the print condition property candidate.

Next, the process concerning the print will be described with reference to FIG. 53 and FIG. 54. In step S1007, the client PC 213 sends a document ticket create request with an array of document IDs to the repository WS 235. In step S1008, the repository WS 235 sends a response with a document ticket with respect to the document ticket create request to the client PC 213.

In step S1009, the client PC 213 sends a document print request to the MFP-A 221. The document print request is sent by the SOAP message M21 shown in FIG. 34, and the document ticket and the print condition are informed to the MFP-A 221. In a case in FIG. 53, the client PC 213 requests to paste the confidential stamp as the print condition property.

When the printing WS 240 receives the document print request, the printing WS 240 executes the process flow of the printing service described in FIG. 24. The printing WS 240 sends a WS request send request to the Web service client (WSC) 225 of the MFP-A 221 in step S1010. The function shown in FIG. 25 is used for the WS request send request, and a method name showing the document edit request, edit contents indicating to paste the confidential stamp, a URL of the image editing WS 241, and the document ticket are informed to the Web service client (WSC) 225 of the MFP-A 221.

In step S1011, the WSC 225 of the MFP-A 221 sends the document edit request to the MFP-B 222. A SOAP message for the document edit request is the same as the SOAP message M18 shown in FIG. 26, and the document ticket and the edit contents are informed by the SOAP message.

Next, in step S1012, the image editing WS 241 sends a document get back request with the document ticket to the repository WS 235 in the MFP-B 222 in order to get back (retrieve) the document from the repository WS 235.

Subsequently, referring to FIG. 54, in step S1013, the repository WS 235 sends a response including a request result and the document to the image editing WS 241.

The image editing WS 241 edits the document, and sends an edit result with the edited document to the Web service client (WSC) 225 of the MFP-A 221 in step S1014. The edit result is sent by the SOAP message M19 shown in FIG. 27. Next, in step S1015, the Web service client (WSC) 225 sends the edit result with the edited document to the printing WS 240.

When the printing WS 240 receives the edited document, the printing WS 240 prints out the edited document and sends a document print accept result to the client PC 213 in step S1016. The document print accept result is sent by the SOAP message M20 described in FIG. 28.

The sixth embodiment is described above. Next, a seventh embodiment will be described. In the seventh embodiment, the printing service 210 and the image editing service 211 are implemented in a single MFP as the multi-functional apparatus 1.

Seventh Embodiment

Figure 55:
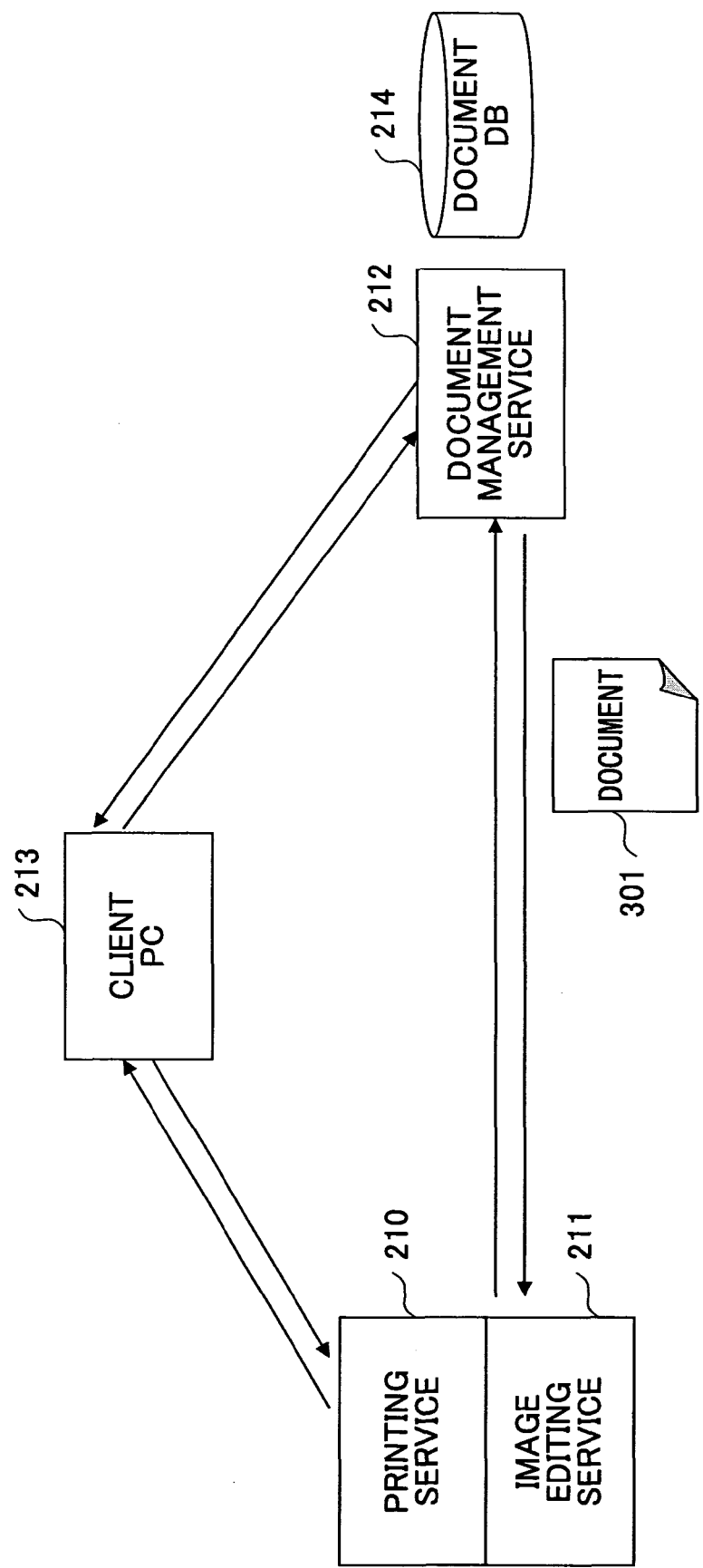
FIG. 55 is a block diagram showing a system configuration according to a seventh embodiment of the present invention.

FIG. 55 is a block diagram showing a system configuration according to the seventh embodiment of the present invention. In FIG. 55, a client PC 213, a printing service 210, a document management service 212, an image editing service 211, a document DB 214, and a document 301 are shown.

In a document flow in FIG. 55, the document 301 is sent from the document management service 212 to the image editing service 211, and an edited document as the document 301 is printed out from the printing service 210. Accordingly, the document transmission is conducted just once.

Figure 56:
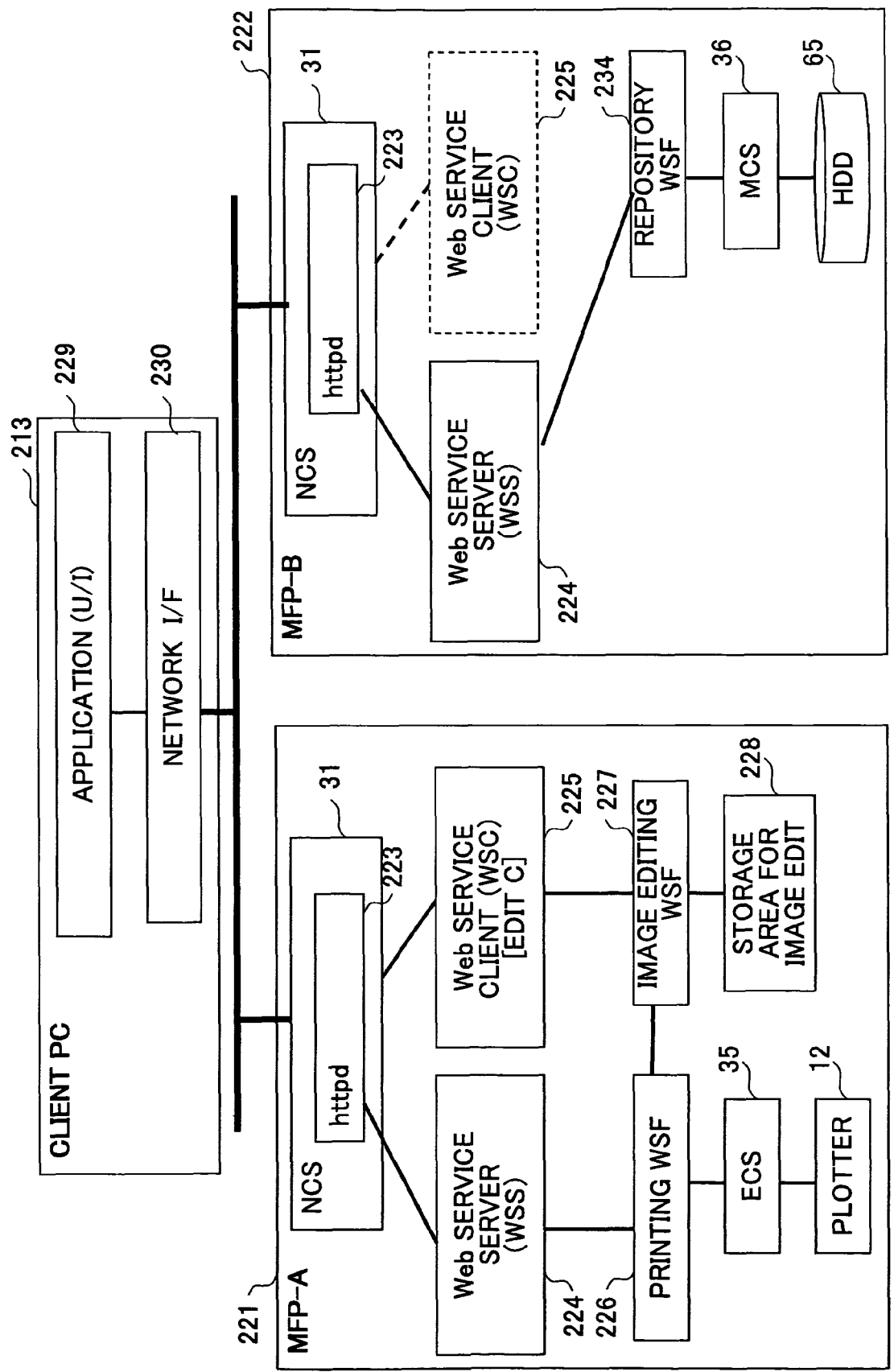
FIG. 56 is a diagram showing a functional configuration according to the seventh embodiment of the present invention.

Next, a functional configuration will be described with reference to FIG. 56 in detail. In FIG. 56, the client PC 213, the MFP-A 221, and the MFP-B 222 are shown. In FIG. 56, the printing WSF 226 as the printing service 210 and the image editing WSF 227 as the image editing service 211 are implemented in the MFP-A 221. Moreover, the repository WSF 234 as the repository service is implemented in the MFP-B 222.

Figure 57:
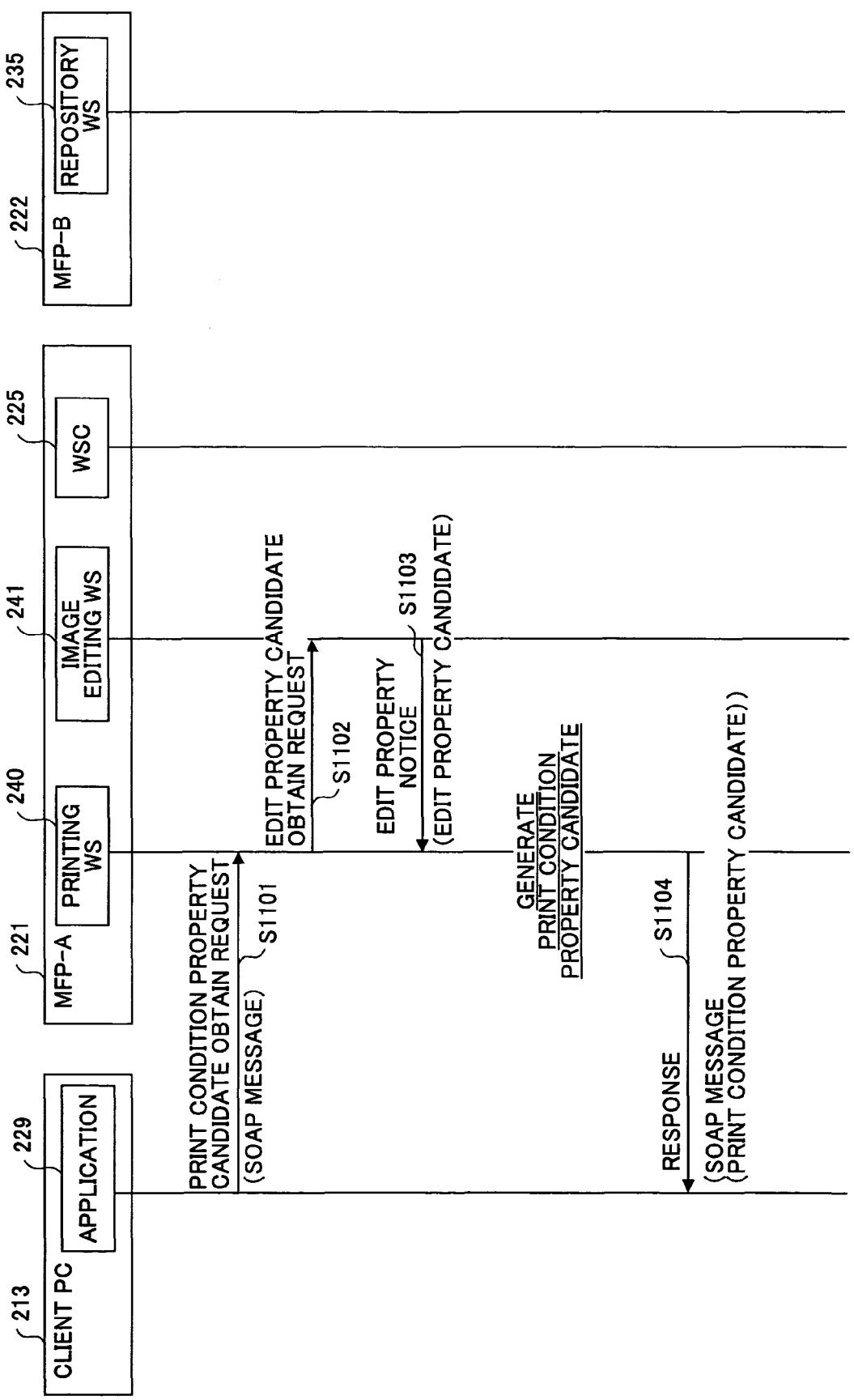
FIG. 57 is a diagram showing a sequence flow of a process for obtaining the print condition property according to the seventh embodiment of the present invention.
Figure 58:
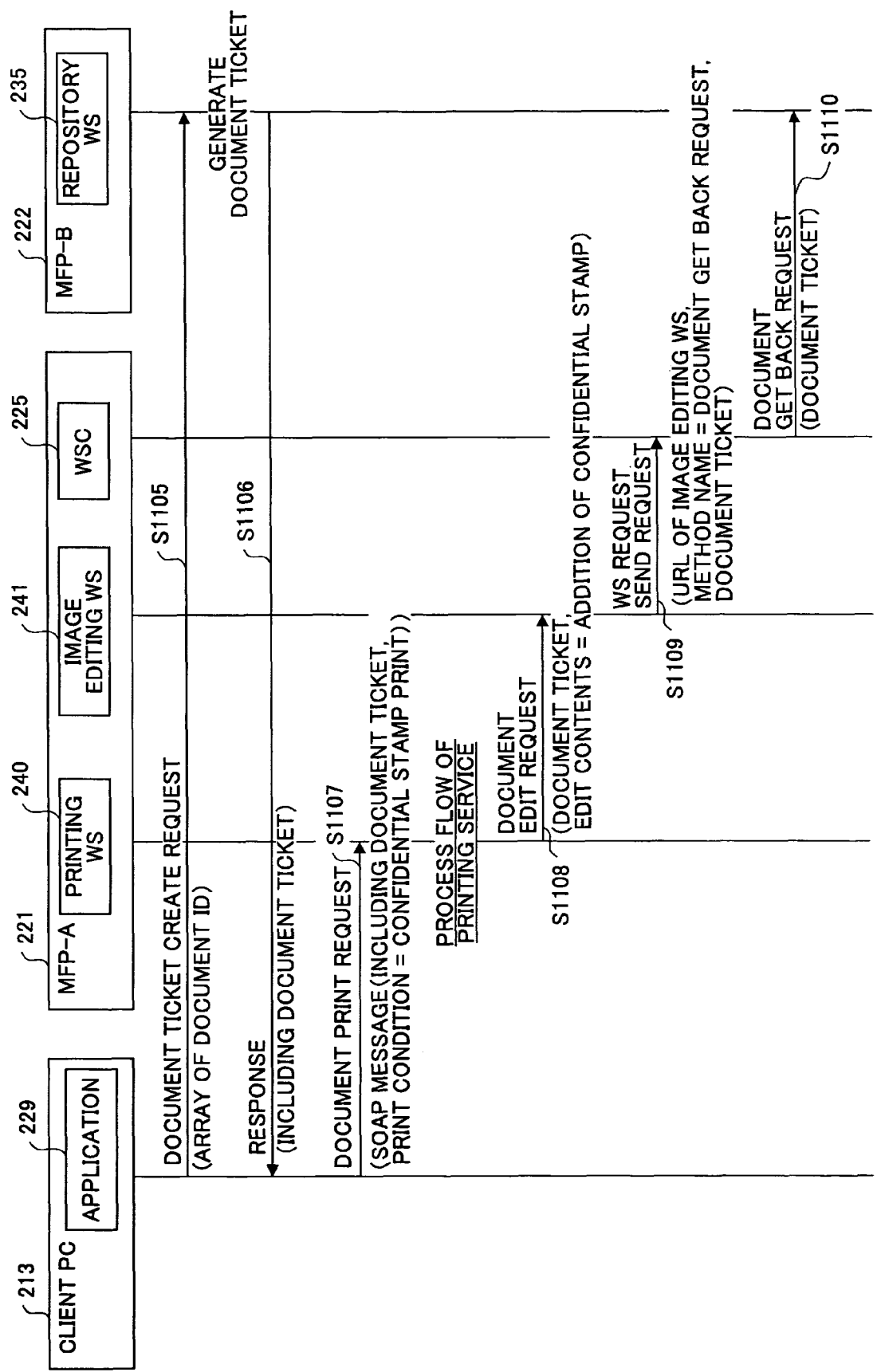
FIG. 58 is a diagram showing a sequence flow of a process concerning a print according to the seventh embodiment of the present invention.
Figure 59:
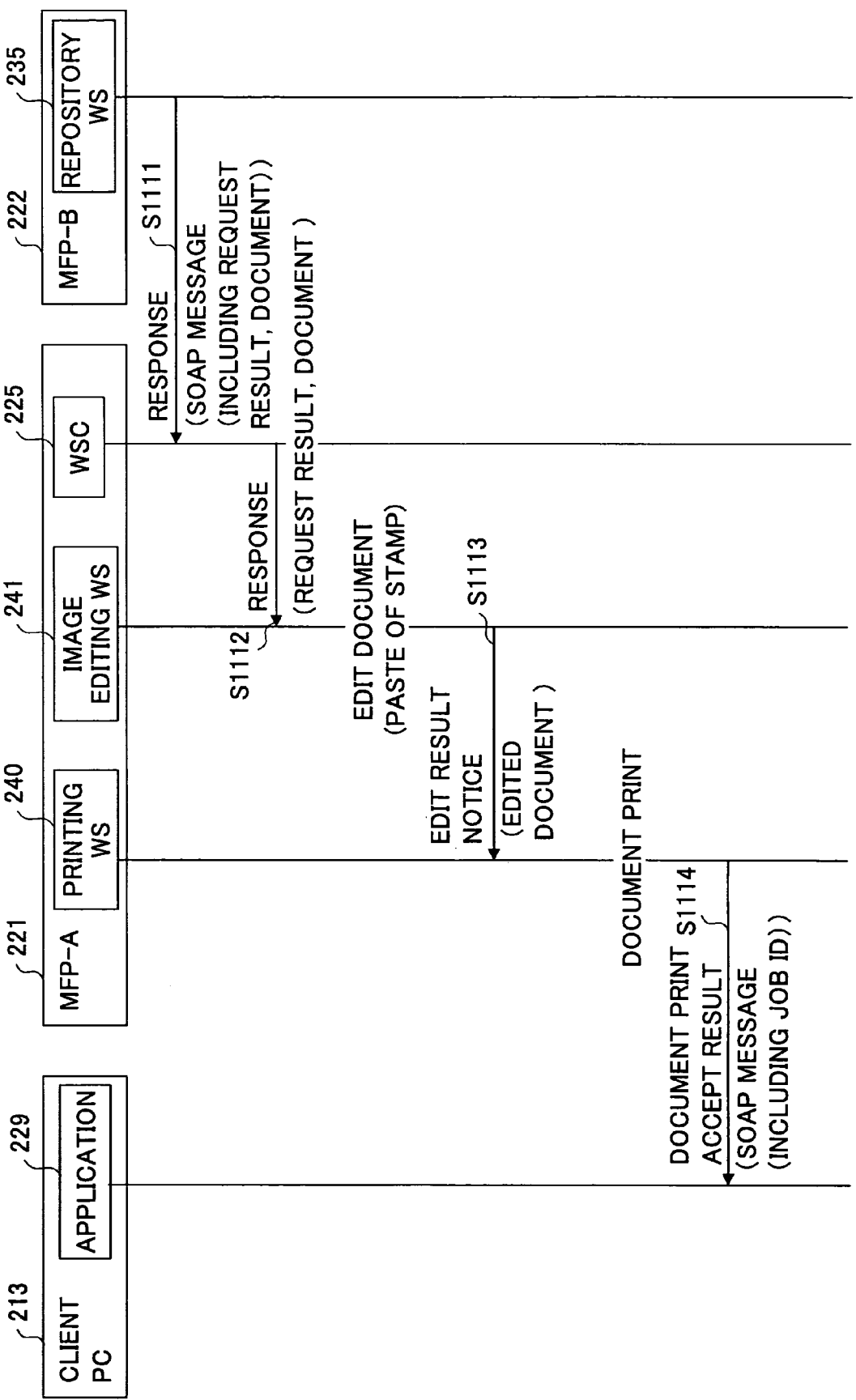
FIG. 59 is a diagram showing the sequence flow of the process concerning a print according to the seventh embodiment of the present invention.

The system configuration and the functional configuration in seventh embodiment are described above. Next, a process for obtaining a print condition property candidate and a process concerning a print will be described in accordance with sequence flows. In the sequence flows shown in FIG. 57, FIG. 58, and FIG. 59, processes, which are conducted among the client PC 213, the MFP-A 221, and the MFP-B 222, are shown. In FIG. 57, FIG. 58, and FIG. 59, the printing WS 240 collectively represents the Web service server (WSS) 224 and the printing WSF 226 in the MFP-A 221 in FIG. 56. Similarly, the image editing WS 241 collectively represents the Web service server (WSS) 224 and the image editing WSF 227 in the MFP-A 221 in FIG. 56.

In the process shown in FIG. 57, the client PC 213 obtains the print condition property candidate. In the process shown in FIG. 58 and FIG. 59, the client PC 213 obtains a document ticket and prints out the document.

The sequence flow for obtaining the print condition property candidate will be described with reference to FIG. 57. FIG. 52 is a diagram showing the sequence flow of the process for obtaining the print condition property candidate according to the seventh embodiment of the present invention. In FIG. 57, in step S1101, the client PC 213 sends a print condition property candidate obtain request to the printing WS 240. In step S1102, the printing WS 240 sends a WS request send request to the image editing WS 241. In response to the WS request send request, the image editing WS 241 informs an edit property notice to the printing WS 240 in step S1103.

When the printing WS 240 receives the edit property candidate, the printing WS 240 generates the print condition property candidate from the print property possessed in the printing WS 240 itself and the edit property candidate informed from the image editing WS 241. This process is conducted as described in accordance with the flowchart shown in FIG. 11.

After the printing WS 240 generates the print condition property candidate, the printing WS 240 sends the print condition property candidate by a SOAP message to the client PC 213 in step S1104.

By the above-described process, the client PC 213 can obtain the print condition property candidate.

Next, the process concerning the print will be described with reference to FIG. 58 and FIG. 59. In step S1105, the client PC 213 sends a document ticket create request with an array of document IDs to the repository WS 235. In step S1106, the repository WS 235 sends a response with a document ticket with respect to the document ticket create request to the client PC 213.

In step S1107, the client PC 213 sends a document print request to the MFP-A 221. The document print request is sent by the SOAP message M21 shown in FIG. 34, and the document ticket and the print condition are informed to the MFP-A 221. In a case in FIG. 58, the client PC 213 requests to paste the confidential stamp as the print condition property.

When the printing WS 240 receives the document print request, the printing WS 240 executes the process flow of the printing service described in FIG. 24. In step S1108, the printing WS 240 sends a document edit request to the image editing WS 241. The document edit request informs the document ticket and the edit contents.

Next, in step S1109, the image editing WS 241 sends a WS request send request to the Web service client (WSC) 225 in order to get back (retrieve) the document from the repository WS 235. The function shown in FIG. 25 is used for the WS request send request, and a URL of the repository WS 235, a method name showing a document get back request, and the document ticket to the Web service client (WSC) 225 of the MFP-A 221. The Web service client (WSC) 225 sends the document get back request with the document ticket to the repository WS 235 (step S1110).

Subsequently, referring to FIG. 54, in step S1111, the repository WS 235 sends a response including a request result and the document with respect the document get back request. In this case, the document is returned to the MFP-A 221. When the Web service client (WSC) 225 receives the document, the Web service client (WSC) 225 sends a response including a request result and the document in step S1112.

The image editing WS 241 edits the document, and sends an edit result notice showing an edit result with the edited document to the printing WS 240 in step S1113. When the printing WS 240 receives the edited document, the printing WS 240 prints out the edited document, and sends a document print accept result to the client PC 213 in step S1114. The document print accept result is sent by the SOAP message M20 described in FIG. 28.

The seventh embodiment is described above. Next, an eighth embodiment will be described. In the eighth embodiment, all three services: a printing service 210, a document management service 212, and an image editing service 211, are implemented in a single MFP as the multi-functional apparatus 1.

Eighth Embodiment

Figure 60:
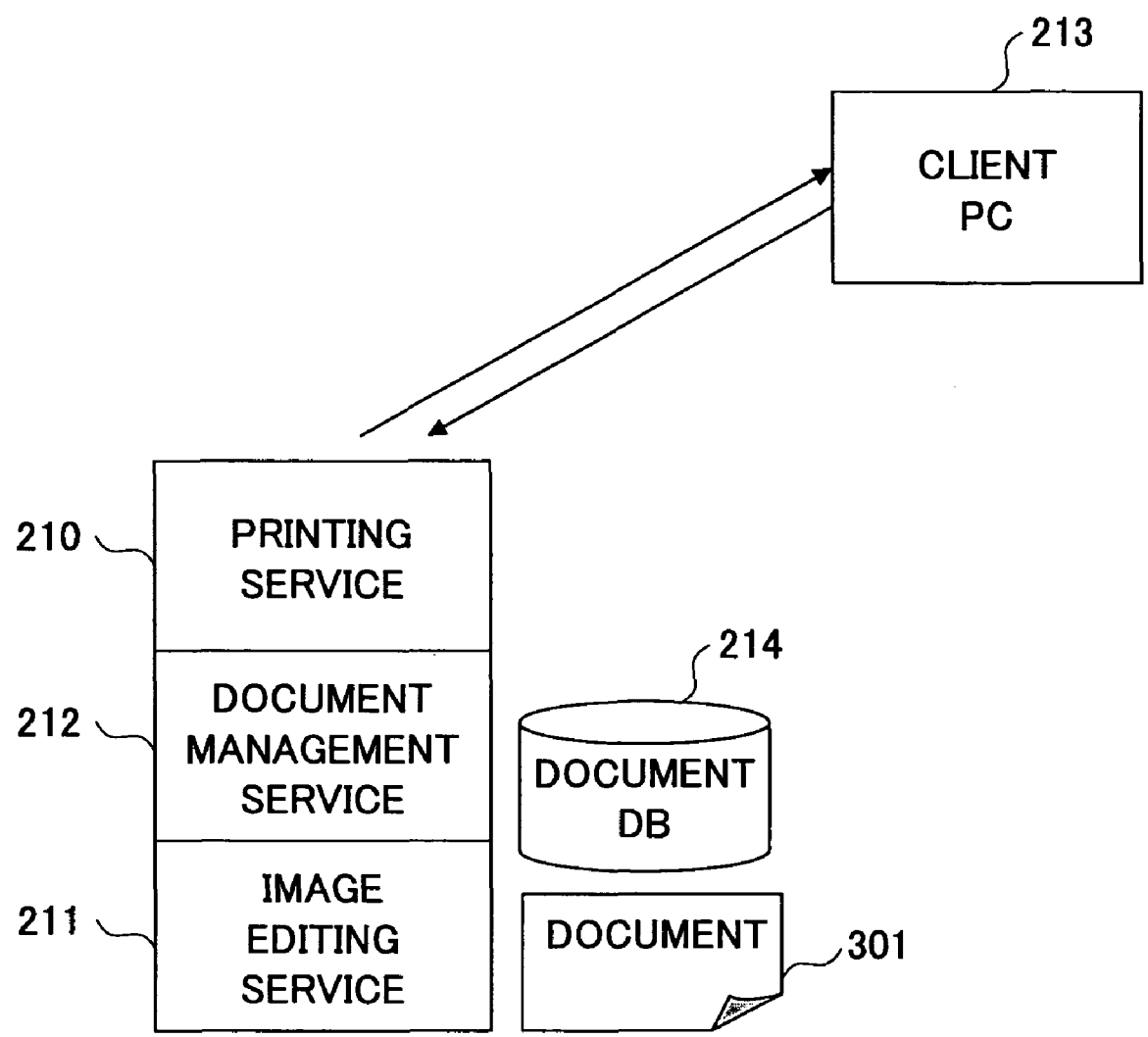
FIG. 60 is a block diagram showing a system configuration according to an eighth embodiment of the present invention.

FIG. 60 is a block diagram showing a system configuration according to the eighth embodiment of the present invention. In FIG. 60, the client PC 213, the printing service 210, the document management service 212, the image editing service 211, the document DB 214, and the document 301 are shown.

In a document flow in FIG. 60, since the document is stored in an MFP that edits and/or prints out the document, the document transmission is not conducted.

Figure 61:
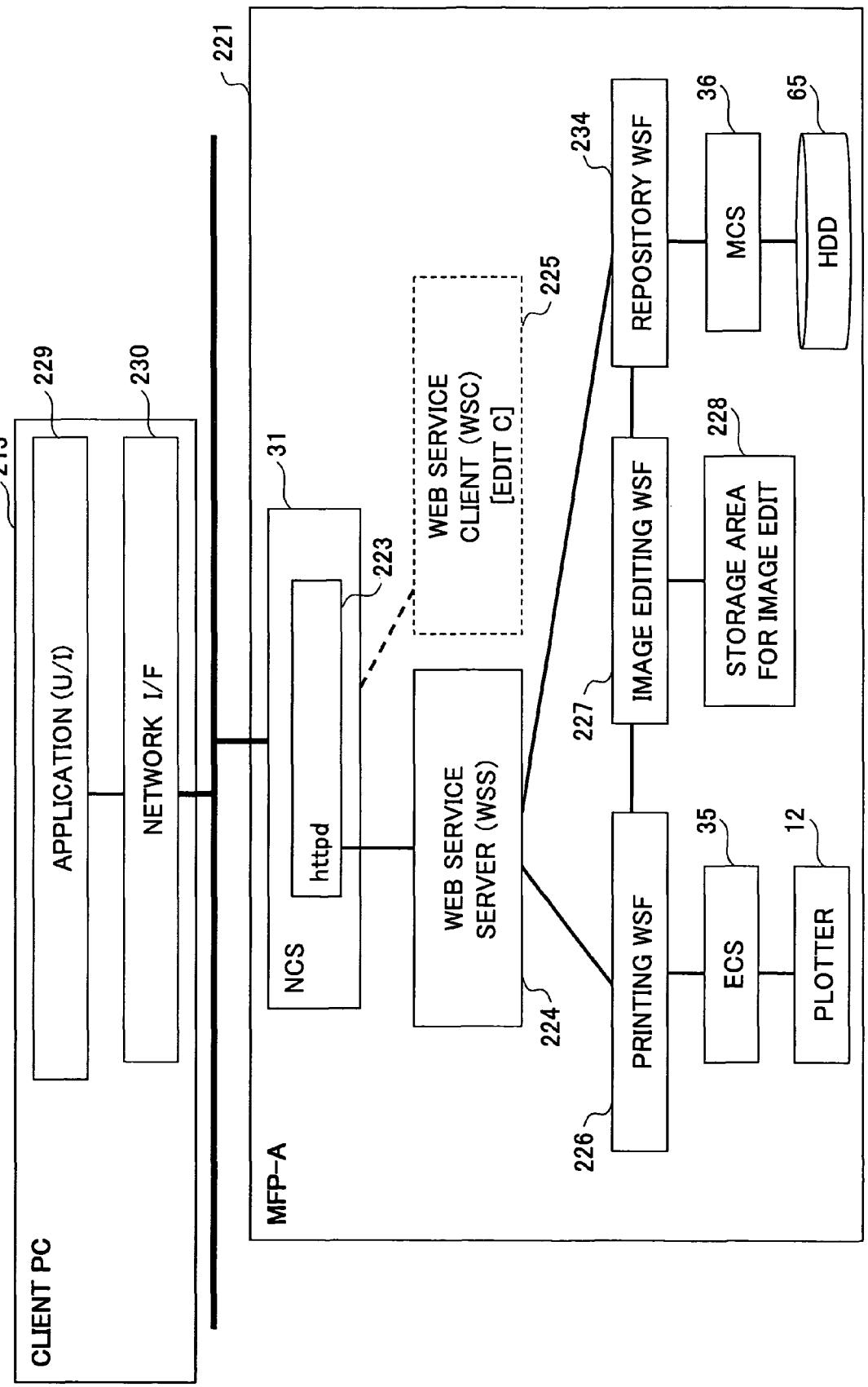
FIG. 61 is a diagram showing a functional configuration according to the eighth embodiment of the present invention.

Next, a functional configuration will be described with reference to FIG. 61 in detail. In FIG. 61, the client PC 213 and the MFP-A 221 are shown. In FIG. 61, the printing WSF 226 as the printing service 210, the image editing WSF 227 as the image edit service 211, and the repository WSF 234 as the document management service 212 are implemented in the MFP-A 221.

Figure 62:
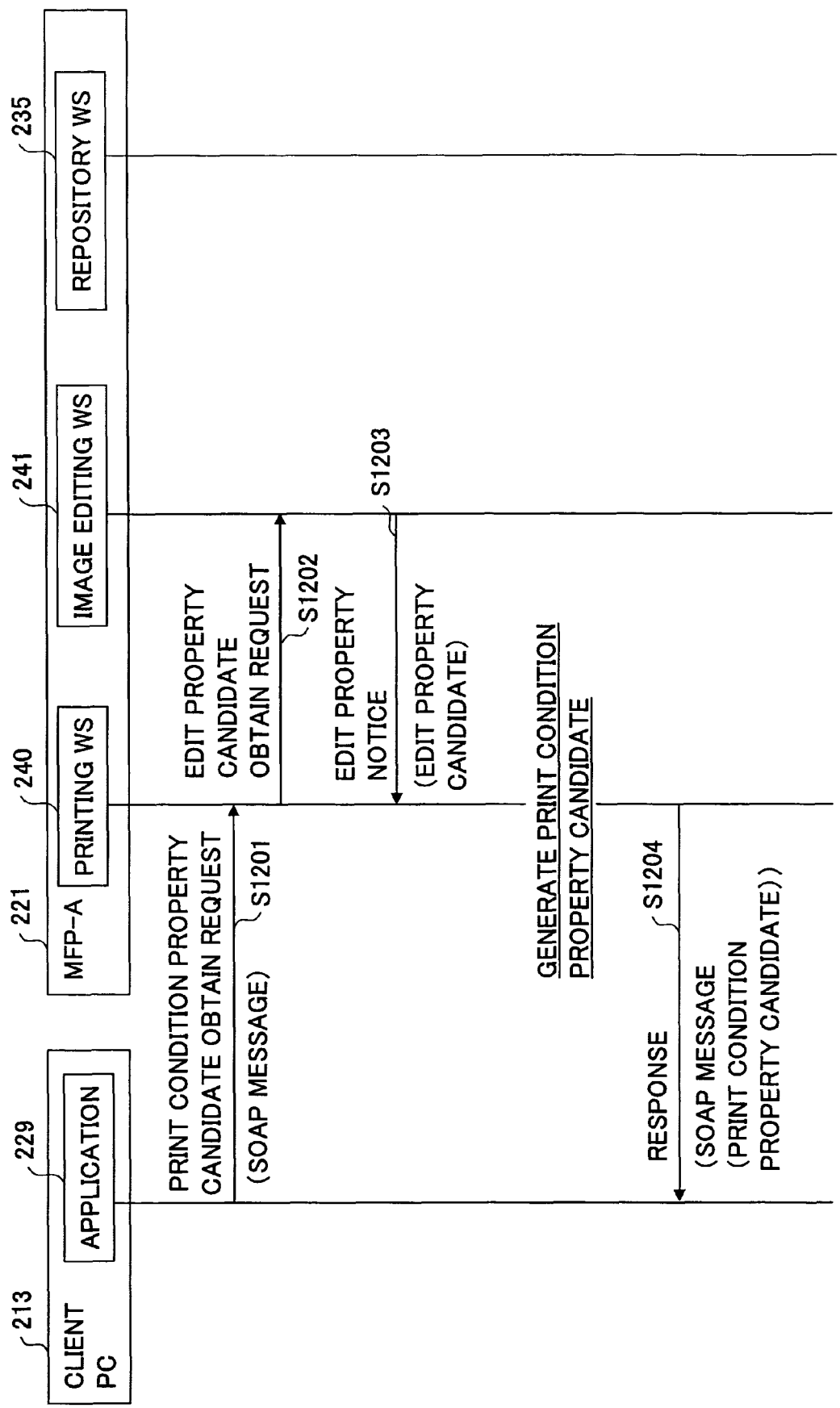
FIG. 62 is a diagram showing a sequence flow of a process for obtaining a print condition property candidate according to the eighth embodiment of the present invention.
Figure 63:
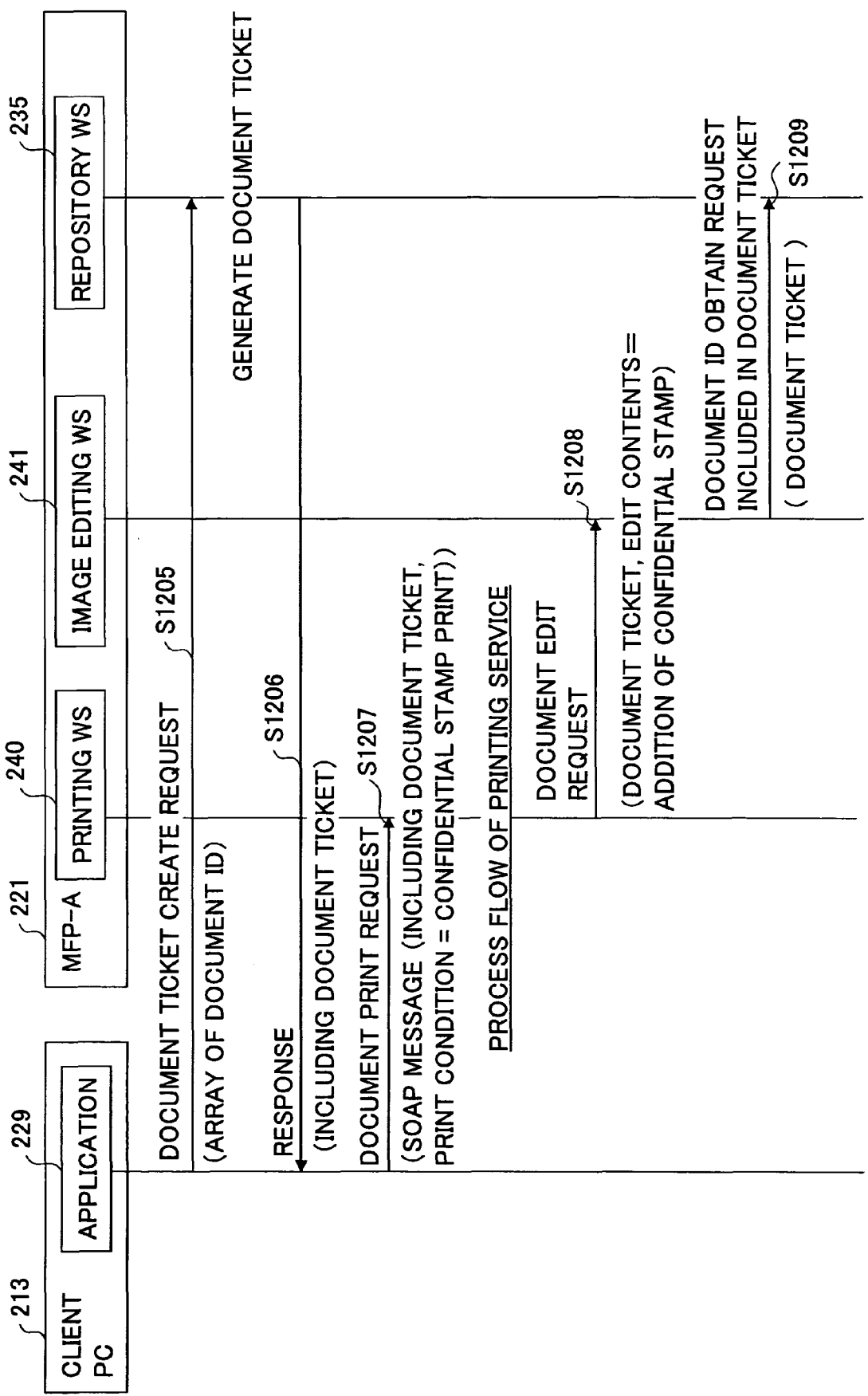
FIG. 63 is a diagram showing a sequence flow of a process concerning a print according to the eighth embodiment of the present invention.
Figure 64:
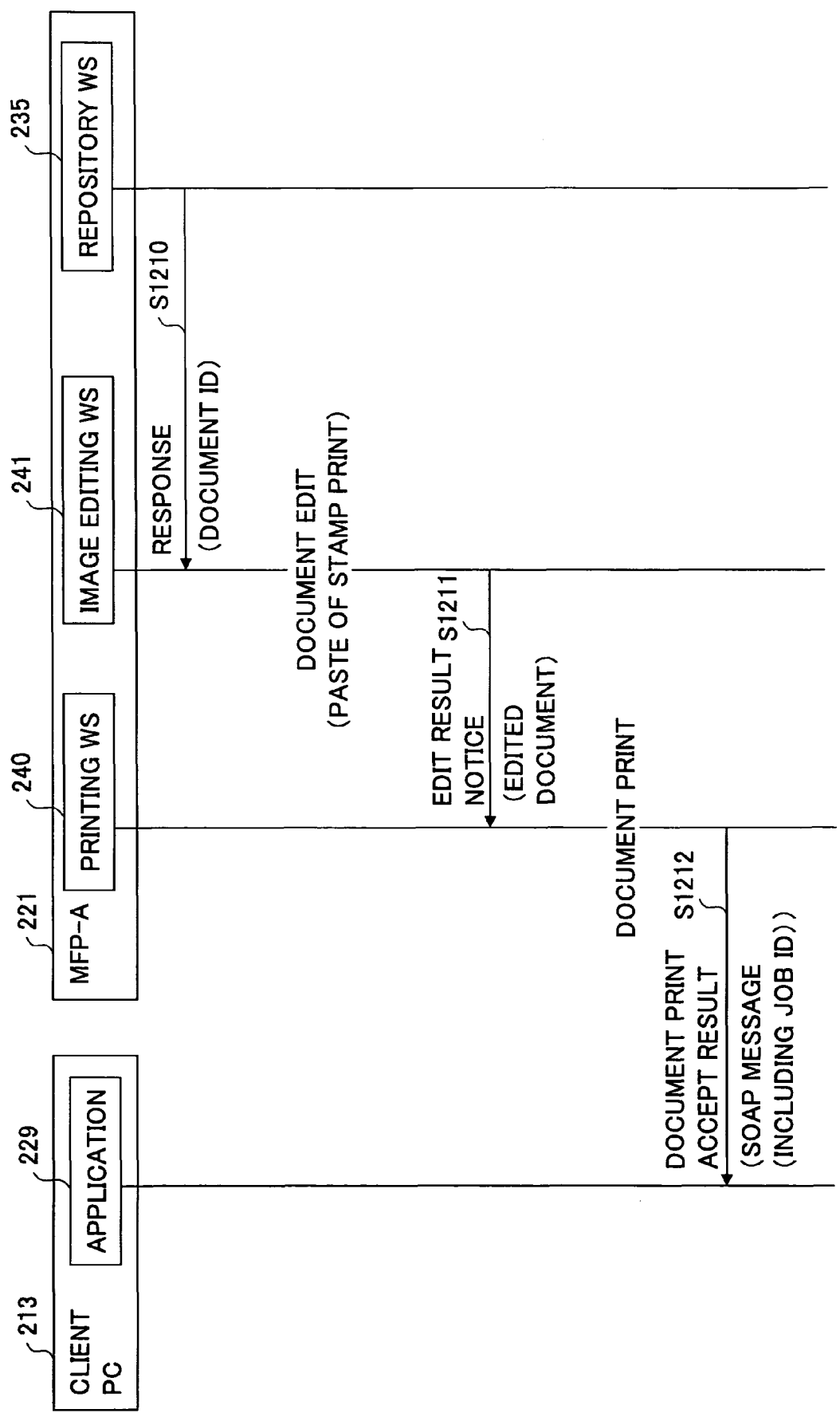
FIG. 64 is a diagram showing the sequence flow of the process concerning a print according to the eighth embodiment of the present invention.

The system configuration and the functional configuration in eighth embodiment are described above. a process for obtaining a print condition property candidate and a process concerning a print will be described in accordance with sequence flows. In the sequence flows shown in FIG. 62, FIG. 63, and FIG. 64, processes, which are conducted among the client PC 213, and the MFP-A 221, are shown. In FIG. 62, FIG. 63, and FIG. 64, the image editing WS 241 collectively represents the Web service server (WSS) 224 and the image editing WSF 227 in the MFP-A 221 in FIG. 61. Similarly, the repository WS 235 collectively represents the Web service server (WSS) 224 and the repository WSF 234 in FIG. 61. Moreover, the printing WS 240 collectively represents the Web service server (WSS) 224 and the printing WSF 226 in the MFP-A 221 in FIG. 61.

In the process shown in FIG. 62, the client PC 213 obtains the print condition property candidate. In the process shown in FIG. 63 and FIG. 64, the client PC 213 obtains a document ticket and prints out the document.

The sequence flow for obtaining the print condition property candidate will be described with reference to FIG. 62. FIG. 62 is a diagram showing the sequence flow of the process for obtaining the print condition property candidate according to the eighth embodiment of the present invention. In FIG. 62, in step S1201, the client PC 213 sends a print condition property candidate obtain request to the printing WS 240. In step S1102, the printing WS 240 sends an edit property candidate obtain request to the image editing WS 241. In response to the edit property candidate obtain request, the image editing WS 241 informs an edit property notice to the printing WS 240 in step S1203.

When the printing WS 240 receives the edit property candidate, the printing WS 240 generates the print condition property candidate from the print property possessed in the printing WS 240 itself and the edit property candidate informed from the image editing WS 241. This process is conducted as described in accordance with the flowchart shown in FIG. 11.

After the printing WS 240 generates the print condition property candidate, the printing WS 240 sends the print condition property candidate by a SOAP message to the client PC 213 in step S1204.

By the above-described process, the client PC 213 can obtain the print condition property candidate.

Next, the process concerning the print will be described with reference to FIG. 63 and FIG. 64. In step S1205, the client PC 213 sends a document ticket create request with an array of document IDs to the repository WS 235. In step S1206, the repository WS 235 sends a response with a document ticket with respect to the document ticket create request to the client PC 213.

In step S1207, the client PC 213 sends a document print request to the MFP-A 221. The document print request is sent by the SOAP message M21 shown in FIG. 34, and the document ticket and the print condition are informed to the MFP-A 221. In a case in FIG. 63, the client PC 213 requests to paste the confidential stamp as the print condition property.

When the printing WS 240 receives the document print request, the printing WS 240 executes the process flow of the printing service described in FIG. 24. In step S1208, the printing WS 240 sends a document edit request to the image editing WS 241. The document edit request informs the document ticket and the edit contents.

Next, in step S1209, the image editing WS 241 sends a document ID obtain request included in the document ticket to the repository WS 235 in order to get back (retrieve) the document from the repository WS 235. The image editing WS 241 obtains the document ID since the document is stored in the MFP-A 221 where the image editing WS 241 is implemented. The image editing WS 241 can edit the document corresponding to the document ID by obtaining the document ID.

Referring to FIG. 64, in step S1210, the repository WS 235 sends a document ID to the image editing WS 241. The image editing WS 241 edits the document and sends an edit result with an edited document to the printing WS 240 (step S1211).

When the printing WS 240 receives the edited document, the printing WS 240 prints out the edited document and sends a document print accept result to the client PC 213 in step S1212. The document print accept result is sent by the SOAP message described in FIG. 28.

The eighth embodiment is described above. Thus, the explanations from the first embodiment to the eighth embodiment are completed. From the first embodiment to the eighth embodiment, an outputting service part, an output condition property candidate obtain request receiving part, an output condition property candidate obtaining part, and an output condition property candidate obtaining part correspond to the printing WSF 226. An editing service part corresponds to the image editing WSF 227. A Web service part corresponds to a Web service including the Web service server (WSS) 224, the printing WSF 226, an the image editing WSF 227.

An output service client part corresponds to the printing WSF 226. An edit service client corresponds to the image editing WSF 227. A Web client part corresponds to a Web service client including the Web service client (WSC) 225, the printing WSF 226, and the image editing WSF.

Figure 65:
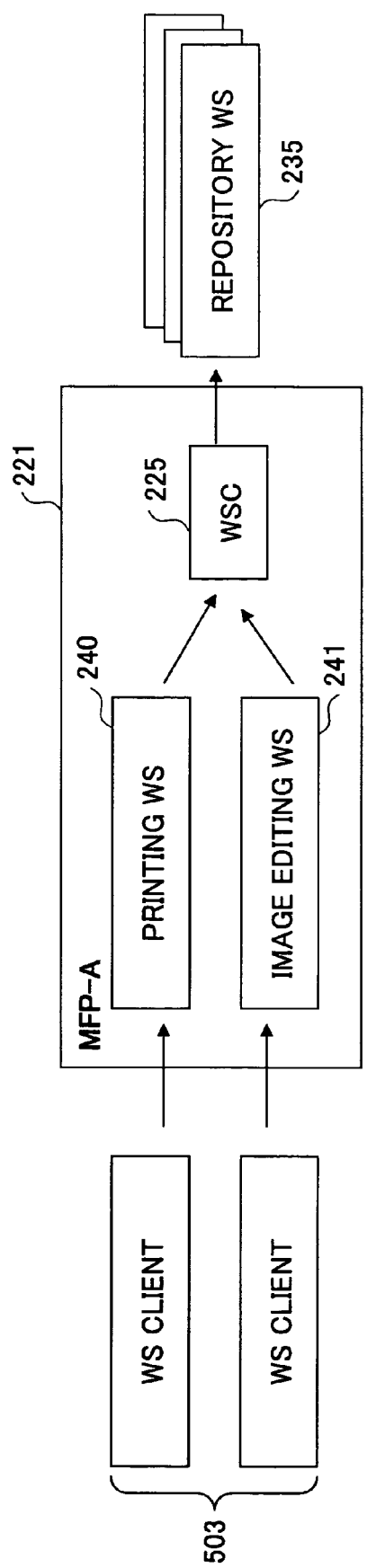
FIG. 65 is a diagram showing a configuration in that a single Web service client (WSC) can use a plurality of Web services (WS), according to the present invention.

FIG. 65 is a diagram showing a configuration in that a single Web service client (WSC) can use a plurality of Web services (WS), according to the present invention. Referring to FIG. 65, the configuration will be described in detail. The MFP-A 221 includes the printing WS 240 and the image editing WS 241. Each of the printing WS 240 and the image editing WS 241 functions as a Web service server for Web service clients (WS clients) 503 other than the MFP-A 221. Even in this case, both the printing WS 240 and the image editing WS 241 can use the single Web service client (WSC) 225, and each of the printing WS 240 and the image editing WS 241 can use the repository WS 235 other than the MFP-A 221 through the Web service client 225.

Figure 66:
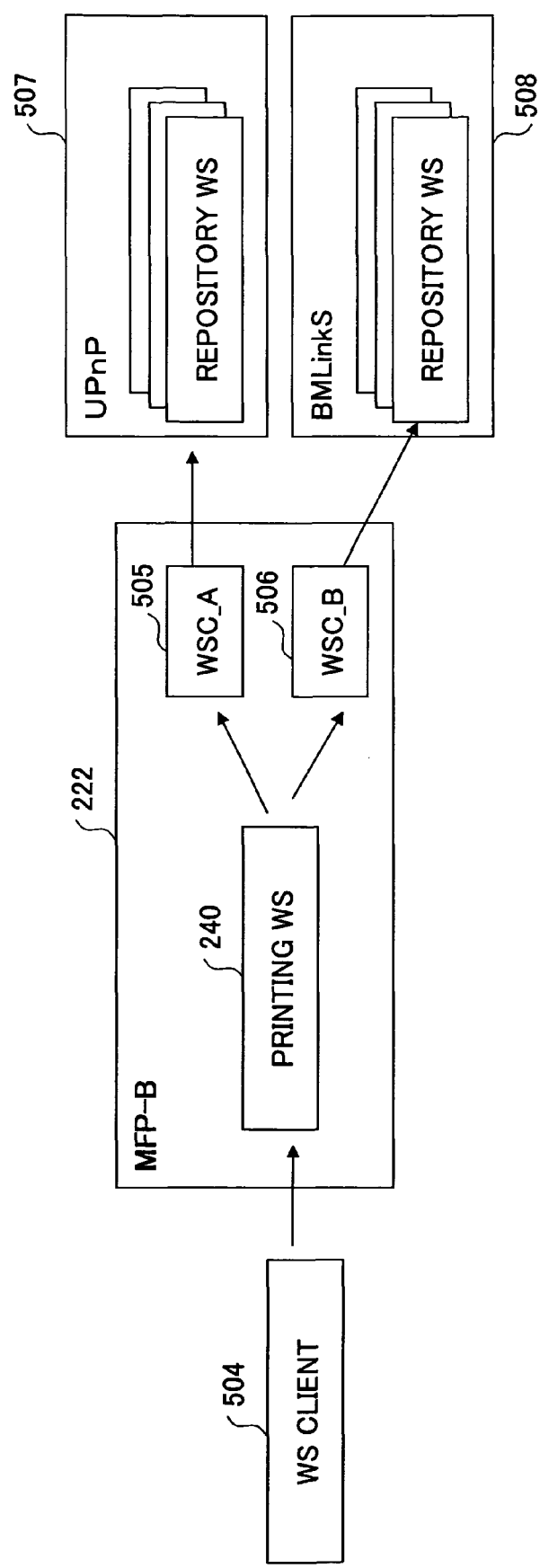
FIG. 66 is a diagram showing another configuration in that a single Web service can use a plurality of Web service client (WSC), according to the present invention.

FIG. 66 is a diagram showing another configuration in that a single Web service can use a plurality of Web service client (WSC), according to the present invention. In FIG. 66, the MFP-B 222, the Web service client (WS client) 504, a UPnP repository WS 507, and a BMLinkS repository WS 508 are shown.

BMLinkS is a standard specification defining a search of OA devices, a data format for the OA devices to send and receive data, and a control of the OA devices.

In order to support the UPnP repository WS 507 and the BMLinkS repository WS 508, which have a different protocol each other, a WSC_A 505 for supporting a UPnP protocol and a WSC_B 506 for supporting a BMLinkS protocol are implemented in the MFP-B 222. Accordingly, for example, the printing WS 240 being a server of the WS client 504 can use any one of the UPnP repository WS 507 and the BMLinkS repository WS 508. In addition, by implementing a Web service client (WSC) to support each version of the SOAP, it is possible to support each version of the SOAP.

Figure 67:
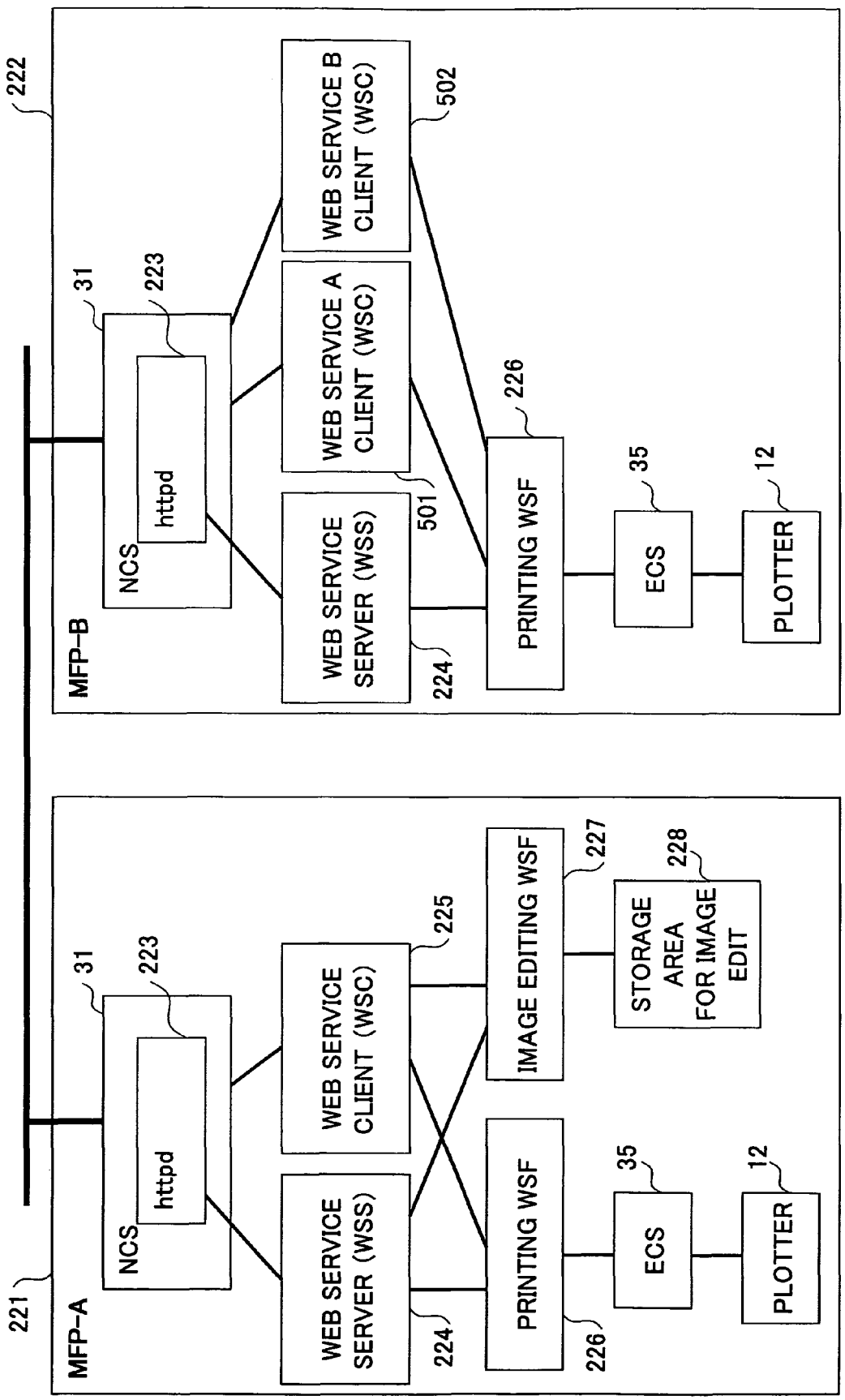
FIG. 67 is a diagram showing a configuration formed by the MFP-A described in FIG. 65 and the MFP-B described in FIG. 66, according to the present invention.

FIG. 67 is a diagram showing a configuration formed by the MFP-A described in FIG. 65 and the MFP-B described in FIG. 66, according to the present invention. In FIG. 67, explanations of the parts described above will be omitted.

In the MFP-A 221 shown in FIG. 67, the printing WSF 226 and the image editing WSF 227 can use the Web service client (WSC) 225 being a single Web service client. In addition, in the MFP-B 222, the printing WS 226 can use two Web service clients: a Web service A client 501 and a Web service B client 502. As described above, the Web service client (WSC) may be implemented for each specification of the Web service parts.

In the present invention, the output property includes at least one of a capability of setting copies of the document, a capability of setting a sheet size to print out, a capability of printing both sides, a capability of collating copies, a capability of indicating a tray, a capability of printing multi-pages of the document on a single sheet, a capability of printing the document by a variable magnification, a capability of indicating a partial area in the document to print out, a capability of indicating a color print for the document, and a capability of setting a finisher.

In the present invention, the edit property includes as contents of the edit property, at lease one of a capability of pasting a stamp to the document, a capability of a drawing operation, a capability of deleting, copying, pasting, moving, or converting a color with respect to an indicated area, a capability of continuously editing multi-pages, and a capability of eliminating a stain of a ground color.

The present invention is not limited to the specifically disclosed embodiments, and variations and modifications may be made without departing from the scope of the present invention.

The present application is based on the Japanese Priority Applications No. 2003-376499 filed on Nov. 6, 2003, No. 2003-376500 filed on Nov. 6, 2003, No. 2003-376501 filed on Nov. 6, 2003, No. 2004-318292 filed on Nov. 1, 2004, No. 2004-318293 filed on Nov. 1, 2004, and No. 2004-318294 filed on Nov. 1, 2004, the entire contents of which are hereby incorporated by reference.

What is claimed is:

1. A computer-implemented outputting system for providing an edit property indicating edit contents executable for a document and output condition property candidates each including an output property indicating an outputting method executable when the document is output, to a client terminal requesting an output of the document, said computer-implemented document outputting system comprising:
   a document management service part configured as a Web service to provide the document stored in a memory, when an edit or an output of the document is permitted;
   a first receiving part configured as a Web service to receive an obtain request of the output condition property candidates from the client terminal;
   a candidate providing part configured as a Web service to provide the output condition property candidates to the client terminal;
   a second receiving part configured as a Web service to receive a document output request including an output condition selected from the output condition property candidates;
   an edit service part configured as a Web service to receive the document from the document management service part and to edit the document based on the output condition and a received document ticket corresponding to the document showing that the edit for the document is permitted, wherein the document ticket is created in response to a document ticket create request including a plurality of document identifications for each output; and
   an output service part configured as a Web Service to receive an edited document from the edit service part and to output the edited document based on the output condition.

2. The computer-implemented document outputting system as claimed in claim 1, wherein the output service part uses the document ticket showing that the output for the document is permitted.

3. The computer-implemented document outputting system as claimed in claim 1, further comprising:
   a document management service client part configured as a Web service to retrieve the document from the document management service part.

4. The computer-implemented document outputting system as claimed in claim 1, further comprising:
   an output property obtaining part configured as a Web service to obtain the output property.

5. The computer-implemented document outputting system as claimed in claim 4, further comprising:

an output service client part configured as a Web service to obtain the output property from the output property obtaining part.

6. The computer-implemented document outputting system as claimed in claim 4, further comprising:
an edit property obtaining part configured as a Web service to obtain the edit property.

7. The computer-implemented document outputting system as claimed in claim 6, further comprising:
an edit service client part configured as a Web service to obtain the edit property from the edit property obtaining part.

8. The computer-implemented document outputting system as claimed in claim 6, further comprising:
an output condition property candidate obtaining part configured as a Web service to obtain the output condition property candidates from the output property obtained by the output property obtaining part and the edit property obtained by the edit property obtaining part.

9. The computer-implemented document outputting system as claimed in claim 8, wherein in a case of a plurality of the edit properties, the output condition property candidate obtaining part is configured to obtain a merged edit property in which the plurality of the edit properties are merged.

10. The computer-implemented document outputting system as claimed in claim 1, wherein when the document is printed out, the output property includes as contents of the output property at least one of a capability of setting copies of the document, a capability of setting a sheet size to print out, a capability of printing both sides, a capability of collating copies, a capability of indicating a tray, a capability of printing multi-pages of the document on a single sheet, a capability of printing the document by a variable magnification, a capability of indicating a partial area in the document to print out, a capability of indicating a color print for the document, and a capability of setting a finisher.

11. The computer-implemented document outputting system as claimed in claim 1, wherein the edit property includes as contents of the edit property, at least one of a capability of pasting a stamp to the document, a capability of a drawing operation, a capability of deleting, copying, pasting, moving, or converting a color with respect to an indicated area, and a capability of continuously editing multi-pages.

12. A computer-implemented document outputting method for providing an edit property indicating edit contents executable for a document and output condition property candidates each including an output property indicating an outputting method executable when the document is output, to a client terminal requesting an output of the document, said document outputting method comprising:
providing, from a document management service part configured as a Web service, the document stored in a memory, when an edit or an output of the document is permitted;
receiving, at a first receiving part configured as a Web service, an obtain request of the output condition property candidates from the client terminal;
providing, from a candidate providing part configured as a Web service, the output condition property candidates to the client terminal;
receiving, at a second receiving part configured as a Web service, a document output request including an output condition selected from the output condition property candidates;
receiving, at an edit service part configured as a Web service, the document from the document management service part and editing the document based on the output condition and a received document ticket corresponding to the document showing that the edit for the document is permitted, wherein the document ticket is created in response to a document ticket create request including a plurality of document identifications for each output; and
receiving, at an output service part configured as a Web service, an edited document from the edit service part and outputting the edited document based on the output condition.

* * * * *